United States Patent
Butt et al.

(10) Patent No.: US 6,170,868 B1
(45) Date of Patent: *Jan. 9, 2001

(54) HYBRID INFLATOR

(75) Inventors: Ron J. Butt, Castle Rock; Brent A. Parks, Englewood; Dean W. Grages, Aurora, all of CO (US); James L. Baglini, Phoenix, AZ (US); Robert N. Renz, Denver; Brian K. Hamilton, Littleton, both of CO (US)

(73) Assignee: Autoliv ASP Inc., Ogden, UT (US)

( * ) Notice: Under 35 U.S.C. 154(b), the term of this patent shall be extended for 0 days.

This patent is subject to a terminal disclaimer.

(21) Appl. No.: 09/352,899

(22) Filed: Jul. 13, 1999

Related U.S. Application Data

(60) Continuation of application No. 09/100,518, filed on Jun. 19, 1998, now Pat. No. 5,938,235, which is a division of application No. 08/680,273, filed on Jul. 11, 1996, now Pat. No. 5,788,275, which is a continuation-in-part of application No. 08/518,925, filed on Sep. 11, 1995, now Pat. No. 5,630,618, which is a continuation-in-part of application No. 08/389,297, filed on Feb. 16, 1995, now Pat. No. 5,553,889, which is a continuation-in-part of application No. 08/328,657, filed on Oct. 25, 1994, now Pat. No. 5,616,883, which is a continuation-in-part of application No. 08/210,668, filed on Mar. 18, 1994, now Pat. No. 5,602,361.

(51) Int. Cl.[7] ................................................ B60R 21/26
(52) U.S. Cl. ............................................ 280/737; 280/741
(58) Field of Search ...................................... 280/737, 736, 280/741, 742, 740

(56) References Cited

U.S. PATENT DOCUMENTS

| | | | |
|---|---|---|---|
| 3,653,684 | 4/1972 | Plumer | 280/150 AB |
| 3,655,217 | 4/1972 | Johnson | 280/150 |
| 3,721,456 | 3/1973 | McDonald | 280/150 |
| 3,774,807 | 11/1973 | Keathley et al. | 222/3 |
| 3,788,667 | 1/1974 | Vancil | 280/150 |
| 3,901,530 | 8/1975 | Radke | 280/150 |
| 3,948,540 | 4/1976 | Meacham | 280/150 AB |
| 3,960,390 | 6/1976 | Goetz | 280/731 |
| 3,966,226 | 6/1976 | Roth | 280/737 |
| 4,131,300 | 12/1978 | Radke et al. | 280/737 |
| 4,938,813 | 7/1990 | Eisele et al. | 149/19.2 |
| 5,125,684 | 6/1992 | Cartwright | 280/736 |
| 5,131,680 | 7/1992 | Coultas et al. | 280/737 |
| 5,199,740 | 4/1993 | Frantom et al. | 280/736 |
| 5,226,667 | 7/1993 | Coultas | 280/734 |
| 5,230,531 | 7/1993 | Hamilton et al. | 280/737 |
| 5,242,194 | 9/1993 | Popek | 280/737 |
| 5,263,740 | * 11/1993 | Frey et al. | 280/737 |
| 5,273,312 | 12/1993 | Coultas et al. | 280/737 |
| 5,348,344 | * 9/1994 | Blumenthal et al. | 280/737 |
| 5,351,989 | 10/1994 | Popek et al. | 280/737 |
| 5,423,570 | 6/1995 | Kort et al. | 280/736 |
| 5,456,492 | 10/1995 | Smith et al. | 280/737 |
| 5,462,307 | 10/1995 | Webber et al. | 280/737 |
| 5,468,015 | * 11/1995 | Goetz | 280/737 |
| 5,536,039 | * 7/1996 | Cuevas | 280/737 |
| 5,584,505 | * 12/1996 | O'Loughlin et al. | 280/737 |
| 5,634,661 | * 6/1997 | Dahl et al. | 280/737 |

FOREIGN PATENT DOCUMENTS

| | | |
|---|---|---|
| 2 046 265 | 3/1971 | (DE) . |
| 0 420 726 A1 | 4/1991 | (EP) . |
| 0 520 104 A1 | 12/1992 | (EP) . |
| 0 591 119 A2 | 4/1994 | (EP) . |

* cited by examiner

Primary Examiner—Peter C. English
(74) Attorney, Agent, or Firm—Sheridan Ross P.C.

(57) ABSTRACT

A hybrid inflator that includes a solid propellant and a pressurized medium comprising oxygen and at least one inert gas is provided. The solid propellant can be fuel-rich in that without excess oxygen it generates significant amounts of CO and $H_2$. The at least one inert gas is contained in an inflator housing and the amount thereof is greater, on a molar basis, than the oxygen. The propellant has acceptable long-term stability in that such propellant does not ignite when exposed to a temperature of 107° C. for a period of 400 hours.

20 Claims, 20 Drawing Sheets

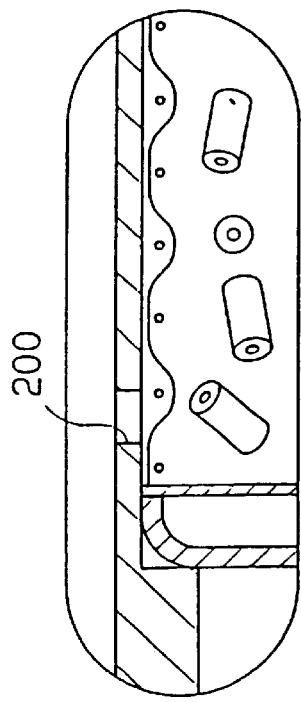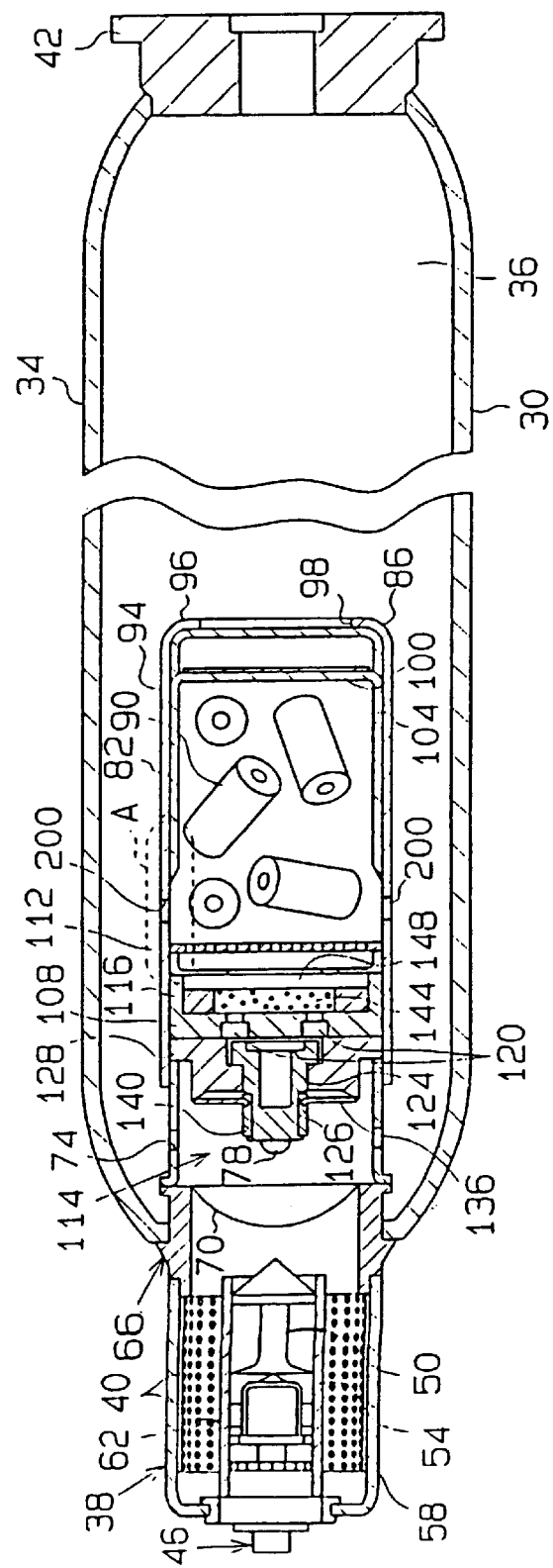
Fig.2(A)
Fig.2(B)

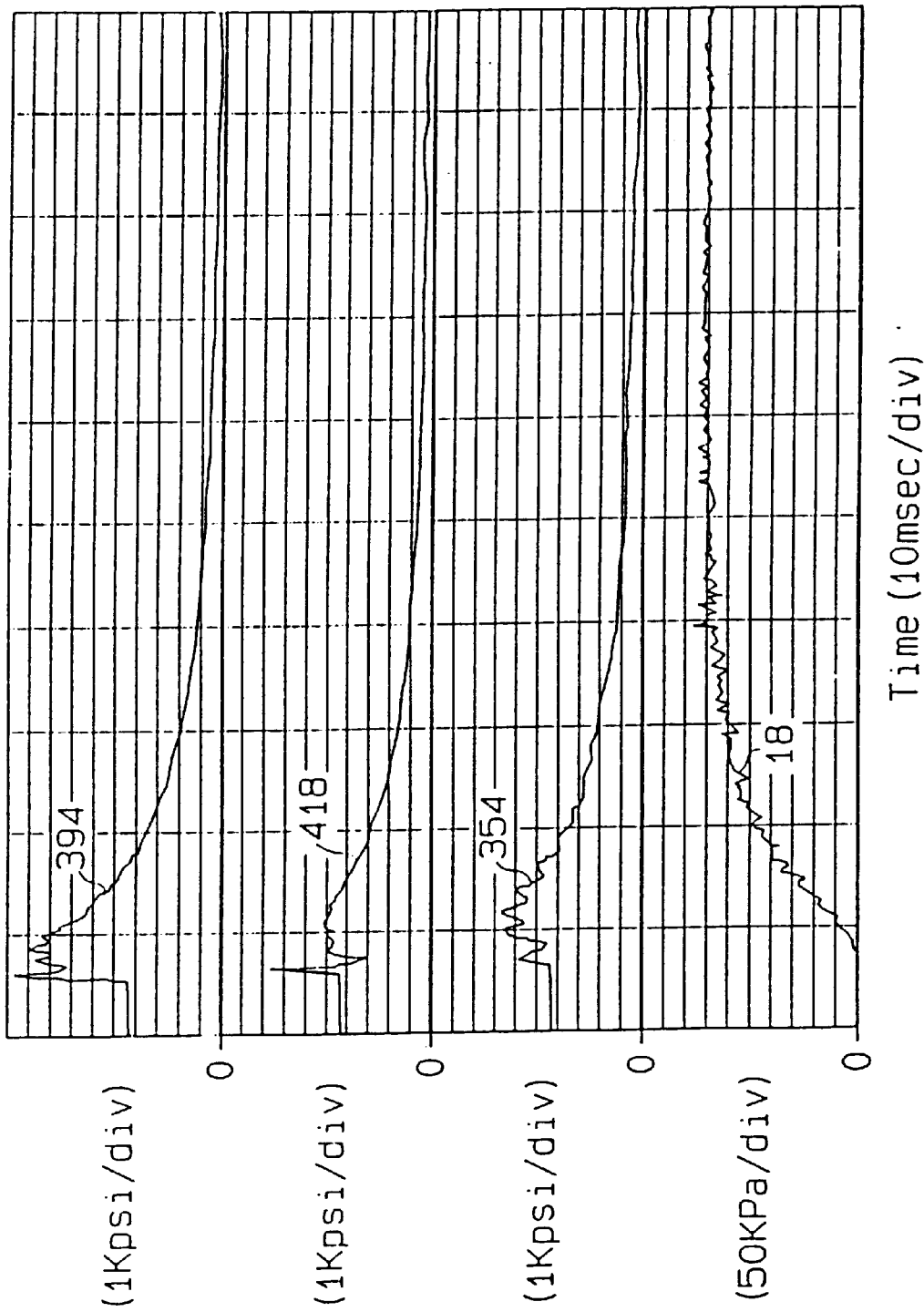

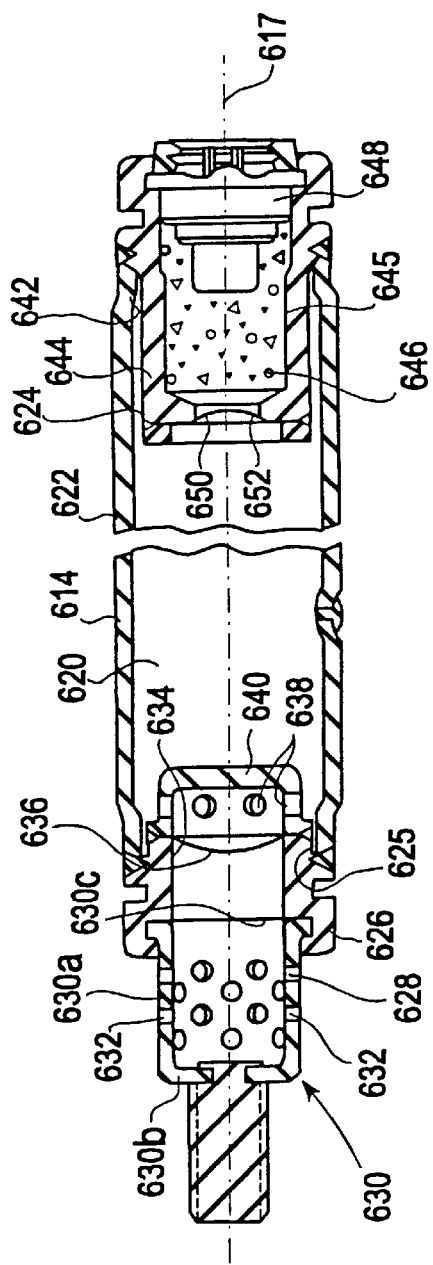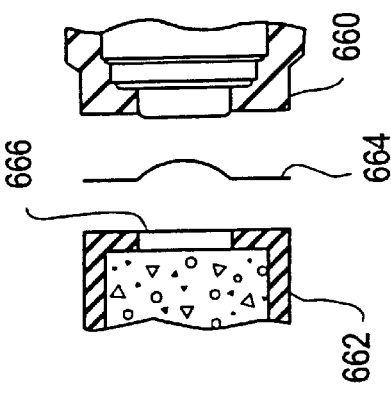
FIG. 16(A)
FIG. 16(B)

HYBRID INFLATOR

This application is a continuation of Ser. No. 09/100,518, filed Jun. 19, 1998, U.S. Pat. No. 5,938,235 which is a divisional of Ser. No. 08/680,273, filed Jul. 11, 1996, now U.S. Pat. No. 5,788,275, which is a continuation-in-part of Ser. No. 08/518,925, filed Sep. 11, 1995, now U.S. Pat. No. 5,630,618, which is a continuation-in-part of Ser. No. 08/389,297, filed Feb. 16, 1995, now U.S. Pat. No. 5,553,889, which is a continuation-in-part of Ser. No. 08/328,657, filed Oct. 25, 1994, now U.S. Pat. No. 5,616,883, which is a continuation-in-part of Ser. No. 08/210,668 filed Mar. 18, 1994, now U.S. Pat. No. 5,602,361.

FIELD OF THE INVENTION

The present invention generally relates to the field of inflatable safety systems and, more particularly, to a hybrid inflator.

BACKGROUND OF THE INVENTION

The evolution of inflators for automotive inflatable safety systems has resulted in the development of pressurized gas-only inflators, propellant-only inflators, and hybrid inflators. There are of course many design considerations for each of the above-noted types of inflators. In all three systems, two primary design considerations are that the air/safety bag must be expanded a predetermined amount in a predetermined amount of time in order to be operationally effective. As such, substantial development efforts have been directed to how the flow path is established between the inflator and the air/safety bag and how the subsequent flow is provided to the air/safety bag such that the above-identified objectives can be met. In hybrid inflators, which again require both a release of a stored, pressurized gas and an ignition of a gas and/or heat-generating propellant, the manner of establishing the flow path to the air/safety bag and the manner of igniting the propellant must both be addressed in a way which meets the above-noted objectives.

Another increasingly important objective is the manner in which the inflator is assembled. Complex hardware designs commonly require complex assembly procedures which increases the overall cost of the inflator. It is also, of course, important during assembly to not adversely affect the performance characteristics of the inflator and to provide an assembly procedure which is reasonable safe.

SUMMARY OF THE INVENTION

A first aspect of the present invention relates to a hybrid inflator for an inflatable safety system which utilizes a dual function initiator of sorts. The hybrid inflator has an inflator housing which stores an appropriate pressurized medium (e.g., fluid and/or gas) and a gas generator which stores an appropriate gas/heat-generating material or propellant for augmenting the flow to the air/safety bag of the inflatable safety system. A first closure disk initially isolates the hybrid inflator from this air/safety bag. An activation assembly is provided which includes at least one combustible material which is ignited when activation of the system is desired/required. Combustion products from the activation assembly are provided into direct contact with the propellant to ignite the same. These same combustion products from the activation assembly also propel a projectile through the first closure disk to initiate the flow from the inflator to the air/safety bag.

In one embodiment of this first aspect, the projectile provides a function in addition to rupturing the first closure disk to initiate the flow to the air/safety bag. For instance, the projectile may be disposed within end of the gas generator and at least partially aligned with the first closure disk. By selecting an appropriate configuration for the projectile and/or its interrelationship with the end of the gas generator through which it passes to rupture the first closure disk, the projectile may also be used to seal this end of the gas generator. This may be desirable to force the propellant gases and/or other combustion products from the activation assembly to flow from the gas generator and into the stored gas housing before exiting the inflator through the ruptured first closure disk. When a propellant is used which generates combustible propellant gases, this reduces the potential for these propellant gases combusting within the air/safety bag.

In another embodiment of this first aspect, a transfer tube is disposed internally of and spaced from the gas generator housing. All of the propellant is disposed in the space between the gas generator housing and the transfer tube, and the transfer tube includes a plurality of ports. The output from the activation assembly is directed into the interior of the transfer tube and then out through its ports to ignite the propellant. This reduces the potential for the initiation of the activation assembly adversely impacting the structural integrity of the propellant. The transfer tube may also be used to direct the output from the activation assembly to the above-noted projectile to propel the same through the first closure disk.

A second aspect of the present invention relates to a hybrid inflator which has an intermediately disposed outlet closure disk. An inflator housing has first and second ends which are separated by a first distance, and an appropriate pressurized medium is contained within this inflator housing. The inflator further includes a gas generator which contains a gas/heat-generating material or a propellant, as well as an outlet passage which is fluidly interconnectable with at least one of the inflator housing and said gas generator housing. A first closure disk is disposed within this outlet passage and is the barrier between the output from the inflator and the air/safety bag of the inflatable safety system. This first closure disk is disposed at least about 40% of the first distance (the length of the inflator) from each of the two ends of the inflator housing. The various features discussed above in relation to the first aspect of the invention may be used with this second aspect of the invention as well.

A third aspect of the present invention generally relates to a multiple chambered hybrid inflator. The inflator includes a first housing and a second housing assembly. The second housing assembly is interconnected with the first housing and is disposed interiorly thereof (e.g., concentrically disposed). The second housing assembly includes a first chamber in which an appropriate gas/heat-generating material or propellant is disposed. A second chamber is defined by the space between the first housing and the second housing assembly and contains an appropriate pressurized medium in the static state or prior to activation of the inflator. The second chamber is in constant fluid communication with the first chamber such that the first chamber also contains pressurized medium.

The second housing assembly of this third aspect also includes a third chamber. A first closure disk is associated with the third chamber and provides the initial isolation between the air/safety bag and the inflator. The third chamber is fluidly interconnectable with the second chamber, but is substantially isolated from the first chamber. As such, upon ignition of the propellant within the first chamber, propellant gases flow from the first chamber into the second chamber, and then into the third chamber. After the first closure disk is ruptured, the flow is established from the inflator to the air/safety bag.

In one embodiment of this third aspect, the above-noted dual function projectile from the first aspect may be used as the mechanism for isolating the first chamber from the third chamber. All other features discussed above in relation to the first and second aspects of the invention may be used with this third aspect as well.

In another embodiment of this third aspect, the second housing assembly includes a central housing having a sidewall and two open ends. The inflator activation assembly is disposed within and closes one of the open ends of the central housing and is appropriately secured thereto (e.g., via welding). A partition is disposed within the interior of the central housing (e.g., via a press-fit) to define the first chamber of the second housing assembly together with the activation assembly. A diffuser assembly is disposed within and closes the other open end of the central housing and is appropriately secured thereto (e.g., via welding) to define the third chamber of the second housing assembly together with the diffuser assembly. The partition, due to its interface with the central housing and the lack of any ports in the partition, substantially limits fluid any substantial flow from the first chamber directly into the third chamber. Moreover, by press-fitting the partition into the central housing, this also allows the propellant to be loaded into the central housing after all welds, which are located near the propellant, have been made.

A fourth aspect of the present invention relates to a method of assembling an inflator. The inflator includes a stored gas housing, a central housing having first and second open ends, a gas/heat-generating material or propellant, a partition, and a diffuser assembly. The method includes the steps of disposing the central housing within an opening through the stored gas housing and welding the central housing and stored gas housing together. A gas-generating material ignition assembly is disposed within the first open end of the central housing and is welded thereto. Thereafter, the gas-generating material is loaded into the central housing through its second open end into a position proximate the ignition assembly. This thereby allows the propellant to be loaded into the inflator after all welds required to interconnect the various components of the inflator have been made.

Once the propellant is loaded in the above-described manner, the partition may be loaded into the central housing through its second open end and appropriately interconnected with the central housing (e.g., by being press-fit therein). This separates the central housing into two different chambers with the propellant being within one of these chambers. The diffuser assembly may thereafter by disposed within the second open end of the central housing to be welded thereto.

BRIEF DESCRIPTION OF THE DRAWINGS

FIGS. 2A–B are longitudinal cross-sectional views of one embodiment of a hybrid inflator and an enlargement of a portion thereof, respectively;

FIG. 13 illustrates the pressure within the various chambers of the inflator of FIG. 8 during operation when the valve/valve system is not used;

FIG. 16A is a longitudinal cross-sectional view of another embodiment of a hybrid inflator;

FIG. 16B is a variation of the hybrid inflator of FIG. 16A;

DETAILED DESCRIPTION

The present invention will be described with regard to the accompanying drawings which assist in illustrating various features of the invention. In this regard, the present invention generally relates to hybrid inflators for automotive inflatable safety systems. That is, the invention relates to an inflator which utilizes both a stored, pressurized gas and a gas and/or heat-generating propellant. Various types of hybrid inflators are disclosed in U.S. Pat. No. 5,230,531 to Hamilton et al., which is assigned to the assignee of this application, and the entire disclosure of this patent is hereby incorporated by reference in its entirety herein.

Figure 1:
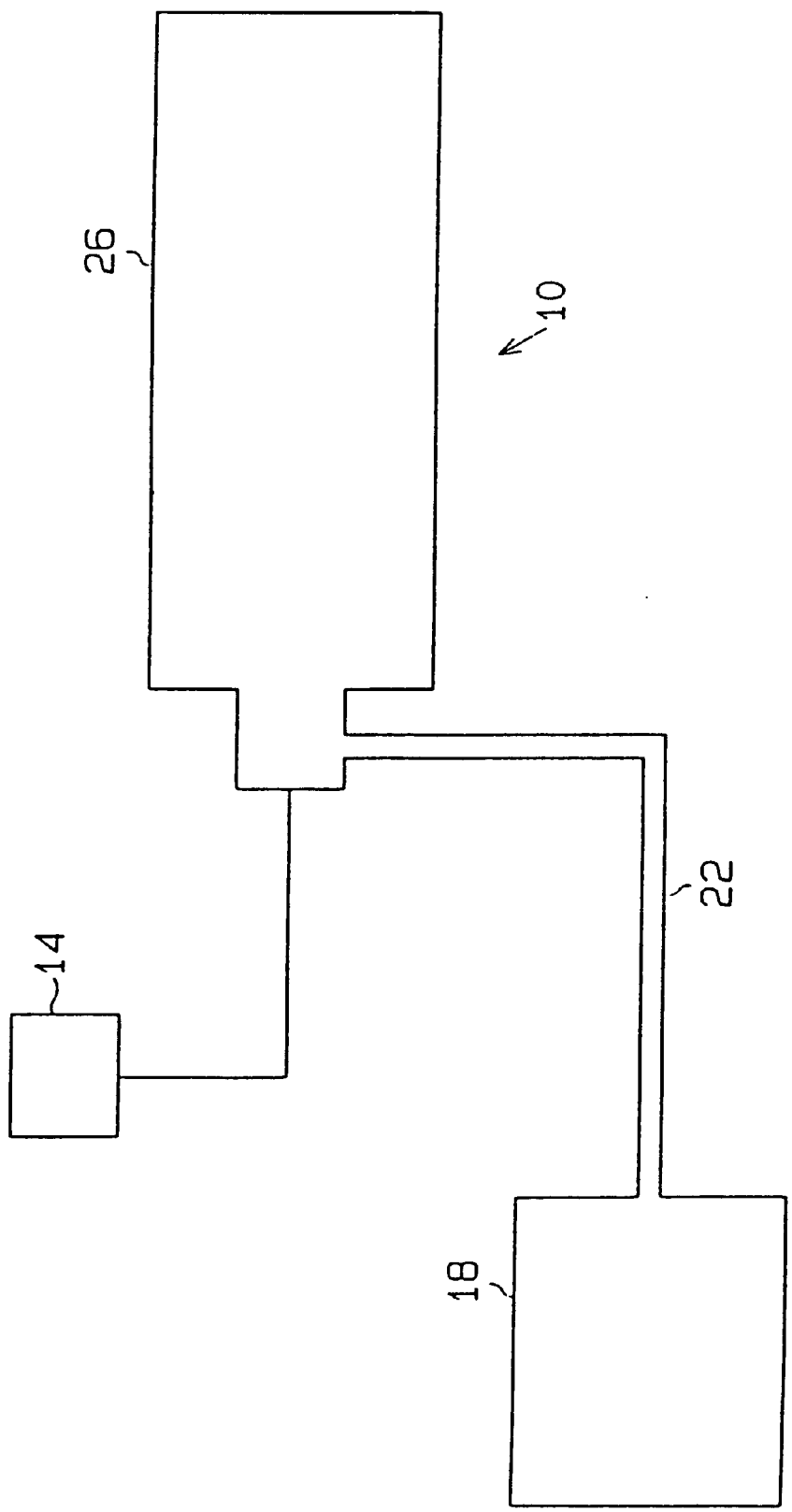
FIG. 1 is a schematic representation of an automotive inflatable safety system.

One embodiment of an automotive inflatable safety system is generally illustrated in FIG. 1. The primary components of the inflatable safety system 10 include a detector 14, an inflator 26, and an air/safety bag 18. When the detector 14 senses a condition requiring expansion of the air/safety bag 18 (e.g, a predetermined deceleration), a signal is sent to the inflator 26 to release gases or other suitable fluids from the inflator 26 to the air/safety bag 18 via the conduit 22.

The inflator 30 illustrated in FIGS. 2 is a hybrid inflator and may be used in the inflatable safety system 10 of FIG.

1 in place of the inflator 26. Consequently, the inflator 30 includes a bottle or inflator housing 34 having a pressurized medium 36 that is provided to the air/safety bag 18 (FIG. 1) at the appropriate time, as well as a gas generator 82 that provides propellant gases to augment the flow to the air/safety bag 18 (e.g., by providing heat to expand the pressurized medium 36 and/or generating additional gases). As will be discussed in more detail below, a gun-type propellant (e.g., a high temperature, fuel-rich propellant) may be used for the formulation of the propellant grains 90 positioned in the gas generator 82 and a mixture of at least one inert gas (e.g., argon) and oxygen may be used for the pressurized medium 36. For one or more aspects associated with the present invention, it is preferable that the pressurized medium includes from about 70% to about 92% of the inert fluid and from about 8% to about 30% of oxygen on a molar basis, and more preferably the pressurized medium includes from about 79% to about 90% of the inert fluid and from about 10% to about 21% of oxygen on a molar basis.

The inflator housing 34 and gas generator 82 are interconnected, with the gas generator 82 being positioned inside the inflator housing 34 to reduce the space required for the inflator 30. More specifically, a hollow diffuser 38 s welded to one end of a hollow boss 66 (e.g., having a diameter of about 1.25"). The diffuser 38 has a plurality of rows of discharge holes 40 (e.g., 80 discharge holes 40 each having a diameter of about 0.100") therethrough which provides a "non-thrusting output" from the inflator 30 and a screen 58 is positioned adjacent the discharge holes 40. A closure disk 70 is appropriately positioned within the boss 66 and is welded thereto in order to initially retain the pressurized medium 36 within the inflator housing 34. When release is desired, a projectile 50 having a substantially conically-shaped head is propelled through the closure disk 70. More particularly, the projectile 50 is positioned on the convex side of the closure disk 70 within a barrel 54 and is propelled by the activation of an initiator 46 when an appropriate signal is received from the detector 14 of the inflatable safety system 10 (FIG. 1). A ring 62 is provided to initially retain the projectile 50 in position prior to firing.

An orifice sleeve 74 is welded to the closure disk 70 and/or the end of the boss 66. The orifice sleeve 74 is hollow and includes a plurality of orifice ports 78 (e.g., four ports 78 each having a diameter of about 0.201") to fluidly interconnect the interior of the inflator housing 34 and the interior of the boss 66 and diffuser 38 when the closure disk 70 is ruptured by the projectile 50. Moreover, the gas generator 82, more specifically the gas generator housing 86, is welded to the orifice sleeve 74 to complete the interconnection of the inflator housing 34 and gas generator 82.

The gas generator housing 86 contains a plurality of propellant grains 90 which when ignited provide heated propellant combustion product gases for augmenting the flow to the air/safety bag 18 (FIG. 1). The propellant grains 90 are retained within the gas generator housing 86 by a propellant sleeve 94 which is separated from the gas generator inlet nozzle 98 on the end 96 of the gas generator housing 86 by a screen 104 and baffle 100. As will be discussed below, the propellant grains 90 may be formulated from a gun-type propellant and are "smokeless". Nonetheless, the grains 90 are substantially cylindrically-shaped with a single hole extending through the central portion thereof. Other propellant grain configurations may be appropriate and will depend at least in part on the particular propellant formulation being used.

A single (or multiple) gas generator inlet nozzle 98 (e.g., a single nozzle 98 having a diameter of about 0.516") is positioned on the end 96 of the gas generator housing 86 and is generally directed away from the closure disk 70. The gas generator housing 86 also includes a plurality of circumferentially spaced outlet or discharge nozzles 200 (e.g., one "row" of four nozzles 200 each having a diameter of about 0.221") on the sidewall of the housing 86. It may be desirable to vary the axial location of these nozzles 200 (they may be generally at the mid-portion of the housing 86), although operations may be enhanced by a location more proximate the outlet. Moreover, it may be desirable to vary the number of nozzles 200. With this configuration of having discharge nozzles 200 on the sidewall of the gas generator housing 86 and an inlet nozzle 98 on the end 96 of the housing 86, during combustion of the propellant grains 90 the pressurized medium 36 is drawn into the gas generator housing 86 through the inlet nozzle 98 and the mixed gases from within the gas generator housing 86 flow out of the housing 86 through the nozzles 200. Specifically, the flow of pressurized medium 36 by the sidewall of the gas generator housing 86 produces a pressure differential which draws pressurized medium 36 into the gas generator housing 86 through the inlet nozzle 98. This significantly improves upon the performance of the inflator 30 at least when certain types propellant gases are produced as will be discussed in more detail below.

The gas generator 82 includes an ignition assembly 114 for igniting the propellant grains 90 at the appropriate time. The ignition assembly 114 is at least partially positioned within the gas generator housing 86 between the projectile 50 and propellant grains 90 and generally includes an actuation piston 124, and at least one percussion primer 120 and an ignition/booster material 144 which serve as an activator. More particularly, an actuation guide 140 engages an end portion of the orifice sleeve 74 and the interior wall of the gas generator housing 86, the actuation guide 140 thereby functioning at least in part to contain at least a portion of and guide the actuation piston 124 positioned therein. A primer holder 116 engages an end of the actuation guide 140 and houses a plurality of conventional percussion primers 120 which are positioned substantially adjacent to the ignition/booster material 144. The ignition/booster material 144 is typically retained adjacent the primers 120 by a charge cup 148. An example of an appropriate ignition/booster material 144 is an RDX aluminum booster material having a composition of 89% RDX, 11% aluminum powder, with 0.5% hydroxypropyl-cellulose added. A retainer 108 and baffle 112 are positioned between the primer holder 116 and propellant sleeve 94. In the event that the gas generator housing 86 is attached to the orifice sleeve 74 by crimping instead of welding, the gas generator housing 86 may have a tendency to lengthen during operation. Consequently, in order to maintain a firm interaction of the foregoing components, a wave spring washer (not shown) may be positioned, for instance, between the retainer 108 and the baffle 112.

The actuation piston 124 is slidably positioned within the actuation guide 140 and includes a continuous rim projecting member 128 which is substantially aligned with the primers 120. As can be appreciated, a plurality of projecting members (not shown), could replace the substantially continuous rim projecting member 128. A belleville washer 136 is positioned between and engages a portion of both the actuation guide 140 and actuation piston 124 (via a spacer 126) to initially maintain the position of the actuation piston 124 away from the primers 120. Consequently, the potential for inadvertent engagement of the actuation piston 124 with the primers 120, which could activate the gas generator 82, is reduced. However, after the projectile 50 passes through the closure disk 70, the energy transferred to the actuation piston 124 by the projectile 50 is sufficient to overcome the belleville washer 136 such that the projecting rim 128 is able to engage the primers 120 with sufficient force to ignite at least one of such primers 120. This in turn causes ignition of the ignition/booster material 144, and thus ignition of the propellant grains 90 results.

During operation of the gas generator 82, the primers 120 may erode and thereby allow propellant gases generated by combustion of the propellant grains 90 to flow through the primers 120. Any leakage of propellant gases in this manner may adversely affect the consistency of performance of the inflator 30. These gases, however, desirably act upon the actuation piston 124 to move the piston 124 into sealing engagement with the actuation guide 140. This provides a seal for the gas generator housing 90 which substantially limits any leakage of gases therethrough. Therefore, the propellant gases desirably flow through the gas generator nozzle 98.

Summarizing the operation of the inflator 30, the detector 14 (FIG. 1) sends a signal to the initiator 46 to propel the projectile 50. The projectile 50 initially passes through the closure disk 70 to open the passageway between the inflator housing 34 and air/safety bag 18 (FIG. 1). The projectile 50 continues to advance until it impacts the actuation piston 124 which causes the projecting rim 128 attached thereto to strike at least one of the aligned primers 120. As a result, the ignition/booster charge 144 ignites, which in turn ignites the propellant grain 90. During combustion of the grains 90 within the housing 86, the pressurized medium 36 from the inflator housing 34 is drawn into the gas generator housing 86 through the inlet nozzle 98 positioned on the end 96 of the housing 86. This results from the flow of the pressurized medium 36 by the sidewall of the gas generator housing 86 which produces a pressure differential. This "drawing in" of the pressurized medium 36 promotes mixing of the propellant gases and the pressurized medium 36 within the housing 86, and as will be discussed in more detail below this is particularly desirable when oxygen is included in the pressurized medium 36 to react with propellant gases having a large content of carbon monoxide and hydrogen. Nonetheless, gases are discharged from gas generator housing 86 through the discharge nozzles 200 on the sidewall of the housing 86. As such, the flow to the air/safety bag 18 is desirably augmented (FIG. 1) by mixing of the pressurized medium 36 with the combustion products from the gas generator housing 86.

As noted above, the hybrid inflator 30 may utilize a gun-type propellant as the formulation for the propellant grains 90, and a mixture of at least one inert gas and oxygen for the pressurized medium 36. Gun-type propellants, as used herein, are high temperature, fuel-rich propellants such as single, double, or triple-base propellants, and nitramine propellants such as LOVA or HELOVA propellants. More specifically, traditional gun-type propellants are those having a combustion temperature ranging from about 2,500·K to about 3,800·K, and typically greater than about 3,000·K, and are fuel-rich in that without excess oxygen, these propellants generate significant amounts of CO and $H_2$. The excess of fuel from these propellants typically requires additional oxygen between 5 and 25 mole percent, or sometimes even between 15 and 40 mole percent, of the stored gas to drive the reaction equilibrium to $CO_2$ and $H_2O$.

Specific "traditional" gun-type propellants which may be used for the propellant grains 90 of the hybrid inflator 30 include HPC-96, a double base, smokeless propellant having a composition, on a weight percentage basis, of about 76.6% nitrocellulose of which about 13.25% is nitrogen; about 20.0% nitroglycerin; about 0.6% ethyl centralite; about 1.5% barium nitrate; about 0.9% potassium nitrate; and about 0.4% graphite. HPC-96 is available from Hercules, Inc. in Wilmington, Del. Since this particular double-base propellant includes nitrocellulose as a major ingredient, it cannot meet current auto industry standards for long-term thermal stability, although it does produce desirable ballistic operation.

LOVA propellants (low vulnerability ammunition) and HELOVA propellants (high energy, low vulnerability ammunition) are another "traditional" gun-type propellant which may also be used for the propellant grains 90, such as a M39 LOVA propellant having a composition, on a weight percentage basis, of about 76.0% RDX (hexahydrotrinitrotriazine); about 12.0% cellulose acetate butyrate; about 4.0% nitrocellulose (12.6% nitrogen); about 7.60% acetyl triethyl citrate; and about 0.4% ethyl centralite. The M39 LOVA propellant is available from the Naval Surface Warfare Center in Indianhead, Md. and Bofors in Europe (Sweden) and generates, without excess oxygen, about 32 mole percent CO and 30 mole percent $H_2$. The LOVA and HELOVA propellants are preferred over existing double-base propellants because they pass current U.S. automotive industry thermal stability standards, whereas double-base propellants do not. However, relatively high operating pressures are required for stable combustion of LOVA and HELOVA propellants. Notwithstanding the characteristics of the HPC-96 and LOVA propellants, they do serve to illustrate at least some of the principles/features of the present invention.

Due to the performance characteristics of gun-type propellants when used as the formulation for the propellant grains 90, together with the use of oxygen as a portion of the pressurized medium 36, it is possible to reduce the amount of propellant required for the gas generator 82 compared to current designs using, for example, 20–30 grams of FN 1061-10 available from the assignee of this patent application (FN 1061-10 has a composition, on a weight percentage basis, of about 7.93% polyvinyl chloride, 7.17% dioctyl adipate, 0.05% carbon black, 0.35% stabilizer, 8.5% sodium oxalate, 75% potassium perchlorate, and about 1% lecithin). For instance, generally for gun-type propellants which may be used in the formulation of the propellant grains 90 the total grain weight may range (in passenger side applications) from about 10 grams to about 12 grams, and is preferably less than about 15 grams. In this case, it is preferable to utilize between about 150 grams and about 190 grams of pressurized medium 36 with the oxygen being between about 10% to about 30% of this medium 26 on a molar basis. More specifically, when about 169 grams of the pressurized medium 36 is utilized, with about 15% of this on a mole percentage basis being oxygen, the total weight of the propellant grains 90 may be about 10.4 grams. For driver side applications, the desired/required amount of propellant grains 90 may be about 5 grams and for a side inflator application approximately 1.5 grams.

The above-identified reduction in the amount of gun-type propellant in comparison to the above-identified FN 1061-10 propellant composition may be also expressed as a ratio of the weight of the pressurized medium 36 to the total weight Of propellant grains 90. With regard to the FN 1061-10 propellant, the assignee of this application presently uses a ratio of about 7.04 for the weight of argon (i.e., the stored gas and corresponding with the pressurized medium 36 associated with the present invention) to the weight of FN 1061-10 propellant. With regard to the use of a gun-type propellant, to achieve an inflator with the same output, weight, and size as an inflator with FN 1061-10, the ratio of the weight of the pressurized medium 36 to the total weight of the propellant grains 90 ranges from about 10 to about 20, and more preferably from about 14 to about 18, and is most preferably greater than about 15. As can be appreciated, these ratios may be further increased by use of hotter propellants, which would require even less propellant. In this regard, because the output gases of gun-type propellants are essentially free of hot particulate matter, the inflator can produce output gases at a higher temperature than can a particulate-laden inflator such as current state-of-the-art hybrids. This increase in temperature will allow the inflator to be smaller and lighter still, since the hotter gas is relatively more expansive. In addition to the foregoing, generally size and weight reductions of the inflator structure may be achieved when using gun-type propellants. For instance, when using even a ratio of 7.04 for gun-type propellants in an inflator, the same output may be achieved as in the case of using the same ratio of FN 1061-10, but the inflator with the gun-type propellant may be about 50% lighter and smaller than the inflator using FN 1061-10. The ratio of 7.04 can be used equally well for driver side applications and side inflators in the noted manner.

The above-identified reduction in the amount of gun-type propellant in comparison to the above-identified FN 1061-10 propellant composition may also be expressed as a ratio of the gram moles of the total gas output (i.e., the combination of the propellant gases and the pressurized medium 36) to the total weight of the propellant grains 90. With regard to the FN 1061-10 propellant, the assignee of the application presently uses a ratio of about 0.192 gram moles/gram of propellant for the moles of the output gas to the weight of the propellant. In comparison and generally in the case of a gun-type propellant for an inflator of the same output, weight, and size, the ratio of the moles of the output gas to the total weight of the propellant grains 90 may range from about 0.35 gram moles per gram of propellant to about 0.6 gram moles per gram of propellant, more preferably from about 0.4 gram moles per gram of propellant to about 0.5 gram moles per gram of propellant, and is most preferably about 0.5 gram moles per gram of propellant. As noted above, for hybrid inflators using gun-type propellants and even using a ratio of 0.192 gram moles/gram of propellant, the inflator output is the same as a hybrid inflator using FN 1061-10, but the weight and size of the gun-type propellant hybrid inflator is reduced about 50%.

The use of multiple gases for the pressurized medium 36 allows for the use of at least a gun-type propellant formulation for the propellant grains 90. Generally, the pressurized medium 36 is composed of at least one inert gas and oxygen. Appropriate inert gases include argon, nitrogen, helium, and neon, with argon being preferred. The oxygen portion of the pressurized medium is multi-functional. Initially, the reaction of the oxygen with the gaseous combustion products of the gun-type propellant of the propellant grains 90 provides a source of heat which contributes to the expansion of the inert gas. This allows at least in part for a reduction in the amount of propellant which is required for the gas generator 82. Moreover, the reaction of the oxygen with the propellant combustion products also reduces any existing toxicity levels of the propellant gases to acceptable levels. For instance, the oxygen will convert preferably a substantial portion of existing carbon monoxide to carbon dioxide (e.g., convert at least about 85% of CO to $CO_2$) and existing hydrogen to water vapor (e.g., convert at least about 80% of the $H_2$ to $H_2O$), and a substantial portion of the unburned hydrocarbons will be similarly eliminated (e.g., eliminate at least about 75% of the hydrocarbons). As such, the performance of the gas generator 82 as discussed above is significantly improved. That is, the medium 36 and including the oxygen is drawn into the gas generator housing 86 through the inlet nozzle 98 on the end 96 of the housing 86 by the pressure differential produced by the flow of the pressurized medium 36 by the sidewall of the gas generator housing 86 having the discharge nozzles 200 thereon. As a result, there is a mixing of the medium 36 with the CO and hydrogen-rich combustion products of the gas generant which dramatically improves the overall combustion efficiency of the gas generant, the mixing of the combustion products of the gas generant with the oxygen-rich medium 36, and the burning rate of the propellant grains 90. Gases are then drawn out of the discharge nozzles 200 on the sidewall of the housing 86. The above configuration of the gas generator housing 86 thereby greatly improves upon the performance of the inflator 30 (e.g., by promoting the quick and efficient mixing of the oxygen with the propellant gases).

The amount of the at least one inert gas, on a molar basis, is generally between about 70% and about 90% and the amount of oxygen, on a molar basis, is generally between about 10% and about 30%. Accordingly, the at least one inert gas is greater in amount, on a molar basis, than any nitrogen present in the pressurized medium and at least a majority of the pressurized medium is different, on a molar basis, from air. However, and as noted above, the pressurized medium may include from about 70% to about 92% of the inert fluid and from about 8% to about 30% of the oxygen on a molar basis. Generally, it is desirable to use an amount of oxygen in excess of that based upon theoretical conversions. However, it is also generally desirable to not have more than about 20% (molar) oxygen in the output gas (i.e., the combination of the propellant gases and the pressurized medium).

The inflator 30 may be assembled in the following manner. Initially, the gas generator 82 is assembled, such as by: 1) inserting the baffle 100 and screen 104 in the gas generator housing 86 adjacent the discharge end 96; 2) inserting the propellant sleeve 94 in the gas Generator housing 86; 3) positioning the propellant grains 90 within the propellant sleeve 94; 4) inserting the baffle 112 and retainer 108 in the gas generator housing 86 adjacent the end of the propellant sleeve 94 opposite the discharge end 96 of the generator; 5) inserting the primer holder 116, with the ignition/booster material 144 and charge cup 148, in the gas generator housing 86; and 6) inserting the actuation guide 140, belleville washer 136, and actuation piston 124 into the gas generator housing 86. Thereafter, the various parts are interconnected, such as by welding the gas generator housing 86 to the orifice sleeve 74, by welding the diffuser 38 to the boss 66 after positioning the projectile 50 and initiator 46 in the diffuser 38, welding the closure disk 70 between the boss 66 and orifice sleeve 74, and welding the boss 66 to the inflator housing 34. With the above structure intact, the pressurized medium 36 may be introduced into the inflator housing 34. In this regard and in the case of multiple gases, the argon and oxygen may be separately introduced (e.g., first introduce the argon and/or other inert gases and then the oxygen or vice versa) into the inflator housing 34 through the end plug 42 which is welded to the end of the inflator housing 34, or introduced in the pre-mixed state.

The following examples further assist in the description of various features associated with the use of gun-type propellants in hybrid inflators.

EXAMPLE 1

The above-noted HPC-96 propellant was used to form the propellant grains 90 having a total weight of 18 grams. Each propellant grain 90 had the configuration generally illustrated in FIG. 2, and had a length or thickness of about 0.52 inches, an outer diameter of about 0.29 inches, and a web thickness of about 0.105 inches (one-half of the difference between the inner and outer diameters of the propellant grain 90). Moreover, the HPC-96 propellant had the following properties when ignited in the presence of air: an impetus of 363,493 ft-lbs/lb; a heat of explosion of 1,062 calories/gram; a TV of 3490·K; a molecular weight of the gases of 26.7 grams/mole; a specific heat ratio of 1.2196; and a solid density of 1.65 grams/cubic centimeter. The gas composition, based upon theoretical calculations of normal compositions and assuming a combustion at gun pressures expanded to atmospheric pressure, on a molar percentage basis, was: about 26.5% carbon monoxide; about 19.1% water; about 26.2% carbon dioxide; about 13.7% nitrogen; about 14.2% hydrogen; and about 0.3% other gases.

When the propellant grains 90 of HPC-96 were subjected to the industry standard Taliani thermal stability test at a temperature of 120° C., the grains 90 began to discolor within about 40 minutes and ignited within about 5 hours. This reduces the desirability of using the HPC-96 propellant for the propellant grains 90 since one current industry standard requires that a propellant for an inflatable safety system does not degrade substantially when exposed to a temperature of 107° C. for a period of 400 hours, and that the propellant thereafter ignite when exposed to its auto-ignition temperature. However, the HPC-96 propellant does illustrate certain principles of the present invention and is thus included herein.

With regard to HPC-96 propellant grains 90, about 169 grams of the pressurized medium 36 was provided to the inflator housing 34 and consisted, on a molar percentage basis, of about 5% oxygen and about 95% argon. The inflator 30 had four orifice ports 78 on the orifice sleeve 74 with each having a diameter of about 0.266", and the gas generator nozzle 98 had a diameter of about 0.469". No discharge nozzles 200 were provided on the sidewall of the gas generator housing 86. As such, no pressurized medium 36 was drawn into the gas generator 82 during operation and all discharge was through the nozzle 98.

Figure 3:
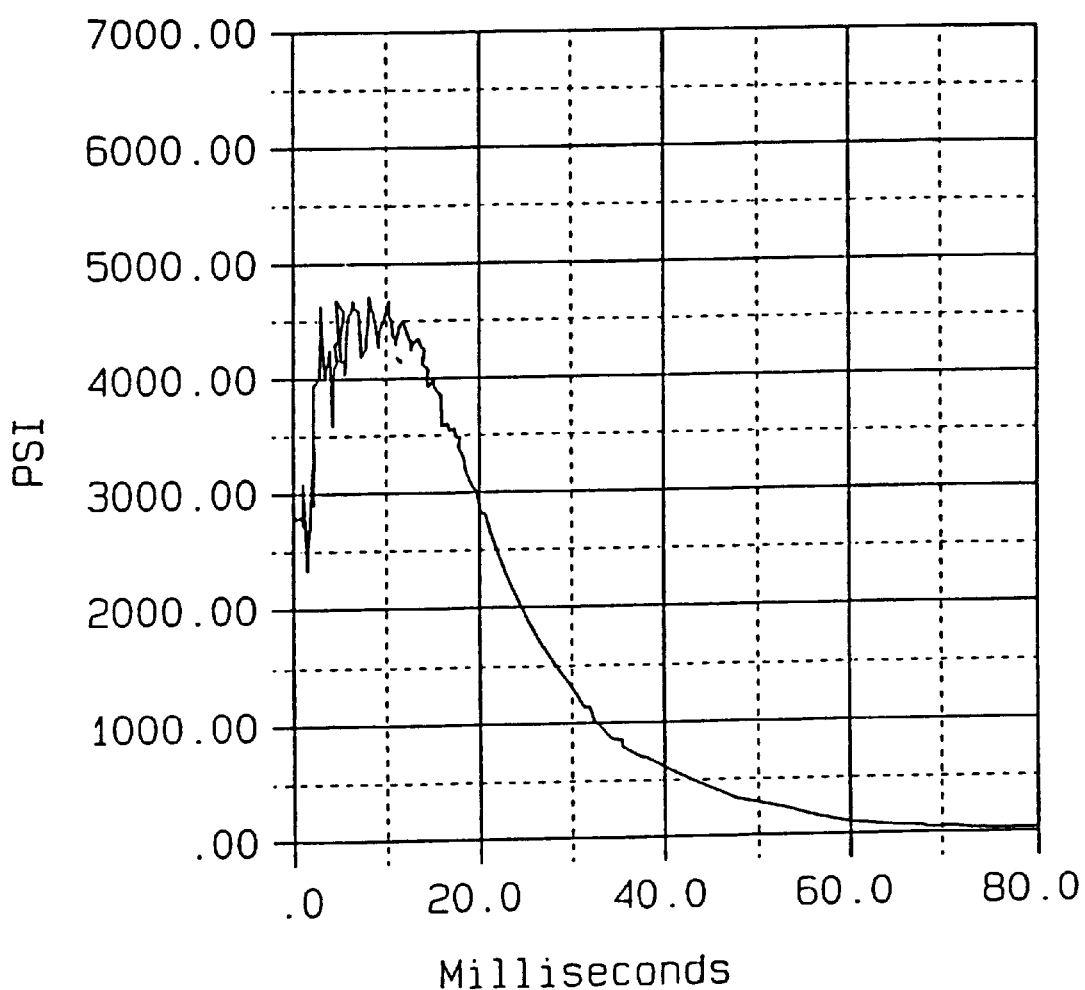
FIG. 3 is an inflator internal pressure versus time performance curve for the propellant composition of Example 2.
Figure 4:
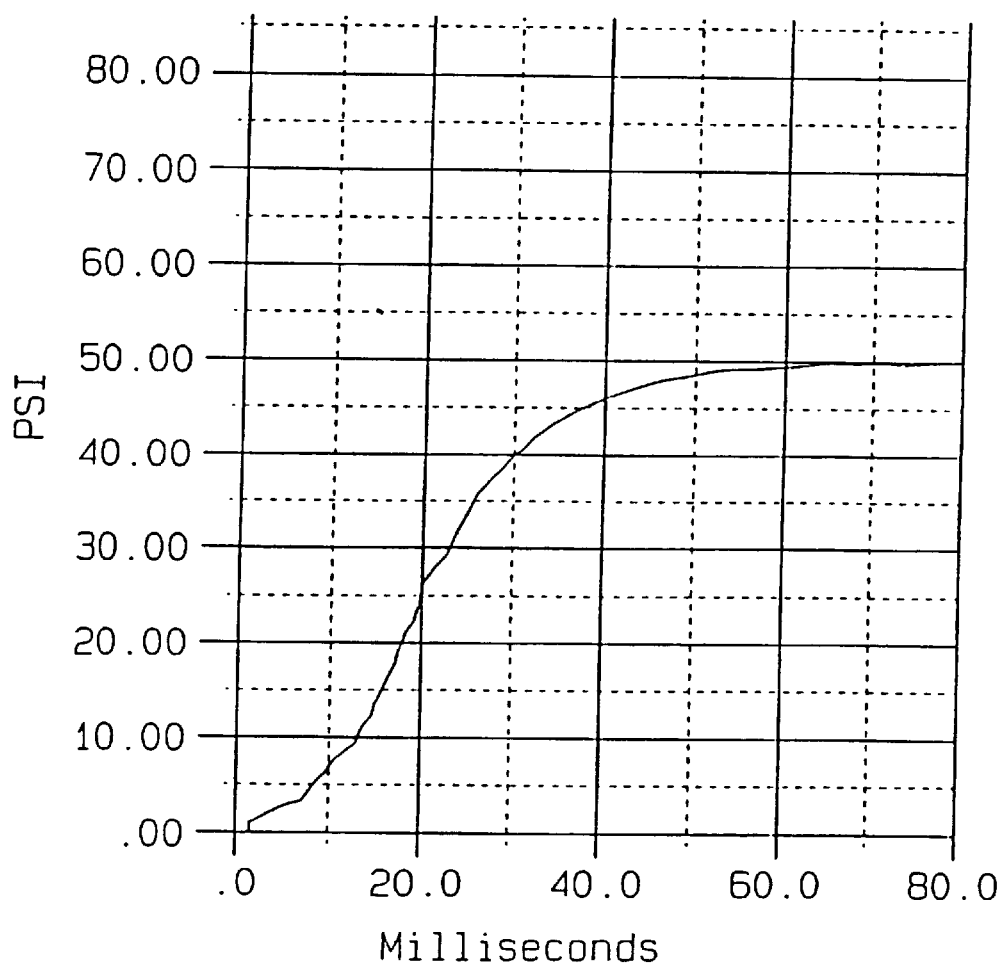
FIG. 4 is a receiving tank pressure versus time performance curve for the propellant composition of Example 2.

The pressure variation within the inflator housing 34 during operation of the inflator 30 was similar to that presented in FIG. 3, and the pressure within a 100-liter tank fluidly interconnected with the inflator 30 was similar to that illustrated in FIG. 4 and is generally representative of the pressure buildup within the air/safety bag 18. The gaseous output from the inflator 30 included, on a weight percentage basis, about 1.2% carbon monoxide, about 1.5% carbon dioxide, greater than about 2% hydrogen, and about 60 ppm of $NO_x$. Consequently, the use of argon and oxygen in the noted proportions significantly reduced the amount of carbon monoxide and hydrogen when compared to the theoretical gaseous output of the HPC-96 propellant noted above. In this example, the radial holes were not used, and only a single gas generator outlet was used.

EXAMPLE 2

The procedure of Example 1 was repeated but 10.4 grams of HPC-96 propellant was used for the grains 90 and about 164.4 grams of a pressurized medium 36 was used with the composition being, on a molar percentage basis, about 15% oxygen and about 85% argon. The performance curves for the inflator 30 when actuated with these propellant grains 90 are illustrated in FIGS. 3 and 4 and the inflator 30 was configured in the manner discussed in Example 1. Moreover, the gaseous output from the inflator 30 included, on a molar percentage basis, about 2.4% carbon dioxide, about 1000 ppm carbon monoxide, about 70 ppm $NO_x$, about 38 ppm $NO_2$, and about 0 ppm of hydrogen. Consequently, with the increase in the amount of oxygen to 15% from the 5% of Example 1, the amount of carbon monoxide was significantly reduced without an appreciable increase in NO and $NO_2$. Moreover, this also allowed for the use of significantly less propellant.

EXAMPLE 3

The procedure of Example 1 was repeated twice using 10.4 grams of HPC 96 and 169.0 grams of pressurized medium 36 composed, on a molar percentage basis, of about 15% oxygen and about 85% argon. The performance curves for the inflator 30 were similar to those presented in FIGS. 3–4 and the inflator 30 was configured in the manner discussed in Example 1. Moreover, the gaseous output from the inflator 30 included about 1000 ppm and 800 ppm carbon monoxide, respectively, about 1.0% and 1.2% carbon dioxide, respectively, about 60 ppm and 50 ppm $NO_x$, respectively, and about 23 ppm and 20 ppm $NO_2$, respectively. Consequently, the increase in the amount of oxygen to 15% and the reduction of the amount of HPC 96 reduced the amount of carbon monoxide without an appreciable effect upon NO and $NO_2$. Moreover, the increased amount of oxygen allowed for the use of less propellant.

As noted above, two existing "traditional" gun-type propellants were initially considered for this application—conventional double-base gun propellants and low vulnerability nitramine (LOVA) gun propellants. With conventional double-base gun propellants, the system performs as expected, but will not pass industry standards for long-term storage (e.g., 400 hours at 107° C.). With LOVA gun propellants, the system performance was determined to be unsatisfactory unless the propellant is burned at a very high pressure (e.g., above 9,000 psi), which adds weight, cost, and complexity to the design. Generally, it is desirable for operating pressures of no more than about 4,000 psi to be utilized for the inflator. Because no existing propellant is satisfactory for this application under these conditions, a new propellant formulation was developed which constitutes a new class of propellant—a propellant which combines the ballistic properties of double base propellants (ignites and burns well at low pressure) with the storage properties of nitramine LOVA propellants (performs well after storage at 107° C. for 400 hours). This class of propellants will be referred to as a hybrid propellant.

Thermally stable gun-type propellants, unlike nitrocellulose-based propellants like HPC-96, when used as the formulation for the propellant grains 90 include a secondary explosive, namely a nitramine (RDX) in the case of the LOVA propellants. Other appropriate secondary explosives which may be used in the formulation of the propellant grains 90 include another nitramine, namely HMX (cyclotetramethylenetetrani-tramine), as well as PETN (pentaerythritol tetranitrate) and TAGN (triaminoguanidine nitrate). Table 1 below provides certain combustion properties for the RDX, HMX, and PETN secondary explosives.

TABLE 1

| TYPE | FLAME TEMPERATURE (° K.) (at 3,000 psi) | COMBUSTION GASES PRODUCED w/o excess $O_2$ (mole %) |
|---|---|---|
| RDX | 3348 | 33% $N_2$ |
| | | 25% CO |
| | | 23% $H_2O$ |
| | | 9% $H_2$ |
| | | 8% $CO_2$ |
| | | remainder others |
| HMX | 3340 | 33% $N_2$ |
| | | 25% CO |
| | | 23% $H_2O$ |
| | | 9% $H_2$ |
| | | 8% $CO_2$ |
| | | remainder others |
| PETN | 3444 | 19.5% CO |
| | | 17% $N_2$ |
| | | 3% $H_2$ |
| | | 30% $H_2O$ |
| | | 24% $CO_2$ |

Generally, in order to achieve a desired combination of certain ballistic properties and long-term thermal stability (e.g., to attempt to achieve the ballistic characteristics of a double-base propellant and the long-term aging characteristics or long-term thermal stability of a LOVA propellant), a secondary explosive may be combined with a binder system as the formulation for the propellant grains 90 (as noted above "hybrid propellants"). The phrase "binder system", as used herein, refers to one or more compounds added to the propellant which are useful for modifying the physical, chemical, and/or ballistic properties of the propellant. Useful binder systems include those which incorporate propellant additives selected from the group consisting of binders, plasticizers, stabilizers, opacifiers, and combinations thereof.

Hybrid propellants for the propellant grains 90 in the hybrid inflator 30 exhibit good ballistic properties (i.e., burn rate and combustion temperature at a relatively low operating pressure), and exhibit acceptable long-term stability (e.g., one industry test for assessing long-term thermal stability being a statistically sufficient number of samples withstanding (not igniting) exposure to a temperature of 107° C. for a period of 400 hours). Another test is inflators withstanding, without unacceptable loss of performance, (which is typically established/specified by the customer), exposures to a temperature of 100° C. for 400 hours. More particularly, propellant grains 90 formed from a hybrid propellant burn at a combustion temperature ranging from about 2,000·K to about 3,800·K, at a rate ranging of about 0.1 inches per second (0.25 cm/sec) to about 1 inch per second (2.5 cm/sec), and at an operating pressure (the pressure within the gas generator housing 84) of about 4,000 psi (27.6 MPa) or less. More preferably, the propellant grains 90 formed from a hybrid propellant burn at a combustion temperature ranging from about 2,000·K to about 3,800·K, at a rate ranging from about 0.3 inches per second (0.76 cm/sec) to about 0.5 inches per second (1.26 cm/sec), and at an operating pressure of about 4,000 psi (27.6 MPa) or less.

In general, the hybrid propellant formulations comprise from about 50 wt % to about 90 wt % of a secondary explosive and from about 10 wt % to about 50 wt % of a binder system. More typically, these propellant formulations include from about 60 wt % to about 80 wt % of a secondary explosive and from about 20 wt % to about 40 wt % of a binder system. Preferably, the propellant formulation includes from about 70 wt % to about 80 wt % of a particular secondary explosive and from about 20 wt % to about 30 wt % of a binder system. Other additives and unavoidable impurities can also be present in these propellant compositions in minute amounts (i.e., in amounts less than about 5 wt % of the composition).

Typically, a resinous binder will be part of the binder system for a hybrid propellant formulation for the propellant grains 90. Nearly any type of binder soluble in common solvents (i.e., acetone, lower alcohols, etc.) can be used. However, it is generally desirable that the binder be an active or energetic compound. That is, it is desirable for the binder to be one which is easily combustible at the above-noted desired combustion temperatures and operating pressures. Furthermore, when using a binder in combination with a plasticizer, it is of course desirable that the binder be compatible with the plasticizer. Typical binders suitable for use in the propellant compositions include, but are not limited to, CA (cellulose acetate), CAB (cellulose acetate butyrate), EC (ethyl cellulose), and PVA (polyvinyl acetate). Other binders which may be appropriate for use in one or more aspects associated with the present invention include CAP (cellulose acetate propionate), azide polymer, polybutadien, polybutadien hydride, polyurethane and the combination thereof. The noted azide polymer is one of a homopolymer and copolymer comprising a monomer selected from the group consisting of GA (glycidyl azide) monomer, BAMO (3,3-bis(azidemethyl) oxetane)) monomer, and AMMO (azidemethyl methyloxetane) monomer. Moreover, GAP (an energetic glycidyl azide polymer) may be utilized as a binder component and such burns substantially more vigorously than CA. As such, it may be desirable to utilize only GAP as the binder with a secondary explosive. However, due to the significant differences in cost currently between GAP and CA, a hybrid propellant formulation may include both GAP and CA binder components.

Plasticizers can also be part of the binder system for the hybrid propellant formulation for the propellant grains 90. As noted, the plasticizer should be compatible with the binder. Moreover, it is generally desirable to use a binder system which is extrudable. Furthermore, at least for certain secondary explosives (e.g., nitramines) it is desirable to use energetic plasticizers, that is plasticizers that are capable of stable combustion within the above-noted operating temperatures and pressures. Useful energetic plasticizers include, but are not limited to, those selected from the group consisting of nitrate ester plasticizers such as TMETN (trimethylolethane trinitrate), BTTN (butanetriol trinitrate), and TEGDN (triethyleneglycol dinitrate) and glycidyl azide plasticizer and other compounds such as NG (nitroglycerin), and BDNPA/F (bis (2,2-dinitropropyl) acetal/formal). Another plasticizer that may be appropriate for one or more aspects associated with the present invention includes ATEC (acetyl triethyl citrate).

Stabilizers may also be included in the binder system for the hybrid propellant formulation for the propellant grains 90. For instance, certain binders and/or plasticizers such as the above-noted nitrate ester plasticizers will decompose upon exposure to certain temperatures, and may affect ignition of the propellant grains 90 (i.e., upon exposure to certain temperatures the nitrate ester plasticizer will thermally decompose to the degree where ignition occurs). Consequently, stabilizers may be included in the hybrid propellant formulation which will "react" with the thermally decomposing binder and/or plasticizer to maintain stability (e.g., reduce the potential for premature ignition of the propellant) and thereby enhance the long-term stability of the hybrid propellant formulation. For instance, in the case of a nitrate ester plasticizer, useful stabilizers for the propellant formulation include those which are active materials, yet are nitrate acceptors. Suitable stabilizers include, but are not limited to, ethyl centralite (symdiethyldiphenylurea), DPA (diphenylamine), and resorcinol.

One hybrid propellant formulation which has the desired ballistic properties and which has provided sufficient indications of suitable long-term stability include the combination of the nitramine secondary explosive RDX (hexahydrotrinitrotriazine) with a binder system including the binder CA (cellulose acetate), the plasticizer TMETN (trimethylolethane trinitrate), and the stabilizer EC (ethyl centralite). Generally, this hybrid propellant formulation may comprise at least about 70 wt % RDX, from about 5 wt % to about 15 wt % CA, from about 5 wt % to about 15 wt % TMETN, and no more than about 2 wt % EC. These general relative amounts provide the desired ballistic and long-term aging properties for the hybrid propellant. However, it will be appreciated that if propellant grains 90 are to be formed by extrusion from this formulation, refinements of the relative amounts within the noted ranges may be necessary.

For one or more aspects associated with the present invention, the propellant may comprise about 70 wt % RDX (hexahydrotrinitrotriazine), from about 5 wt % to about 15 wt % CA (cellulose acetate), and one of GAP (glycidyl azide polymer) and ATEC (acetyl triethyl citrate) ranging from about 5 wt % to about 15 wt %. In a case where the binder system includes the mixture of a binder, a plasticizer and a stabilizer, the ratio of each agent in the mixture is preferably from about 5 to about 30 wt %, from zero to about 20 wt % and from 0 to 5 wt % in order.

Another hybrid propellant formulation which has the desired ballistic properties and which has provided sufficient indications of suitable long-term stability includes the nitramine secondary explosive RDX with a binder system including the binders CA and GAP (glycidyl azide polymer), and a suitable plasticizer (e.g., GAP plasticizer, TMETN, ATEC and combinations thereof). Generally, this hybrid propellant formulation may comprise from at least about 70 wt % and typically between about 70 wt % and 80% RDX, from about 5 wt % to about 15 wt % CA, and from about 5 wt % to about 15 wt % GAP, and about 5 wt % to 15 wt % plasticizer. These general relative amounts provide the desired ballistic and long-term aging properties for the hybrid propellant. However, it will be appreciated that if propellant grains 90 are to be formed by extrusion from this formulation, refinements of the relative amounts within the noted ranges may be necessary.

In the case of hybrid propellants disclosed herein, as in the case of the double-base and LOVA propellants discussed above, during combustion significant quantities of carbon monoxide and hydrogen are produced (e.g., 35% CO and 19% $H_2$). Again, the formation of carbon monoxide and hydrogen gases through combustion of an inflator propellant would normally be unacceptable for an automotive inflatable safety system. However, when these types of hybrid propellants are used in the hybrid inflator 30 and as noted above, the pressurized medium 36 includes oxygen such that a substantial portion of the carbon monoxide and hydrogen (e.g., 95%) are converted during combustion or as part of a post-combustion reaction to harmless carbon dioxide and water vapor. The use of stored oxygen gas is particularly desirable because it obviates the need to include an oxygen source (e.g., potassium perchlorate) in the hybrid propellant formulation. Moreover, the highly exothermic reaction between the produced combustion gases of the propellant with the stored oxygen is particularly desirable because it enhances the heating value of the propellant, thereby minimizing the amount of propellant required for expanding the air/safety bag.

The hybrid propellants, when formulated into the propellant grains 90 and incorporated into the hybrid inflator 30, may be used in the amounts specified above with regard to the gun-type propellants and specifically including the particulars presented above with regard to the relative amounts of propellant grains 90 and pressurized medium 36. Moreover, the relative amounts of oxygen and the one inert gas for the pressurized medium 36 may also be used in the case of the hybrid propellants disclosed herein.

The following examples further assist in illustrating pertinent features of hybrid propellant formulations which include a secondary explosive and a binder system. As previously noted, all references to "wt %" refers to weight percentage.

EXAMPLE 4

A hybrid propellant composition comprising at least about 70 wt % RDX (hexahydrotrinitrotriazine), from about 5 wt % to about 15 wt % CA (cellulose acetate), from about 5 wt % to about 15 wt % TMETN (trimethylolethane trinitrate) and no more than about 2 wt % ethyl centralite was prepared and formed into cylindrical grains having an average density of about 1.7132 g/cc. A 10 g test sample was placed into a heavywall bomb chamber and fired into a tank. The test sample had a combustion temperature of about 2578·K and exhibited acceptable ballistic properties (i.e., a burn rate of 0.47 inches per second (1.18 cm/sec) at 4000 psi (27.6 MPa)). Generally, the performance curves generally approximated those presented in FIGS. 3–4. The gas produced contained about 36% carbon monoxide, about 24% nitrogen, about 19% hydrogen, about 16% water vapor and about 5% carbon dioxide. Long-term thermal stability of the composition was assessed and determined to be acceptable (e.g., the propellant itself was exposed to a temperature of 107° C. for 400 hours and did not ignite; the propellant when contained within a hybrid inflator did not ignite when exposed to a temperature of 107° C. for 400 hours, and thereafter upon activation of the same, the performance of the inflator was substantially unaffected by the heat treatment).

EXAMPLE 5

A propellant composition comprising at least about 70 wt % RDX (hexahydrotrinitrotriazine), from about 5 wt % to about 15 wt % cellulose acetate, and from about 5 wt % to about 15 wt % GAP (glycidyl azide polymer) was prepared and formed into cylindrical grains having an average density of about 1.6857 g/cc. A 10 g test sample was placed into a heavywall bomb chamber and fired into a tank. The test sample had a combustion temperature of about 2,357·K and exhibited acceptable ballistic properties (i.e., a burn rate of 0.48 inches per second (1.18 cm/sec) at 4,000 psi (27.6 MPa)). Generally, the performance curves generally approximated those presented in FIGS. 3–4. The exhaust gas produced contained about 37% carbon monoxide, about 25% hydrogen, about 25% nitrogen, about 10% water vapor and about 3% carbon dioxide. Long-term thermal stability of the composition was assessed and determined to be acceptable (e.g., the propellant itself was exposed to a temperature of 107° C. for 400 hours and did not ignite; the propellant when contained within a hybrid inflator did not ignite when exposed to a temperature of 107° C. for 400 hours, and thereafter upon activation of the same, the performance of the inflator was substantially unaffected by the heat treatment).

Another characterization of a propellant which may be used in one or more aspects associated the present invention comprises hexogen (RDX) ranging from about 1 to 99 parts by weight, octogen (HMX) ranging from about 1 to 99 parts by weight, and a binder mixed with 100 parts by weight of the sum of hexogen and octogen. The binder ranges from 5 to 50 parts by weight. Preferably, the noted propellant comprises the hexogen (RDX) ranging from 80 to 95 parts by weight and the octogen (HEM) ranging from about 5 to 20 parts by weight.

The above-noted propellant may be used in a hybrid inflator, such as those described herein. Again, a hybrid inflator generally comprises a pressurized gas chamber containing a pressurized fluid, a gas-generating chamber containing the propellant, an igniter assembly, and a rupture disk. The pressurized fluid substantially consists of an inert fluid and oxygen. The propellant is ignited by the igniter assembly when, for instance, a certain magnitude of deceleration occurs, and is burnt to generate gaseous products, (e.g., carbon monoxide and hydrogen), which are reactive with oxygen. Carbon monoxide and hydrogen react with oxygen in the pressurized gas to generate carbon monoxide and a water vapor, while increasing the pressure in the gas-generating chamber. Then, the rupture disk is opened to supply the carbon dioxide, water vapor and inert gas to the air/safety bag 18 (FIG. 1). This causes the air/safety bag 18 (FIG. 1) to be inflated.

The above-noted propellant again comprises hexogen (RDX), octogen (HMX) and a binder. The contents of RDX and HMX range from 1 to 99 parts by weight and from 1 to 99 parts by weight, respectively. Preferably, the contents of RDX and HMX range from 80 to 95 parts by weight and 5 to 20 parts by weight, respectively. A binder is mixed with 100 parts by weight of the sum of hexogen and octogen and ranges form 5 to 50 parts by weight.

Typical binders suitable for use with the above-noted propellant include, but are not limited to, polyurethanes (PU), cellulose derivatives such as ethyl cellulose (EC), cellulose acetate butyrate (CAB), cellulose acetate propionate (CAP), polybutadiens such as hydroxy-terminated polybutadien (HTPB), glycidyl acid polymers such as glycidyl nitrate polymer (polyglyn), azide polymers such as glycidyl azide polymer (GAP), and 3-nitratemethyl-3-methyl-oxethane polymer (polynimmo). Cellulose acetate butyrate (CAB) and/or glycidyl azide polymer (GAP) are preferable.

The above-noted propellant may include an additive selected from the group consisting of a plasticizer, a stabilizer and the combination thereof. The plasticizer may be selected form the group consisting of TMETN (trimethylolethane trinitrate), BTTN (butanetriol trinitrate), TEGDN (triethylen glycol dinitrate), glycidyl azide, NG (nitroglycerin), BDNPA/F (bis (2,2-dinitropropyl) acetal/formal, and ATEC (acetyl triethyl citrate).

Stabilizers may be used as the above-noted propellant, which include ethyl centralite, diphenyl amine, resorcinol, akaldite II, amyl alcohol, urea, petroleum jelly.

The plasticizer may be preferably added in the range of 0 to 30 parts by weight to total 100 parts by weight of RDX, HMX, and binder. The content of the stabilizer may be preferably added in the range of 0 to 5 parts by weight to total 100 parts by weight of RDX, HMX and the binder. The above-noted propellant may be formed in powder, particle and pellet shapes, preferably in the pellet shape.

A number of examples of compositions of the above-noted propellant are presented below.

EXAMPLE 6

The following materials were mixed with each other and formed in pellets, then charged into a hybrid inflator, which comprises a pressurized gas chamber, a gas-generating chamber, an igniter assembly, and a rupture disk. The hybrid inflator was activated. As a result, no smoke of KCL was generated.

Hexogen (RDX) . . . 68 parts by weight
Ocotgen (HMX) . . . 8 parts by weight
Cellulose Acetate Butyrate (CAB) . . . 12 parts by weight
Glycidyl azide polymer (GAP) . . . 12 parts by weight
NOTE: The content of the binder (CAB and GAP) to 100 parts by weight of RDX and HMX is about 16 parts by weight.

EXAMPLE 7

The following materials were mixed with each other and formed in pellets, then charged into the hybrid inflator which has the same structure as in Example 6. The hybrid inflator was activated. As a result, no smoke was generated.

Hexogen (RDX) . . . 72 parts by weight
Octogen (HMx) . . . 4 parts by weight
Cellulose Acetate Butyrate (CAB) . . . 12 parts by weight
Glycidyl azide polymer (GAP) . . . 12 parts by weight
NOTE: The content of the binder (CAB and GAP) to 100 parts by weight of RDX and HDX is about 32 parts by weight.

EXAMPLE 8

The following materials were mixed with each other and formed in pellets, then charged into the hybrid inflator which has the same structure as in the Example 6. The hybrid inflator was activated. As a result, no smoke was generated.

Hexogen (HMX) . . . 64 parts by weight
Octogen (HMX) . . . 12 parts by weight
Cellulose Acetate Butyrate (CAB) . . . 12 parts by weight
Glycidyl azide polymer (GAP) . . . 12 parts by weight
NOTE: The content of the binder (CAB and GAP) to 100 parts by weight of RDX and HMX is about 32 parts by weight.

EXAMPLE 9

The following materials were mixed with each other and formed in pellets, then charged into the hybrid inflator which has the same structure as in Example 6. The hybrid inflator was activated. As a result, no smoke was generated.

Hexogen (RDX) . . . 75 parts by weight
Octogen (HMX) . . . 1 parts by weight
Cellulose Acetate Butyrate (CAB) . . . 12 parts by weight
Glycidyl azide polymer (GAP) . . . 12 parts by weight
NOTE: The content of the binder (CAB and GAP) to 100 parts by weight of RDX and HMx is about 32 parts by weight.

EXAMPLE 10

The following materials were mixed with each other and formed in pellets, then charged into the hybrid inflator which has the same structure as in Example 6. The hybrid inflator was activated. As a result, no smoke was generated.

Hexogen (RDX) . . . 1 parts by weight
Octogen (HMX) . . . 75 parts by weight
Cellulose Acetate Butyrate (CAB) . . . 12 parts by weight
Glycidyl azide polymer (GAP) . . . 12 parts by weight
NOTE: The content of the binder (CAB and GAP) to 100 parts by weight of RDX and HMX is about 32 parts by weight.

EXAMPLE 11

The following materials were mixed with each other and formed in pellets, then charged into the hybrid inflator which has the same structure as in Example 6. The hybrid inflator was activated. As a result, no smoke was generated.

Hexogen (RDX) . . . 38 parts by weight
Octogen (HMX) . . . 38 parts by weight
Cellulose Acetate Butyrate (CAB) . . . 12 parts by weight
Glycidyl azide polymer (GAP) . . . 12 parts by weight
NOTE: The content of the binder (CAB and GAP) to 100 parts by weight of RDX and HMX is about 32 parts by weight.

EXAMPLE 12

The following materials were mixed with each other and formed in pellets, then charged into the hybrid inflator which has the same structure as in Example 6. The hybrid inflator was activated. As a result, no smoke was generated.

Hexogen (RDX) . . . 68 parts by weight
Octogen (HMX) . . . 8 parts by weight
Cellulose Acetate Butyrate (CAB) . . . 12 parts by weight
Glycidyl azide polymer (GAP) . . . 12 parts by weight
Ethyl centralite . . . 2 parts by weight
NOTE: The content of the binder (CAB and GAP) to 100 parts by weight of RDX and HMX is about 32 parts by weight.

EXAMPLE 13

The following materials were mixed with each other and formed in pellets, then charged into the hybrid inflator which has the same structure as in Example 6. The hybrid inflator was activated. As a result, no smoke was generated.

Hexogen (RDX) . . . 68 parts by weight
Octogen (HMx) . . . 8 parts by weight
Cellulose Acetate Butyrate (CAB) . . . 12 parts by weight
Glycidyl azide polymer (GAP) . . . 12 parts by weight
Trimethylolethane trinitrate . . . 20 parts by weight (TMETN)
NOTE: The content of the binder (CAB and GAP) to 100 parts by weight of RDX and HMX is about 32 parts by weight.

EXAMPLE 14

The following materials were mixed with each other and formed in pellets, then charged into the hybrid inflator which has the same structure as in Example 6. The hybrid inflator was activated. As a result, any smoke was not generated.

Hexogen (RDX) . . . 68 parts by weight
Octogen (HMX) . . . 8 parts by weight
Cellulose Acetate Butyrate (CAB) . . . 12 parts by weight
Glycidyl azide polymer (GAP) . . . 12 parts by weight
Ethyl centralite . . . 2 parts by weight
Trimethylolethane trinitrate . . . 20 parts by weight (TMETN)
NOTE: The content of the binder (CAB and GAP) to 100 parts by weight of RDX and HMX is about 32 parts by weight.

As mentioned above, the hybrid inflator, which does not generate KCl smoke when activated, can be made by use of the propellant comprising hexogen, octogen, and the binder.

Figure 5:
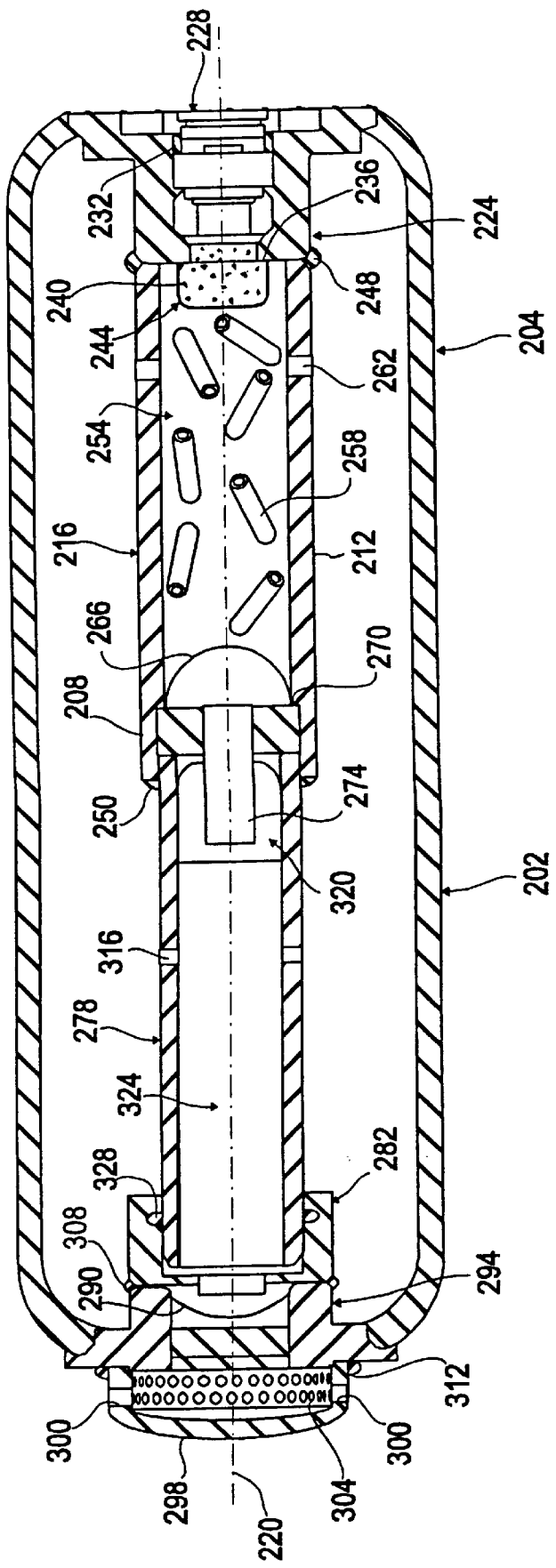
FIG. 5 is a longitudinal cross-sectional view of another embodiment of a hybrid inflator.

Another embodiment of a hybrid inflator which may be used in the inflatable safety system 10 of FIG. 1 is illustrated in FIGS. 5–7. Referring primarily to FIG. 5, the hybrid inflator 202 includes a typically cylindrical gas generator 208 and a typically cylindrical stored gas housing 204 which is concentrically positioned about the gas generator 208 and appropriately interconnected with the gas generator 208. Generally, the stored gas housing 204 (a third chamber) contains an appropriate pressurized medium and the gas generator 208 contains grains 258 of an appropriate propellant. A primary advantage of the inflator 202 is that its design affects a rapid pressurization of the region proximate the second closure disk 290 or main closure disk (which isolates the flow between the inflator 202 and the air/safety bag 18 (FIG. 1)), since that fluid pressure acts directly on the second closure disk 290 to "open" the same. Another significant advantage of the design of the inflator 202 is that it provides/allows for sufficient "mixing" of the propellant gases generated upon ignition and combustion of the propellant grains 258 with the pressurized medium. Consequently, the inflator 202 is particularly suited for use with the above-described compositions of gun type propellants and/or hybrid propellants, together with a multi component pressurized medium (e.g., one component being oxygen and the other component being at least one inert gas). That is, the design of the inflator 202 provides/allows for effective combustion of the propellant gases and/or gases generated by igniting the propellant grains 258 (e.g., gases generated by combustion of the ignition/booster material 240 as discussed below) with the pressurized medium to enhance operation of the inflatable safety system 10 (FIG. 1). This secondary combustion further enhances the rapid pressurization abilities of the inflator 202 for initiating flow to the air/safety bag (FIG. 1).

The gas generator 208 includes a cylindrical gas generator housing 212 which in the illustrated embodiment is defined by a first housing 216 and an axially aligned and interconnected second housing 278. One end of the first housing 216 is attached to an initiator adapter 224 (e.g., via welding at weld 248) to achieve a preferably hermetic seal since the entirety of the gas generator housing 212 contains a quantity of pressurized medium in the static state. The initiator adapter 224 retains an appropriate initiator 228 (e.g., an electrically activatable squib or other suitable pyrotechnic device) which is used to ignite the propellant grains 258 and which may be seated within an o-ring 232 to establish an appropriate seal. In order to isolate the initiator 228 from the pressurized medium within the gas generator 208, a first closure disk (a secondary closure disk) 236 is appropriately secured between the end of the first housing 216 and the end of the initiator adapter 224 to achieve a preferably hermetic seal via the weld 248.

The first housing 216 of the gas generator housing 212 defines a first chamber 254 which is disposed adjacent to and in axial alignment with the initiator 228. The first chamber 254 of the gas generator housing 212 principally contains the propellant grains 258 which, when ignited, generate propellant gases to augment the flow to the air/safety bag 18

(FIG. 1). Therefore, the first chamber 254 may also be characterized as a propellant or combustion chamber. In order to assist in the ignition of the propellant grains 258, an appropriate ignition/booster material 240 (e.g., an RDX/aluminum booster material having a composition of 89 wt % RDX, 11 wt % aluminum powder, possibly with 0.5 wt % to 5.0 wt % hydroxypropyl-cellulose added replacing 0.5 wt % to 5.0 wt % of the RDX and aluminum proportionally) may be positioned between the initiator 228 and the propellant grains 258 in alignment with the discharge from the initiator 228. As will be discussed below, the reaction products of the gases resulting from ignition of the ignition/booster material 240 may chemically react with the pressurized medium to further enhance the rapid pressurization-based flow initiation characteristics of the inflator 202. An appropriate booster cup 244 or the like retains the ignition/booster material 240 (which is typically in powder or dried slurry form) and such may be appropriately secured to the end of the initiator adapter 224 and/or the first housing 216 (e.g., by being retained between the adapter 224 and the housing 216 via the weld 248). The first chamber 254 may also include a screen 266 or the like to retain certain sized particulate matter therein while discharging propellant gases from the first chamber 254 to the second chamber 324 as discussed below. The capacity of the stored gas housing 204 of the inflator 202 is set greater than the capacity of the second chamber 324.

The first chamber 254 is fluidly interconnected with the stored gas housing 204 typically by at least one bleed orifice or port 262 (two in the illustrated embodiment) such that in the static state a quantity of pressurized medium is also contained within the first chamber 254. In the illustrated embodiment, the bleed port(s) 262 are radially extending (i.e., extending along a radius originating at the central longitudinal axis 220 and perpendicularly disposed relative to the axis 220). The use of the bleed port(s) 262 and the selection of the size and/or number of bleed ports 262 can be used to "tune" the performance of the inflator 202.

When at least one bleed port 262 is utilized, a certain amount of the flow of the propellant gases generated upon ignition of the propellant grains 258 is directed into the stored gas housing 204. When the above-noted types of propellants (e.g., gun-type, hybrid) and pressurized medium (e.g., a mixture of oxygen and an inert fluid (at least one inert gas)), some secondary combustion, namely a further combustion of the propellant gases will occur in the stored gas housing 204. Directing some of the propellant gases to the stored gas housing 204 from the first chamber 254 may be utilized to achieve a desired output or discharge to the air/safety bag 18, namely to achieve a desired rate of expansion of the air/safety bag 18. Specifically, it may be preferable to provide propellant gases to the stored gas housing 204 at a rate which maintains a substantially constant flow from the stored gas housing 204 into the second chamber 324 for a sufficient time as will be discussed below. Typically, only a minor portion of the generated propellant gases need to flow into the stored gas housing 204 during operation to affect the desired result (e.g., no more than about forty percent (40%), and more typically no more than about thirty percent (30%) of the flow of propellant gases is directed to the stored gas housing 204).

Even when the bleed ports 262 are utilized, the pressure increase in the stored gas housing 204 after ignition of the propellant grains 358 is significantly less than in many commercial hybrid designs. That is, the significant pressure increase commonly associated with ignition of the propellant grains 358 is substantially confined to the gas generator 208. Therefore, the "strength" requirements of the stored gas housing 204 may be reduced. This allows for use of a reduced wall thickness for the stored gas housing 204 and/or lighter materials, both of which decrease the weight of the inflator 202.

The principal flow of propellant gases from the first chamber 254 (e.g., at least about fifty percent (50%) of the total propellant gas flow, and typically at least about seventy percent (70%)) is to the second chamber 324 (known as the "afterburner" for reasons specified below) which is defined by the second housing 278 of the gas generator housing 212. At least one afterburner nozzle or aspirator 274 (a first interconnecting port) directs the flow from the first chamber 254 (principally propellant gases) into the second chamber 324 and thus provides the desired fluid interconnection. The afterburner nozzle 274 may be seated against a shoulder 270 on the interior of the first housing 216 and positioned therein prior to appropriately interconnecting the first housing 216 with the second housing 278 (e.g., via welding at weld 250).

In the illustrated embodiment, one end of the second housing 278 of the gas generator housing 212 is seated within an afterburner adapter 282 which has at least one gas generator outlet 286 therein. An o-ring 328 may be utilized between the second housing 278 and the adapter 282 to provide for an appropriate sealing interface. The afterburner adapter 282 is appropriately secured (e.g., via welding at weld 308) to a boss 294 which is then appropriately secured (e.g., via welding at weld 312) to the stored gas housing 204, both to preferably achieve a hermetic seal since the second chamber 324 contains a quantity of pressurized medium in the static state. In order to appropriately retain the pressurized medium within the inflator 202 until the desired time, a second closure disk 290 is positioned between the end of the afterburner adapter 282 and the boss 294 and thus retained by the weld 308.

Based upon the fluid interconnection between the first chamber 254 and the second chamber 324, propellant gases produced by combustion of the propellant grains 258, as well as gases generated by ignition of the ignition/booster material 240, are thus directed at least in part into the second (afterburner) chamber 324. Due to the rapid pressure increase therein and as controlled in the manner discussed below, the second rupture disk 290 opens at an appropriate time such that the flow from the inflator 202 is directed to the diffuser 298 and then to the air/safety bag 18 (FIG. 1). In order to provide for a relatively non-thrusting output to the air/safety bag 18 (FIG. 1), the diffuser 298 utilizes a plurality of diffuser ports 300. A diffuser screen 304 may also be contained within the diffuser 298 to retain certain particulate matter within the inflator 202 and/or to further promote mixing/reaction of the propellant gases and pressurized medium prior to passing to the air/safety bag 18 (FIG. 1).

The second chamber 324 is also fluidly interconnectable with the stored gas housing 204. In this regard, at least one and preferably a plurality of gas generator inlet ports 316 provide for a fluid interconnection between the stored gas housing 204 and the second chamber 324 such that pressurized medium from the stored gas housing 204 may flow into the second chamber 324 at the appropriate time. That is, for certain applications this particular flow can be controlled as to the direction of flow. Specifically, a valve 320 can be positioned adjacent to at least one and preferably all of the gas generator inlet ports 316. In the static state, it is not required that the valve 320 actually isolate the stored gas housing 204 from the second chamber 324 in this region. In fact, a quantity of pressurized medium is preferably retained within the second chamber 324 in the static state such that a non-sealing interface would accommodate such a supply. One configuration for the valve 320 which does not isolate the second chamber 324 from the stored gas housing 204 over the ports 316 is a substantially cylindrical roll of shim stock (e.g., 300 series stainless steel, 0.002" thick). A cantilever connection may be utilized between the valve 320 and the interior of the second housing 278. That is, a rearward portion (i.e., sufficiently distal from the ports 316) may be attached to the second housing 278 with the forward or mesial portion thereof remaining unattached and thus free to move/deflect to provide operational capabilities for the valve 320.

Based upon the foregoing, it will be appreciated that in the static state the pressure throughout the stored gas housing 204 and the gas generator housing 212 is substantially equal. However, in the dynamic state or after ignition of the propellant grains 258, the pressure throughout the various "chambers" of the inflator 202 differs to achieve a desired performance. In this regard, when the propellant grains 258 are ignited the generated propellant gases begin flowing into at least the second chamber 324 to cause a pressure increase therein. When at least one bleed port 262 is incorporated into the design, some propellant gases also flow into the stored gas housing 204 as well to initially cause a small pressure increase therein. Preferably, the pressure increases at a greater rate within the second chamber 324 than in the stored gas housing 204 due to the respective introduction of propellant gases therein and their relative volumes. This pressure differential forces the valve 320 against the interior of the aligned portion of the gas generator housing 212 or more specifically the second housing 278 and thereby temporarily isolates the stored gas housing 204 from the second chamber 324 in this region by blocking the gas generator inlet ports 316. The above-noted cantilevered interconnection of the valve 320 allows for this motion. When the pressure within the second chamber 324 reaches a predetermined level, the fluid pressure acting directly on the second closure disk 290 opens, ruptures, or breaks the disk 290. This thereby initiates flow from the gas generator 208 to the diffuser 298 and then to the air/safety bag 18 (FIG. 1).

As will be appreciated, the valve 320 allows for a timely initiation of flow to the air/safety bag 18 (FIG. 1) in certain applications. Specifically, for certain designs the use of the valve 320 allows the second chamber 324 to rapidly pressurize at a rate which will timely open the second closure disk 290. If no valve 320 was utilized in the inflator 202, propellant gases would flow into the stored gas housing 204 from the second chamber 324. As such, it could take longer for the pressure within the second chamber 324 to increase to the level where it would rupture the second closure disk 290. However, the use of the second chamber 324 provides a smaller pressurization chamber which thereby reduces the time required to initiate flow to the air/safety bag 18 (FIG. 1). As will be discussed below, in some designs the volume of the second chamber 324 can be made small enough and/or the selection of the propellant and pressurized medium may be such that the valve 320 is not required for satisfactory operation (e.g., by utilizing the combustion of the gases generated by combustion of the propellant grains 258 and/or the ignition/booster material 240 to affect a rapid pressurization within the second chamber 324).

The valve 320 retains its position and thus blocks the gas generator inlet ports 316 for a certain time after the second closure disk 290 is opened to initiate flow to the air/safety bag 18 (FIG. 1). However, once a certain pressure differential develops between the store gas housing 204 and the second chamber 324, the valve 320 is moved by the force of this pressure differential to expose the gas generator inlet ports 316. When the valve 320 is constructed in the above-described manner, the free end of the valve 320 moves radially inwardly toward the central axis 220 or by a collapsing of the valve 320 in at least those regions radially aligned with the gas generator inlet ports 316 to allow for a desired flow therethrough. However, the valve 320 is retained by its interconnection with the second housing 278. When the gas generator inlet ports 316 are exposed, flow from the stored gas housing 204 initiates into the second chamber 324. The valve 320 is movable from a first position to a second position. When the valve 320 is in the first position, the valve 320 substantially inhibits the flow when operational. The valve 320 moves to the second position and allows the flow when the pressure within the stored gas housing 204 exceeds the pressure within the gas generator housing 212 by a predetermined degree. The second position is radially inward of the first position.

The primary function of the second chamber 324, after of course the rupturing of the second closure disk 290 is achieved again by rapid pressurization of the second chamber 324, is to provide/allow for effective mixing of the propellant gases and pressurized medium prior to being discharged to the air/safety bag 18 (FIG. 1). When using the above-identified types of propellant compositions (e.g., gun-type propellants, hybrid propellants) and the above-identified type of pressurized medium (e.g., a mixture of oxygen and an inert fluid such as at least one type of inert gas), this mixing further combusts the propellant gases to provide the noted benefits (e.g., reducing toxicity, reducing the amount of propellant required for the inflator 202 by the further combustion and the related increased expansive capabilities). As such, the second chamber 324 may be further characterized as an afterburner. Preferably, at least about 99% of all combustion of the propellant gases and gases from ignition of the ignition/booster material 240, and even more preferably about 100% of such combustion occurs within the inflator 202. This reduces the potential for damage to the air/safety bag 18.

In order to fully realize the benefits of this secondary combustion, the second chamber 324 must provide/allow for sufficient mixing of the generated gases and the pressurized medium, either by length or induced turbulence as will be discussed below. In the FIG. 5 embodiment, the closest of the afterburner nozzle 274 and all gas generator inlet ports 316 to the gas generator outlet 286 should be separated therefrom by a distance of at least fifteen millimeters (15 mm) for the illustrated driver's side application. The distance can be set in the range of about 4 mm to about 80 mm for one or more aspects associated with the present invention. This increased length of the second chamber 324 also allows for a sufficient amount of pressurized medium to be contained within the second chamber 324 in the static state to react with propellant gases which are generated before the flow from the stored gas housing 204 to the second chamber 324 is initiated. That is, preferably there is sufficient pressurized medium initially contained within the second chamber 324 upon activation of the inflator 202 to react with propellant gases until the flow from the stored gas housing 204 to the second chamber 324 is initiated by the above-noted movement of the valve 320.

In order to realize the benefits of a "long" second chamber 324, the gas generator inlet ports 316 are also of course preferably disposed a sufficient distance from the gas generator outlet 286 as noted. Preferably, in order to promote further mixing of the propellant gases with the pressurized medium, the most mesial or forward portion of all gas generator inlet ports 316 (defined by their respective centerlines) should be even with the end of the afterburner nozzle 273, and is preferably more rearwardly (i.e., in a direction toward the initiator 228) and as illustrated.

The dimensions of a given design for the inflator 202 may be varied, especially, the preferable capacity range of the inflator housing 204 depends on the inflator applications as shown in Table 2. For example, the capacity of the inflator housing 204 for one or more aspects associated with the present invention may range from about 150 $cm^3$ to about 450 $cm^3$. The capacity of the first chamber 254 may range from about 10 $cm^3$ to about 40 $cm^3$. The capacity of the second chamber 324 may range from about 1 $cm^3$ to about 50 $cm^3$.

The dimensions are provided herein for one embodiment to illustrate principles of the present invention: 1) the diameter of the stored gas housing 204 is about fifty-nine millimeters (59 mm); 2) the length of the stored gas housing 204 is about two hundred millimeters (200 mm); 3) the stored gas housing 204 is formed from mild steel tubing and has a wall thickness of about two and one-half millimeters (2.5 mm); 4) the inner volume of the stored gas housing 204 (that portion in which pressurized medium is retained and not including the volume of the centrally disposed gas generator 208) is about three hundred seventy five cubic centimeters (375 cc); 5) the diameter of the first housing 216 of the gas generator housing 212 is about twenty millimeters (20 mm); 6) the length of the first chamber 254 is about fifty-five millimeters (55 mm); 7) the first housing 216 is formed from mild steel and has a wall thickness of about one and one-half millimeters (1.5 mm); 8) the inner volume of the first chamber 254 of the gas generator housing 212 is about eleven cubic centimeters (11 cc); 9) the diameter of the second housing 278 of the gas generator housing 212 is about seventeen millimeters (17 mm); 10) the length of the second chamber 324 is about ninety millimeters (90 mm); 11) the second housing 278 is formed from mild steel and has a wall thickness of about one and one-quarter millimeters (1.25 mm); 12) the inner volume of the second chamber 324 of the gas generator housing 212 is about fourteen cubic centimeters (14 cc); 13) there are six (6) bleed ports 262 each having a diameter of about three millimeters (3 mm); 14) the inner bore diameter of the afterburner nozzle 274 is about two and one-half millimeters (2.5 mm); 15) the gas generator outlet 286 has a diameter of about ten millimeters (10 mm); 16) all gas generator inlets 316 are disposed about seventy-six millimeters (76 mm) from the gas generator outlet 286; 17) the nozzle 274 is disposed about seventy-five millimeters (75 mm) from the gas generator outlet 286; 18) the inner volume of the diffuser 298 is about four cubic centimeters (4 cc); 19) there are twelve (12) diffuser ports 300; 20) the total weight of the propellant grains is about nine grams (9 g) and have a composition of the above-described type with RDX, CA, TMETN, and stabilizer; 21) the static pressure within the inflator 202 is about twenty and seven-tenths megapascals (20.7 MPa) such that there are about one hundred and forty grams (140 g) of pressurized medium, eighty-five percent (85%) of which is argon and fifteen percent (15%) of which is oxygen (mole percent); and 22) the total weight of the inflator 202 is about twelve hundred grams (1200 g). In a case where the pressurized medium includes helium for detecting the leakage of gases, the pressurized medium for one or more aspects associated with the present invention may preferably contain about 8% to about 30% oxygen, about 60% to about 91% argon and about 0.5% to about 10% helium in a molar basis.

Figure 6A:
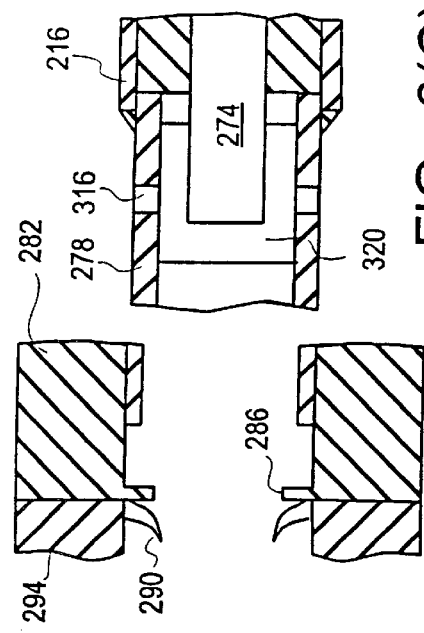
FIGS. 6A–D are enlarged, longitudinal cross-sectional views of the valve and closure disk of the inflator of FIG. 5 at different times during operation.
Figure 6B:
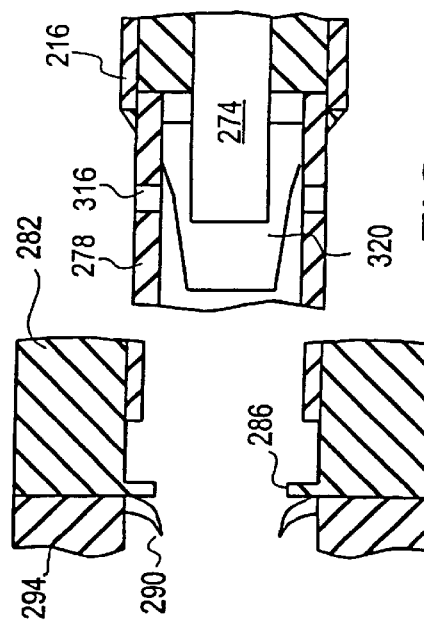
Figure 6C:
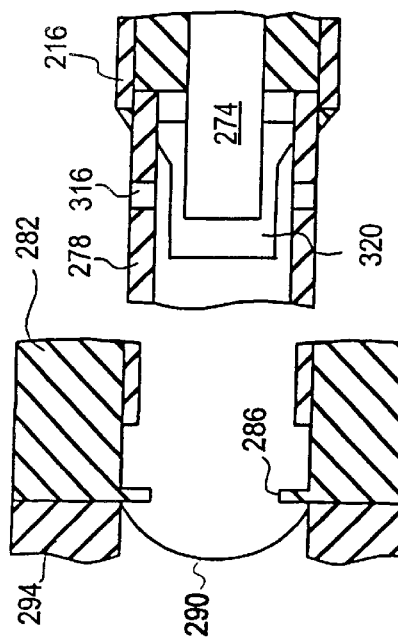
Figure 6D:
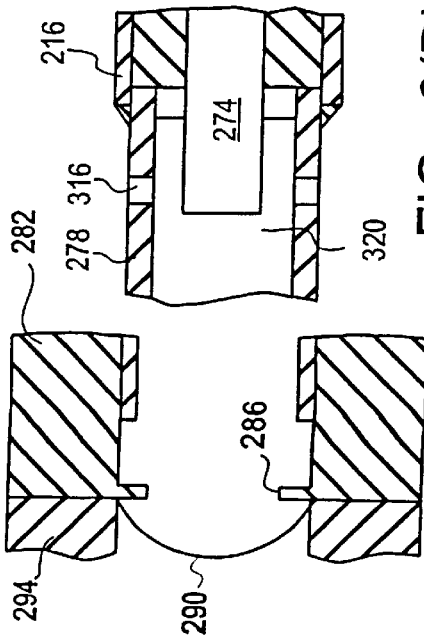
Figure 7C:
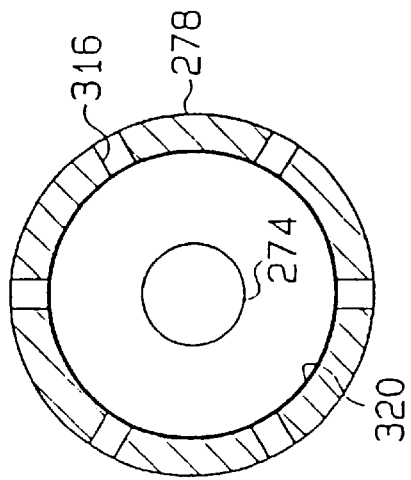
FIGS. 7A–D are end views of the valve of FIGS. 6A–D.
Figure 7D:
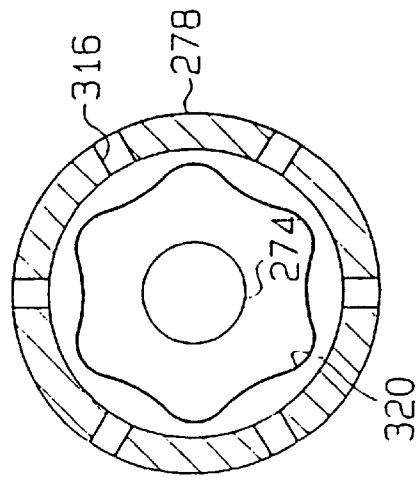
Figure 7A:
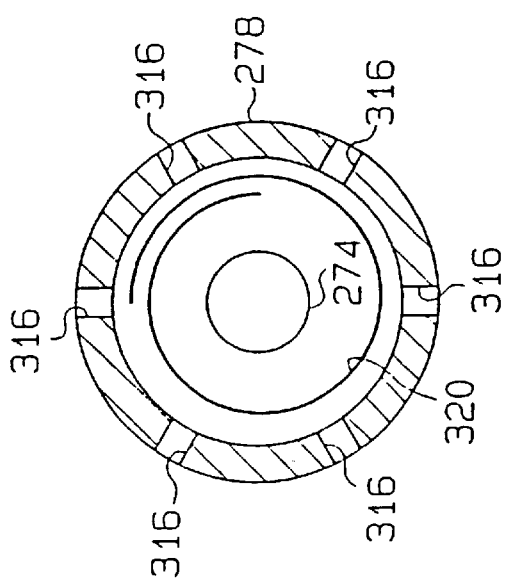

The operation of the inflator 202 will be summarized referring primarily to FIGS. 6A–D and 7A–D. In the static state, the second closure disk 290 is intact and the valve 320 does not have to isolate the stored gas housing 204 from the second chamber 324 as illustrated in FIGS. 6A and 7A. When an appropriate signal is received from the detector/sensor 14 (FIG. 1) indicating that deployment of the air/safety bag 18 (FIG. 1) is desired, the initiator 228 is activated which ruptures the first closure disk 236 and ignites the ignition/booster material 240, which in turn ignites the propellant grains 258. Combustion of the propellant grains 258 generates propellant gases within the first chamber 254 which flow into both the second chamber 324 of the gas generator housing 212 and into the stored gas housing 204. Due to the presence of the hot propellant gases within the first chamber 254 and the introduction of the hot propellant gases into both the second chamber 324 and the stored gas housing 204, the corresponding pressures within these "vessels" also increases.

Figure 7B:
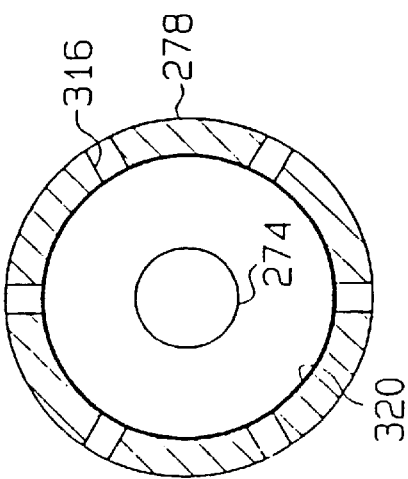

In order to rupture the second closure disk 290 at an appropriate time and thus to initiate the flow to the air/safety bag 18 (FIG. 1), the rate of pressure increase within the second chamber 324 is designed to be greater than the rate of pressure increase within the stored gas housing 214 due to the introduction of hot propellant gases therein. This pressure differential seats the valve 320 against the interior of the second housing 278 to isolate the stored gas housing 204 from the second chamber 324 in this region as illustrated in FIGS. 6B and 7B and to affect rapid pressurization of the second chamber 324. Since the supply of pressurized medium to react with the propellant gases is thus suspended, the amount of pressurized medium within the second chamber 324 in the static state should be sufficient to react with the propellant gases introduced thereto prior to establishing direct fluid communication between the stored gas housing 204 and second chamber 324.

Once the pressure within the second chamber 324 reaches a predetermined magnitude, the fluid pressure acting directly on the second closure disk 290 ruptures the second closure disk 290 as illustrated in FIG. 6C such that there is a flow through the gas generator outlet(s) 286, to the diffuser 298, and to the air/safety bag 18 (FIG. 1). However, the valve 320 may continue to impede the flow into the second chamber 324 directly from the stored gas housing 204 by blocking the gas generator inlet ports 316 as illustrated in FIGS. 6C and 7C. After a certain pressure differential develops between the stored gas housing 204 and the second chamber 324, this moves the valve 320 away from the gas generator inlet ports 316 to establish a flow of pressurized medium from the stored gas housing 204 to the second chamber 324 as illustrated in FIGS. 6D and 7D. For instance, with the illustrated structure for the valve 320 (e.g., a cylindrical roll of metal foil), the forward portion of the valve 320 collapses or moves radially inward under the noted pressure differential at least in those regions proximate or aligned with the gas generator inlet ports 316. The rearward part of the valve 320, however, remains attached to the second housing 278.

Based upon the foregoing, it is apparent that the design of the inflator 202 is particularly suited for use with and enhances the performance of a system which includes the above-described propellants (e.g., gun-type, hybrid) and pressurized medium (e.g., a mixture of oxygen and at least one inert gas). For instance, In the case where the above-noted propellants and pressurized medium are utilized, there will be a secondary combustion of the propellant gases with the pressurized medium within the second chamber 324. This additional combustion further expands the gases, which reduces the amount of propellant required and thus reduces the weight of the inflator 202. Moreover, this secondary combustion also reduces the toxicity of the propellant gases. By utilizing a "long" second chamber 324, particularly the distance between the closer of the afterburner nozzle 274 and gas generator inlet ports 316 with respect to the gas generator outlet(s) 286, there is sufficient time for this secondary combustion to occur prior to the resulting flow being provided to the air/safety bag 18 (FIG. 1).

As noted, in certain designs the inflator 202 may be generally configured as discussed above, but without utilizing the valve 320. This may be possible by utilizing the above-described types of propellants and pressurized medium, namely a propellant which generates propellant gases which may be further combusted in the second chamber 324 by mixing with an oxidizing pressurized medium (e.g., a multi-component mixture of oxygen and an inert fluid such as one or more types of inert gases). In this case, the "secondary" combustion of the propellant gases, and possibly secondary combustion of gases resulting from ignition of the ignition/booster material 240, within the second chamber 324 affects a sufficient pressure increase/rate of increase that the valve 320 may not be required. For instance, the secondary combustion may account for at least about thirty percent (30%) of the pressure increase/rate of pressure increase within the second chamber 324 after activation of the inflator 202, and possibly up to about fifty percent (50%). As such, it is possible to achieve a rapid pressurization-based flow initiation using a chemical reaction in the second chamber 324, thereby alleviating the need for the valve 320.

Another embodiment of a hybrid inflator which may be used in the inflatable safety system 10 of FIG. 1 is illustrated in FIGS. 8–11. The inflator 350 is functionally/operationally similar to the inflator 202 discussed above, but is specifically configured for a driver's side application. As such, the inflator 350 enhances the performance of the inflatable system 10, particularly when utilizing the above-identified types of propellants (e.g., gun type propellants, hybrid propellants) and a multi-component pressurized medium (e.g., a mixture comprising oxygen and an inert fluid such as at least one inert gas).

Figure 8:
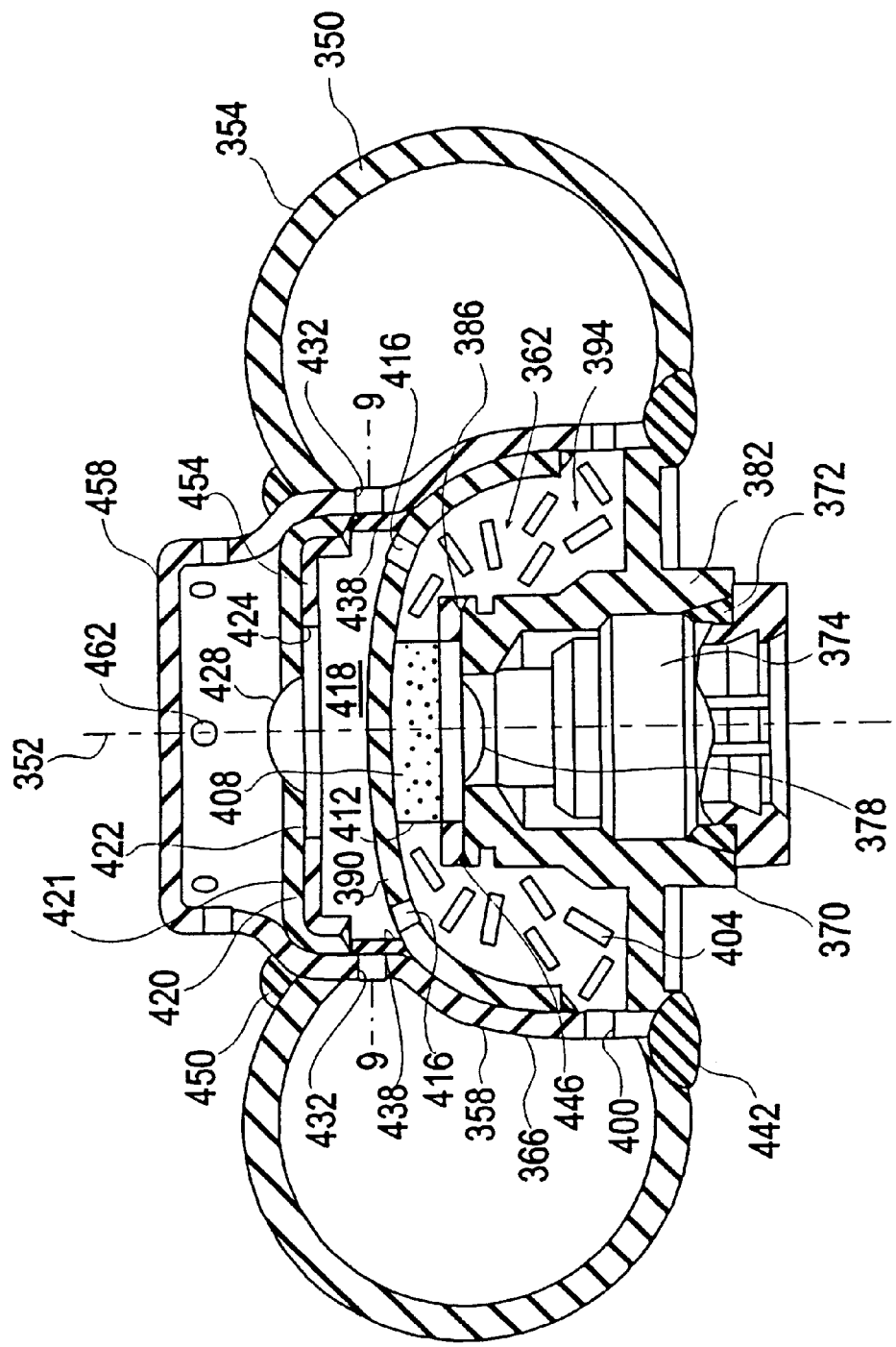
FIG. 8 is a longitudinal cross-sectional view of another embodiment of a hybrid inflator.
Figure 9:
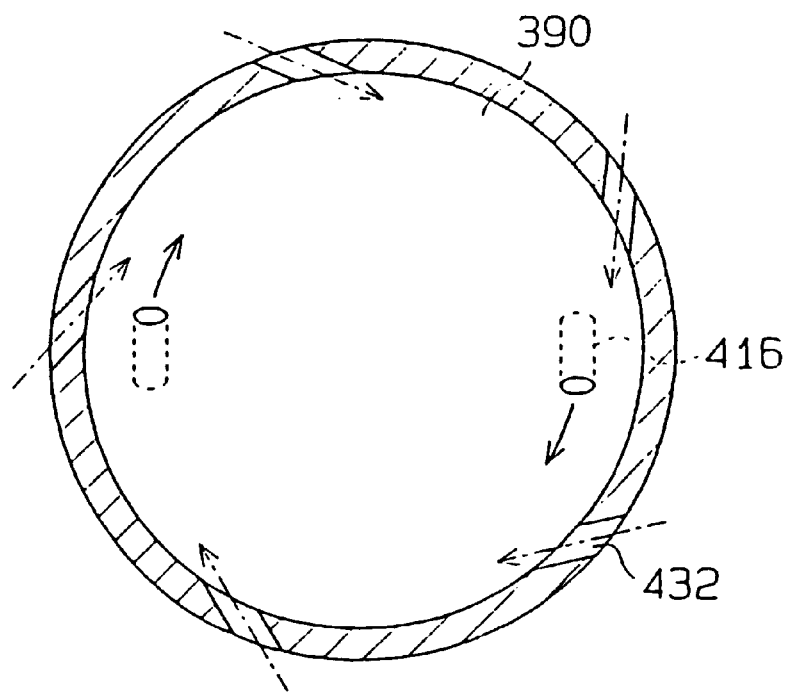
FIG. 9 is a cross-sectional view of the central housing taken along line 9—9 in FIG. 8.

Referring primarily to FIG. 8, the hybrid inflator 350 generally includes two main elements, namely a central housing 358 which includes a gas generator 362 and a diffuser 458, and a stored gas housing 354 which is circumferentially disposed about and appropriately attached to the central housing 358 (e.g., via welding at welds 442, 450), preferably to achieve a hermetic seal. The stored gas housing 354 has a toroidal configuration and contains pressurized medium. Again, a primary advantage of the inflator 350 is that it affects a rapid pressurization of the region proximate the second closure disk 428 (which isolates the flow between the inflator 350 and the air/safety bag 18 (FIG. 1)), such that fluid pressure acts directly on the second closure disk 428 to "open" the same. Moreover and as will be discussed in more detail below, another advantage of the inflator 350 is that it again concentrates the substantial pressure increase associated with activation of a hybrid primarily within the gas generator 362. Consequently, the wall thickness of the stored gas housing 354 may be reduced in comparison to conventional hybrid inflator designs (i.e., the pressure rating of the stored gas housing 354 may be reduced), which in turn reduces the weight of the inflator 350.

The central housing 358 is disposed about the central, longitudinal axis 352 of the inflator 350 and includes a gas generator 362 and a longitudinally aligned and spaced diffuser 458. Both the gas generator 362 and the diffuser 458 are defined at least in part by this central housing 358. For instance, the gas generator 362 includes a cylindrical gas generator housing 366 which is defined by a portion of the central housing 358, an ignition assembly holder 370, a domed partition 390, and a gas generator end cap assembly 420. Specifically, the ignition assembly holder 370 is appropriately connected to both a lower portion of the central housing 358 and to the stored gas housing 354 (e.g., via welding at weld 442) to achieve a preferably hermetic seal since the gas generator housing 366 also contains a quantity of the pressurized medium in the static state. The ignition assembly holder 370 retains an appropriate ignition assembly 374 (e.g., an electrically activatable squib or other suitable pyrotechnic device), and an o-ring 372 may be utilized to provide a sealing interface. In order to isolate the ignition assembly 374 from the pressurized medium within the gas generator 362, a first closure disk (a secondary closure disk) 378 is appropriately attached to the end of the ignition assembly holder 370 (e.g., by welding at weld 446) to achieve a preferably hermetic seal. In the illustrated embodiment, the first closure disk 378 is retained between an end of an ignition assembly holder main housing 382 and an ignition assembly holder end cap 386 of the ignition assembly holder 370 at the weld 446.

The partition 390 separates the gas generator housing 366 into a first chamber 394 and a second chamber 418. The first chamber 394 is defined by a lower portion of the central housing 358, the ignition assembly holder 370, and the lower surface of the partition 390, and is disposed adjacent to the ignition assembly 374. The first chamber 394 of the gas generator housing 366 principally contains the propellant grains 404 which, when ignited, generate propellant gases to augment the flow to the air/safety bag 18 (FIG. 1). Therefore, the first chamber 394 may also be characterized as a propellant chamber. In order to assist in the ignition of the propellant grains 404, an appropriate ignition/booster material 408 (e.g., an RDX/aluminum booster material having a composition of 89 wt % RDX and 11 wt % aluminum powder, possibly with 0.5 wt % to 5.0 wt % hydroxypropyl-cellulose added replacing 0.5 wt % to 5.0 wt % of the RDX and aluminum proportionally) may be positioned in a central portion of the first chamber 394 in alignment with at least a portion of the ignition assembly 374. An appropriate screen 412, booster cup or the like may separate the propellant grains 404 from the ignition/booster material 408.

The first chamber 394 is fluidly interconnected with the stored gas housing 354 typically by at least one bleed orifice or port 400 (two in the illustrated embodiment) such that in the static state pressurized medium is also contained within the first chamber 394 as noted above. In the illustrated embodiment, the bleed port(s) 400 are radially extending (i.e., extending along a radius originating at the central longitudinal axis) and in a substantially horizontal fashion (i.e., contained within a plane which is perpendicular to the central axis 352). Selection of the size and/or number of bleed port(s) 400 can be used to "tune" the performance of the inflator 350 as discussed above with regard to the inflator 202.

As will be discussed in more detail below, the reaction of the resulting gases from ignition of the ignition/booster material 408 may also chemically react with the pressurized medium to further enhance the rapid pressurization-based flow initiation characteristics of the inflator 350.

Directing some of the propellant gases to the stored gas housing 354 from the first chamber 394 may be utilized to achieve a desired output or discharge to the air/safety bag 18, namely to achieve a desired rate of expansion of the air/ safety bag 18. Specifically, it may be preferable to provide propellant gases to the stored gas housing 354 at a rate which maintains a substantially constant flow from the stored gas housing 354 into the second chamber 418 for a sufficient time as will be discussed below. Typically, only a minor portion of the generated propellant gases need to flow into the stored gas housing 354 during operation to affect the desired result (e.g., no more than about forty percent (40%), and more typically no more than about thirty percent (30%) of the flow of propellant gases is directed to the stored gas housing 354). Even when the bleed ports 400 are utilized, the pressure increase in the stored gas housing 354 after ignition of the propellant grains 404 is significantly less than in many commercial hybrid designs. That is, the significant pressure increase commonly associated with ignition of the propellant grains 404 is substantially confined to the gas generator 362. Therefore, the "strength" requirements of the stored gas housing 354 may be reduced. This allows for use of a reduced wall thickness for the stored gas housing 354 and/or lighter materials, both of which decrease the weight of the inflator 350. For instance, the maximum required wall thickness for the stored gas housing 354 may be about 0.075" when the internal pressure in the static state is about four thousand pounds per square inch (4,000 psi) and when the housing 354 is formed from mild steel.

The principal flow of propellant gases from the first chamber 394 (e.g., at least about fifty percent (50%) of the total propellant gas flow, and more typically about seventy percent 70%)) is to the second chamber 418 (known as the afterburner for reasons discussed below). The second chamber 418 of the gas generator housing 366 is fluidly interconnected with the first chamber 394 of the gas generator housing 366 by at least one propellant port 416 (two illustrated) which extends through the gas generator partition 390. As will be discussed in more detail below, the principal flow path for the pressurized medium in the stored gas housing 354 to the air/safety bag 18 (FIG. 1) is also directly into the second chamber 418. in order to induce a sufficient "mixing" of the propellant gases flowing into the second chamber 418 from the first chamber 394 with pressurized medium flowing into the second chamber 418 from the stored gas housing 354 (e.g., to retain the gases therein for a sufficient period of time), the propellant ports 416 may be oriented to induce a vortex-like motion (e.g,. being introduced with at least a radial velocity component) within the second chamber 418. One way of inducing this vortex-like motion is by orienting the substantially linearly extending gas generator propellant ports 416 in the manner illustrated in FIG. 9. The ports 416 are oppositely "inclined" within their respective reference planes.

The second chamber 418 of the gas generator housing 366 is longitudinally aligned with the first chamber 394 and separated therefrom by the gas generator partition 390 with a portion of the stored gas housing 354 being circumferentially disposed thereabout. The second chamber 418 is defined by an intermediate portion of the central housing 358, the gas generator partition 390, and the gas generator end cap assembly 420. The gas generator end cap is appropriately attached to the central housing (e.g., via welding at weld 454), and the upper portion of the central housing 358 is appropriately attached to the upper portion of the stored gas housing 354 (e.g, via welding at weld 450). Preferably, both welds 450 and 454 define a hermetic seal since the second chamber 418 contains a quantity of the pressurized medium in the static state. The gas generator end cap assembly 420 contains at least one gas generator outlet 424 (one shown). In order to appropriately retain the pressurized medium within the inflator 350 and specifically the second chamber 418 until the desired time, a second closure disk 428 is appropriately attached to the gas generator end cap assembly 420 (e.g., sandwiched between an upper gas generator end cap 421 and a lower gas generator end cap 422) to achieve a preferably hermetic seal (e.g., via welding at weld 454).

Based upon the fluid interconnection between the first chamber 394 and the second chamber 418, propellant gases produced by combustion of the propellant grains 404, as well as gases generated by ignition of the ignition/booster material 408, are thus directed at least in part into the second chamber 418. Due to the rapid pressure increase therein and as controlled in the manner discussed below, the second closure disk 428 opens at the appropriate time such that the flow from the inflator 350 is directed to the diffuser 458 and then to the air/safety bag 18 (FIG. 1). In order to provide for a relatively non-thrusting output to the air/safety bag 18 (FIG. 1), the diffuser 458 utilizes a plurality of diffuser ports 462. A diffuser screen (not shown) may also be contained within the diffuser 458 to retain rupture disk fragments within the inflator 350 and/or to further promote mixing/reaction of the propellant gases and pressurized medium prior to passing to the air/safety bag 18 (FIG. 1).

Figure 14A:
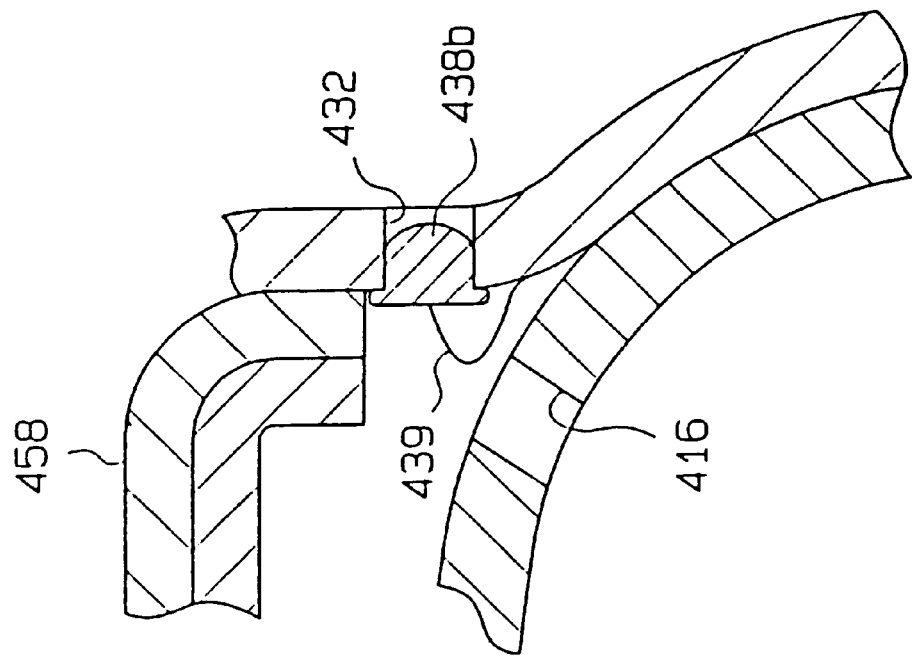
FIGS. 14A and B are cross-sectional views of alternative embodiments of a valve for the hybrid inflator of FIGS. 5 and 8.
Figure 14B:
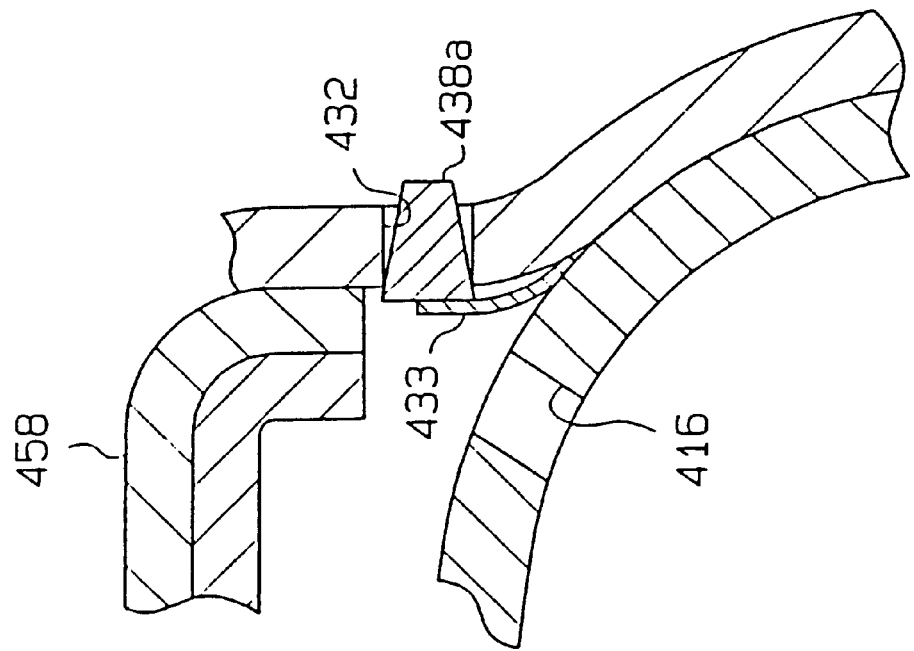

The second chamber 418 is also fluidly interconnectable with the stored gas housing 354. In this regard, at least one and preferably a plurality of gas generator inlet ports 432 provide for a fluid interconnection between the stored gas housing 354 and the second chamber 418 such that pressurized medium from the stored gas housing 354 may flow into the second chamber 418 at the appropriate time. That is, for certain designs/applications this particular flow can be controlled as to the direction of flow. Specifically, a valve 438 can be positioned adjacent to at least one and preferably all of the gas generator inlet ports 432. In the static state, it is not required that the valve 438 actually isolate the stored gas housing 354 from the second chamber 418 in this region. In fact, a quantity of pressurized medium is preferably retained within the second chamber 418 in the static state such that a non-sealing interface would accommodate such a supply. One configuration for the valve 438 which does not isolate the second chamber 418 from the stored gas housing 354 over the ports 432 is a roll of shim stock (e.g., stainless steel, 0.002" thick). A cantilever connection may be utilized between the valve 438 and the interior of the gas generator housing 366. That is, a rearward portion of the valve 438 may be retained between the central housing 358 and the partition 390 with the forward portion thereof remaining unattached and thus free to move/deflect to provide operational capabilities for the valve 438. Although the configuration of the valve 438 is presently preferred, an individual plug 438a, 438b (FIGS. 14A–B) could be disposed in each of the ports 432. These plugs 438a, 438b would preferably be interconnected with the inflator 350 by a tether 439 or the like (shown in FIG. 14B only). It may also be desirable to support the plugs 438a, 438b within the ports 432 with a pliable member 433 (FIG. 14A only). The plugs 438a, 438b could also be used with other hybrid inflators described herein.

Based upon the foregoing, in the static state the pressure throughout the stored gas housing 354 and the gas generator 362 may thus be substantially equal. However, in the dynamic state or after ignition of the propellant grains 404 the pressure throughout the various "chambers" of the inflator 350 differs to achieve a desired performance. In this regard, when the propellant grains 404 are ignited, propellant gases begin flowing into at least the second chamber 418 to cause a pressure increase therein. When at least one bleed port 400 is incorporated into the design, some propellant gases also flow into the stored gas housing 354 as well to cause a pressure increase therein. Preferably, the pressure increases at a greater rate within the second chamber 418 than in the stored gas housing 354 due to the introduction of propellant gases therein and their respective volumes. This pressure differential forces the valve 438 against the interior of the aligned portion of the gas generator housing 366 and thereby temporarily isolates the stored gas housing 354 from the second chamber 418 in this region by covering the gas generator inlet ports 432. When the pressure within the second chamber 418 reaches a predetermined level, the fluid pressure itself opens, ruptures, or breaks the second closure disk 428. This thereby initiates flow from the gas generator 362 to the diffuser 458, and then to the air/safety bag 18 (FIG. 1).

As will be appreciated, the valve 438 allows for a timely initiation of flow to the air/safety bag 18 (FIG. 1) in certain designs/applications. Specifically, for certain designs the use of the valve 438 allows the second chamber 418 to pressurize at a rate which will timely open the second closure disk 428. If no valve 438 was utilized in the inflator 350, propellant gases would flow into the stored gas housing 354 from the second chamber 418. As such, it could take longer for the pressure within the second chamber 418 to increase to the level where it would rupture the second closure disk 428. However, the use of the second chamber 418 provides a smaller pressurization chamber which thereby reduces the time required to initiate flow to the air/safety bag 18 (FIG. 1). As will be discussed below, in some designs the volume of the second chamber 418 can be made small enough and/or the selection of the propellant and pressurized medium may be such that the valve 438 is not required for satisfactory operations (e.g., by utilizing the combustion of the gases generated by combustion of the propellant grains 404 and/or the ignition/booster material 418 to affect a rapid pressurization within the second chamber 418).

The valve 438 may retain its position and thus block the gas generator inlet ports 432 for a certain time after the second closure disk 428 is opened to initiate flow to the air/safety bag 18 (FIG. 1). Nonetheless, once a predetermined pressure differential develops between the stored gas housing 354 and the second chamber 418, the upper free end of the valve 438 is moved by the force of this pressure differential to expose the gas generator inlet ports 432 such that flow from the stored gas housing 354 into the second chamber 418 is initiated. The lower end of the valve 438 remains attached to the gas generator housing 366. When the valve 438 is from a roll of shim stock, this movement may be radially inwardly toward the central axis 352 or by a collapsing of the valve 438 in at least those regions radially aligned with the gas generator inlet ports 432 to allow for a desired flow therethrough.

The primary function of the second chamber 418, after the rupturing of the second closure disk 428 through rapid pressurization techniques, is to provide/allow for effective mixing of the propellant gases and pressurized medium prior to being discharged to the air/safety bag 18 (FIG. 1). When using the above-identified types of propellant compositions (e.g., gun-type propellants, hybrid propellants) and the above-identified type of pressurized medium (e.g., a mixture of oxygen and an inert fluid such as at least one type of inert gas), this mixing further combusts the propellant gases to provide the noted benefits (e.g., reducing toxicity, reducing the amount of propellant required by the further combustion and the related increased expansive capabilities). As such, the second chamber 418 may be further characterized as an afterburner. Preferably, at least about 99% of all combustion of the propellant gases and ignition/booster material gases, and even more preferably about 100% of the combustion occurs within the inflator 350. This reduces the potential for damage to the air/safety bag 18 (FIG. 1).

Due to the constraints imposed by driver's side applications, it is typically impractical to utilize a "long" second chamber 418 as in the inflator 202 to provide the afterburner function. In order to compensate for using a "shorter" second chamber 418 in the driver's side application of the inflator 350, mixing of the propellant gases and pressurized medium within the second chamber 418 can be further enhanced by introducing a vortex-like motion to the flow into the second chamber 418 from the stored gas housing 354 (primarily pressurized medium, but possibly also a quantity of propellant gases and/or ignition/booster material gases) to promote mixing of the pressurized medium and propellant gases. This increases the time in which the propellant gases and pressurized medium are retained within the second chamber 418 to chemically react.

Figure 10:
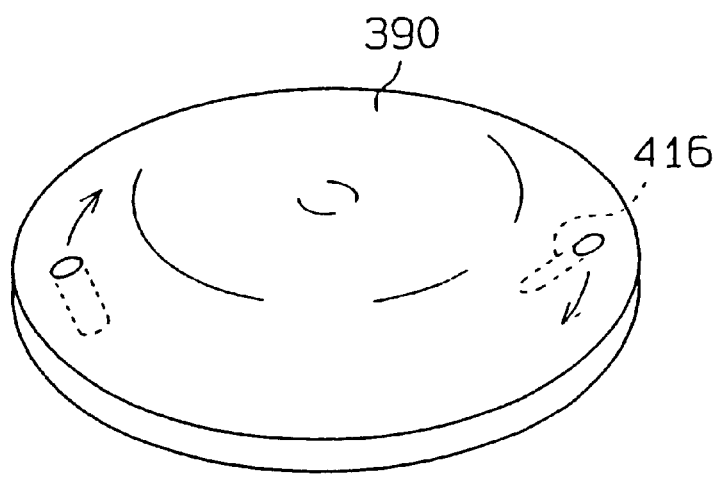
FIG. 10 is a top view of the partition of FIG. 8 between the first and second chambers of the gas-generator housing, specifically illustrating the orientation of the propellant ports.

One way of inducing the above-noted vortex-like motion is by orienting the generally linearly extending gas generator inlet ports 432 substantially within a horizontal reference plane, but not having the axes of these ports 432 pass through the central longitudinal axis 352 of the inflator 350 as illustrated in FIG. 10. That is, the substantially linear ports 432 do not project outwardly from the central, longitudinal axis 352 along a radius to interconnect the second chamber 418 and the stored gas housing 354. Instead, one portion of a given port 432 is disposed on one radial location, while another portion is disposed at another radial location. As such, the flow into the second chamber 418 from the stored gas housing 354 is generally in the direction of the arrows A of FIG. 10. In order to induce further mixing of the propellant gases with the incoming pressurized medium, the propellant ports 416 may be further directed to where the gas generator inlet ports 432 interface with the interior of the second chamber 418.

The dimensions of a given design for the inflator 350 may be varied. Especially, the capacity of each chamber of the inflator 350 depends on the inflator applications. For example, the capacity of the inflator housing for one or more aspects associated with the present invention may range from about 50 cm$^3$ to about 150 cm$^3$. The capacity of the first chamber 394 ranges from about 5 cm$^3$ to about 15 cm$^3$. The capacity of the second chamber 418 may range from about 1 cm$^3$ to about 20 cm$^3$. The dimensions are provided herein for one embodiment which should have performance characteristics similar to those presented below: 1) the diameter of the inflator 350 is about three and one-quarter inch (3.25"); 2) the height of the central housing 358 is about one and six-tenths inch (1.6"); 3) the height of the stored gas housing 354 is about one and two-tenths inch (1.2"); 4) the inner volume of the stored gas housing 354 is about five cubic inches (5 in$^3$); 5) the inner volume of the first chamber 394 of the gas generator housing 366 is about seven cubic centimeters (7 cc); 6) the inner volume of the second chamber 418 of the gas generator housing 366 is about two cubic centimeters (2 cc); 7) there are two (2) bleed ports 400 having a diameter of about one and one-half millimeters (1.5 mm); 8) there are two (2) propellant ports 416 having a diameter of about two millimeters (2 mm); 9) the total weight of the propellant grains 404 is about three and one-half grams (3.5 g) and have a composition of the above-described type which includes RDX, CA, TMETN, and stabilizer; 10) the static pressure within the stored gas housing 354 is about four thousand pounds per square inch (4,000 psi) such that there are about forty grams (40 g) of pressurized medium, 85% of which is argon and 15% of which is oxygen (mole percent); 11) the inflator 350 is formed from mild steel; 12) the wall thickness of the stored gas housing 354 is about seventy-five thousandths of an inch (0.075") and has a pressure rating (burst) of about eighteen thousand pounds per square inch (18,000 psi); 13) the wall thickness of the central housing 358 is about six hundred and twenty five ten thousands inch (0.0625"); and 14) the total weight of the inflator 350 is about four hundred grams (400 g).

Figure 11A:
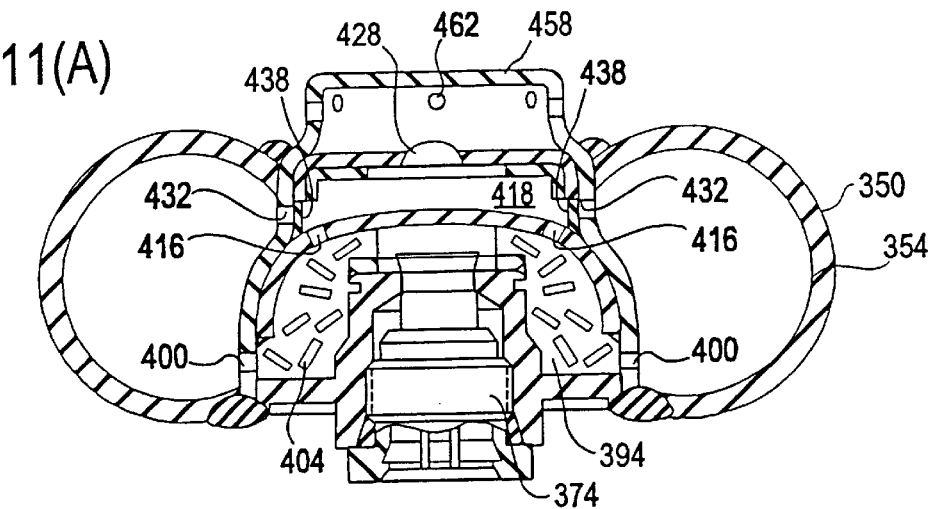
FIGS. 11A–C are enlarged, longitudinal cross-sectional views of the valve and closure disk of the inflator of FIG. 8 at different times during operation.

The operation of the inflator 350 will be summarized by reference to FIGS. 11A–D. When an appropriate signal is received from the detector/sensor 14 (FIG. 1), the ignition assembly 374 is activated which ruptures the first closure disk 378 and ignites the ignition/booster material 408, which in turn ignites the propellant grains 404 as illustrated in FIG. 11A. Combustion of the propellant grains 404 generates propellant gases within the first chamber 394 which flow into both the second chamber 418 of the gas generator housing 366 and into the stored gas housing 354 where such propellant gases mix with pressurized medium. Due to the presence of the hot propellant gases within the first chamber 394 and the introduction of the hot propellant gases into both the second chamber 418 and the stored gas housing 354, the corresponding pressure within these "vessels" also increases.

In order to rupture the second closure disk 428 at an appropriate time and thus to initiate the flow to the air/safety bag 18 (FIG. 1), the rate of pressure increase within the second chamber 418 is designed to be greater than the rate of pressure increase within the stored gas housing 354 due to the introduction of hot propellant gases therein and their respective volumes. This pressure differential seats the valve 438 against the interior of the gas generator housing 366 to isolate the stored gas housing 354 from the second chamber 418 in this region as also illustrated in FIG. 11A. Since the supply of pressurized medium to react with the propellant gases is thus suspended, the amount of pressurized medium within the second chamber 418 in the static state should be sufficient to react with the propellant gases introduced thereto prior to establishing fluid communication between the stored gas housing 354 and the second chamber 418.

Figure 11B:
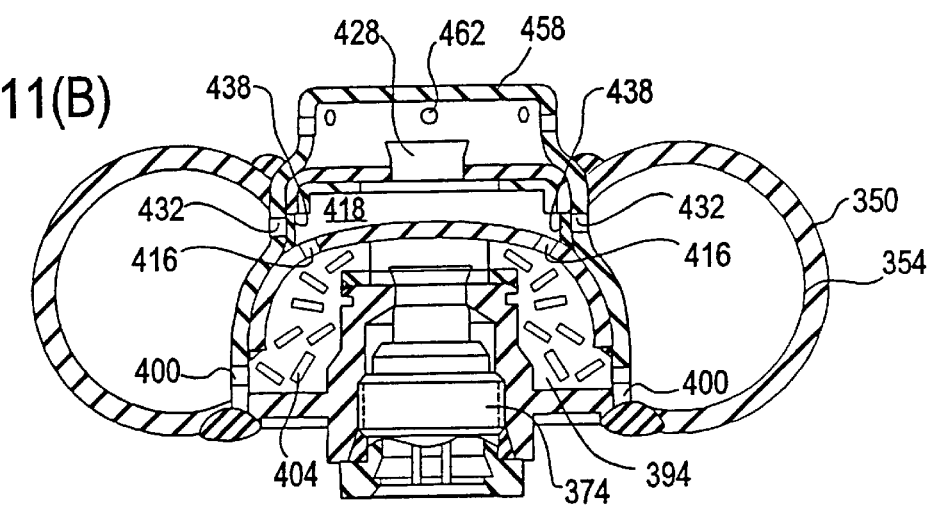
Figure 11C:
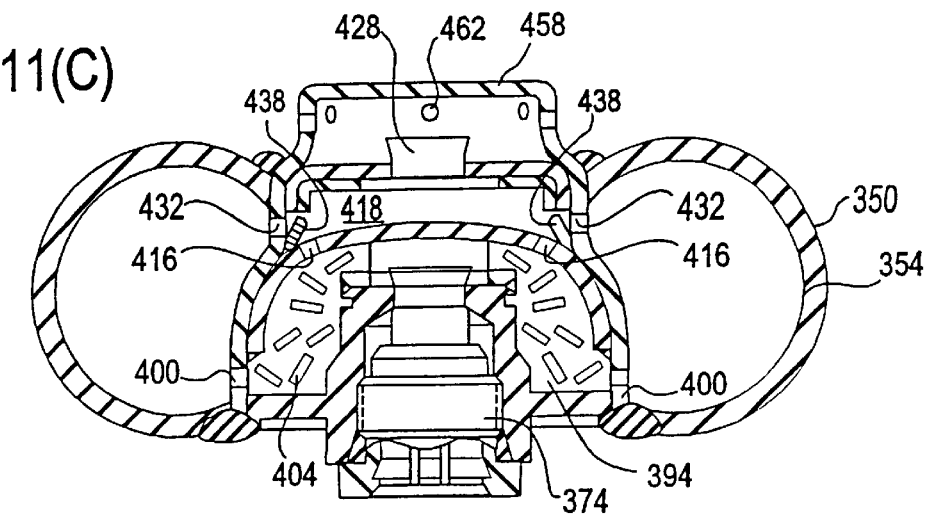

Once the pressure within the second chamber 418 reaches a predetermined magnitude, the pressure ruptures the second closure disk 428 as illustrated in FIG. 11B such that there is a flow through the gas generator outlet(s) 424, to the diffuser 458, and to the air/safety bag 18 (FIG. 1). However, the valve 438 continues to impede the flow into the second chamber 418 directly from the stored gas housing 354 by blocking the gas generator inlet ports 432. After a certain pressure differential develops between the stored gas housing 354 and the second chamber 418, the resulting force moves or deflects the valve 438 away from the gas generator inlet ports 432 to establish a flow of pressurized medium from the stored gas housing 354 to the second chamber 418. For instance, with the illustrated structure for the valve 438 (e.g., a roll of shim stock), the one-way check valve 438 will collapse under the noted pressure differential at least in those regions proximate or aligned with the gas generator inlet ports 432. In order to promote a mixing of this pressurized medium with the propellant gases which are continually provided to the second chamber 418 via the first chamber 394 and as noted above, both the flow of the pressurized medium and propellant gases into the second chamber 418 may be in a vortex-like pattern. This increases the amount of time which the mixture is retained within the second chamber 418 prior to being provided to the air/safety bag 18 (FIG. 1).

Figure 12:
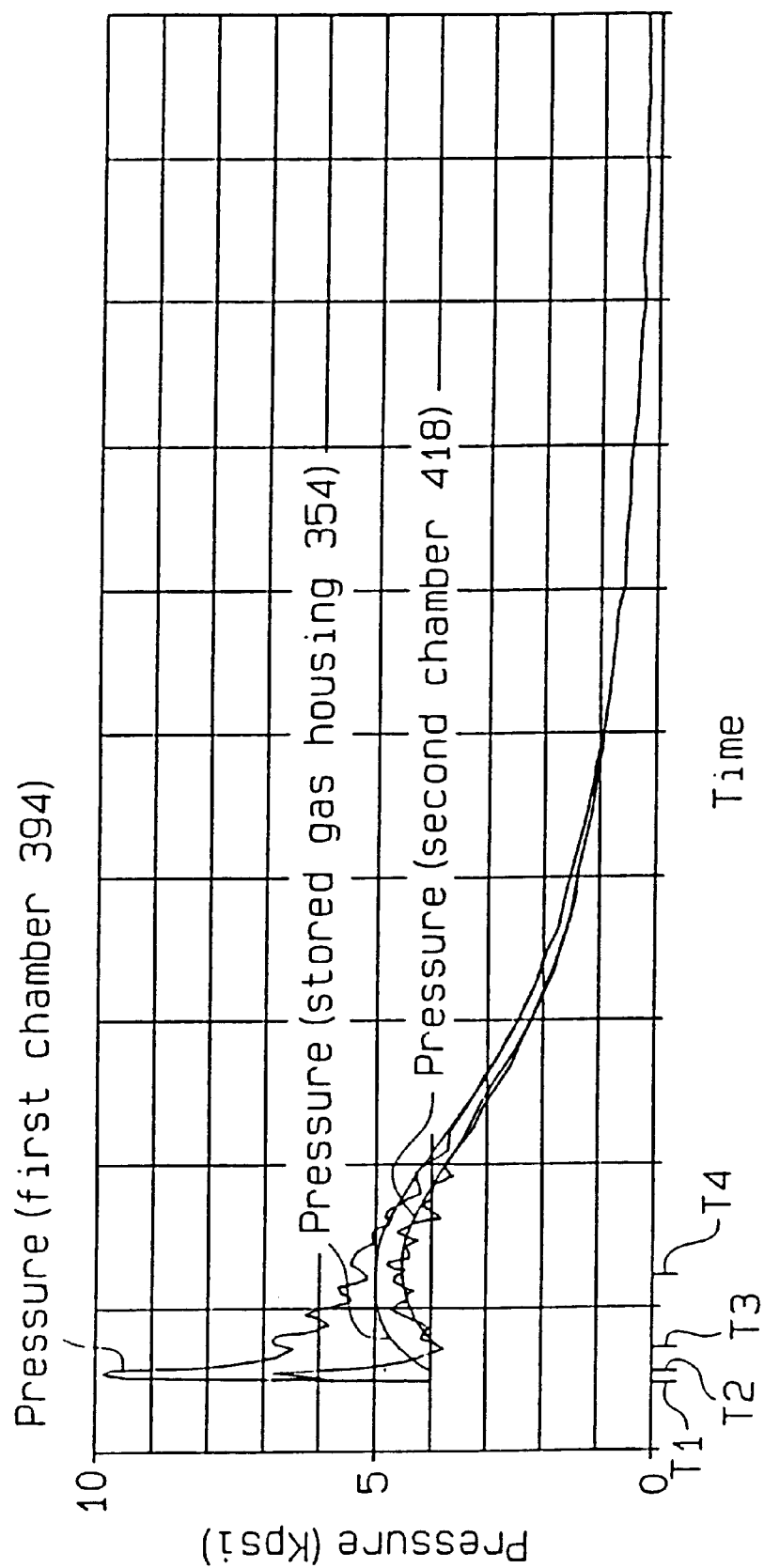
FIG. 12 illustrates the pressure within the various chambers of the inflator of FIG. 8 during operation.

Pressure curves for a test model of the above-described embodiment having similar dimensions and other characteristics is illustrated in FIG. 12. These curves are generally the same as those presented in FIGS. 13A–D discussed in more detail below. Initially, the static pressure within the inflator 350 is about 4,000 psi. At time T1 (about 5 ms), the inflator 350 is activated and the propellant grains 404 are ignited. As such, propellant grains 404 increase the pressure in each of the first chamber 394, the stored gas housing 354, and the second chamber 418. The maximum pressure within the first and second chambers 394, 418 occurs at time T2 and at which rupturing of the second closure disk 428 occurs. At time T2 (about 1 millisecond after activation), the pressure within the first chamber 394 has increased from the 4,000 psi static condition to about 10,000 psi, the pressure within the second chamber 418 has increased from the 4,000 psi static condition to about 7,000 psi, and the pressure within the stored gas housing 354 has increased from the 4,000 psi static condition to about 4,500 psi.

After the second closure disk 428 is opened, there is a pressure drop within the second chamber 418. At time T3, the pressure differential between the stored gas housing and the second chamber 418 is sufficient to open the valve 438 and thereby expose the gas generator inlet ports 432 such that the pressure again increases within the second chamber 418. That is, after time T3 there is a flow into the second chamber 418 from both the stored gas housing 354 and the first chamber 394. The pressure increases within the second chamber 418 to a maximum of about 4,750 psi at time T4 and thereafter decays. This substantially coincides with the time at which the maximum pressure exists in the stored gas housing 354 which is about 5,000 psi. As such, it can be seen that the pressure increases within the inflator 350 are principally concentrated in the gas generator 362 versus the stored gas housing 354. Therefore, the wall thickness of the stored gas housing 354 may be reduced as noted above. Moreover, with the pressure being relatively constant in second chamber 418 (fluctuating only between 4000 psi and about 4600 psi), a desired output may be provided to the air/safety bag 18 (FIG. 1).

As noted, in certain designs the inflator 350 may be generally configured as discussed above, but without utilizing the valve 438. This may be possible by utilizing the above-described types of propellants and pressurized medium, namely a propellant which generates propellant gases which may be further combusted in the second chamber 418 by mixing with an oxidizing pressurized medium (e.g., a multi-component mixture of oxygen and an inert fluid such as one or more types of inert gases; e.g., argon, nitrogen). In this case, the "secondary" combustion of the propellant gases, and possibly secondary combustion of gases resulting from ignition of the ignition/booster material 408, within the second chamber 418 affects a sufficient pressure increase/rate of increase such that the valve 438 may not be required. For instance, the secondary combustion may account for at least about thirty percent (30%) of the pressure increase/rate of pressure increase within the second chamber 418 after activation of the inflator 350, and possibly up to about fifty percent (50%). As such, it is possible to achieve a rapid pressurization-based flow initiation using a chemical reaction in the second chamber 418, thereby alleviating the need for the valve 438.

Figure 15:
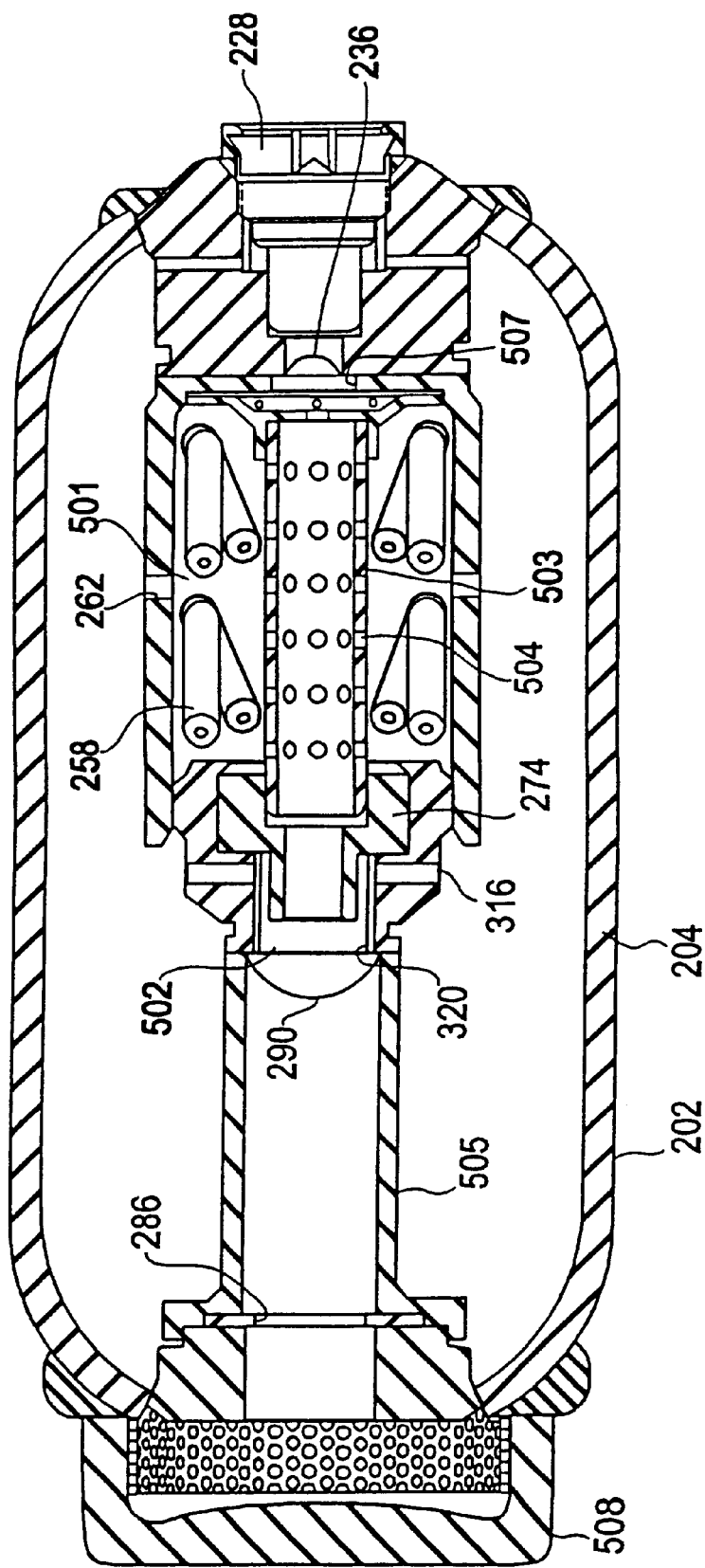
FIG. 15 is a longitudinal cross-sectional view of another embodiment of a hybrid inflator.

Pressure curves for the pressures within the first chamber 394, the second chamber 418, and the stored gas housing 354, and in a fixed wall vessel representative of the air/safety bag 18 (FIG. 1) are illustrated in FIGS. 13A–D, respectively, for an inflator 350 configured in the above-described manner but without the valve 438. As can be seen by a comparison of FIG. 12 and FIGS. 13A–C, comparable performance was achieved without the use of the valve 438. This can again be principally attributed to the use of the particular types of propellants and pressurized medium to provide for a combustion of gases within the second chamber 418 to realize to affect a rapid pressurization within the second chamber 418 to open the second closure disk 428. FIG. 15 shows a modification of the inflator according to the present invention. The modified inflator has a structure similar to the inflator shown in FIG. 5. Accordingly, we will omit the description of the similar structure, but will refer to numerals identical to the numerals denoting the members of the inflator of FIG. 5. Certain differences between the modified inflator of FIG. 15 and the inflator of FIG. 5 will be discussed below.

A first chamber 501 has an inner diameter larger than an inner diameter of a second chamber 502. The length of the second chamber 502 is set excessively less than the length of the second chamber 324 of FIG. 5. Accordingly, the second chamber 502 has the capacity extremely smaller than the capacity of the first chamber 501. The capacity of the second chamber 502 is about one twentieth of the capacity of the first chamber 501 in this embodiment.

A transfer tube 503 is located on the axis of the first chamber 501 and connects the initiator 228 to the aspirator nozzle 274. The transfer tube 503 is hollow and has a plurality of interconnecting ports 504 at the peripheral wall. The transfer tube 503 and the aspirator nozzle 274 allow for communicating the first chamber 501 with the second chamber 502 (e.g., it assists in keeping solid propellant out of the axial path between the initiator 228 and the disk 290). The first closure disk 236 generally closes a passage 507 defined between the initiator 228 and the first chamber 501.

The second chamber 502 is connected to the outlet port 286 by an afterburner pipe 505. The second closure disk 290, located near the second chamber 502 and the aspirator nozzle 274, normally closes the outlet port 286 via the pipe 505. The bleed ports 262 communicate the first chamber 501 with the stored gas housing 204. Inlet ports 316 is provided with the second chamber 502. The inlet ports 316 are opened in the static state because the valve 320 does not closely contact the inner wall of the second chamber 502.

In the static state, the pressures in the stored gas housing 204, the first chamber 501 and the second chamber 502 by means of the aspirator nozzle 274, the transfer tube 503, the inlet ports 316 and the bleed ports 262. In this state, when the initiator 228 is activated, the first closure disk 236 is broken and the propellant grains 258 are burnt. Combustion gases generated from the propellant grains 258 increase the pressure in the first chamber 501 and then increase the pressure in the second chamber 502 via the transfer tube 503 and the aspirator nozzle 274. The increased pressure moves the valve 320 toward the wall of the second chamber 502 to close the inlet ports 316. The combustion gases are injected from the aspirator nozzle 274 toward the pipe 505 to break the second closure disk 290.

Then, the pressure in the second chamber 502 temporarily decreases to allow the valve 320 to open the inlet ports 316. Consequently, the pressurized medium goes into the second chamber 502 and the pipe 505 through the inlet ports 316. The oxygen in the pressurized medium-chemically reacts with carbon monoxide and hydrogen in the combustion gases to convert them to carbon dioxide and water vapor within the second chamber 502 and the pipe 505. Carbon dioxide, water vapor and argon in the pressurized medium are supplied to an air bag (not shown) through the outlet port 286 and a diffuser 508 to inflate the air bag.

As mentioned above, the second chamber 502 is formed smaller than the first chamber 501 in this embodiment. Also, the second closure disk 290 is located near the aspirator nozzle 274. Consequently, in addition to the same effect and advantages as the inflators shown in FIGS. 5 and 8, the increase of pressures in the first and the second chambers 501 and 502 occurs rapidly in the present embodiment, thus breaking the disk 290 rapidly.

The transfer tube 503 having a plurality of ports 504 can increase the velocity of combustion gas flow when the flow passes through the ports 504. This assists the rapid breakage of the disk 290.

It is noted that the transfer tube 503 is applicable to the embodiment shown in FIG. 5. Furthermore, with respect to the opening area of each aspirator nozzle shown in FIGS. 5 and 8, and the sum of opening areas of the bleed ports, it can be decided which one may be greater than the other, depending on whether the pressurized medium or the propellant gas is introduced into the first chamber.

Table 2 indicates physical characteristics of the inflators shown in FIGS. 5, 8 and 15 which may be appropriate for use in conjunction with one or more aspects associated with the present invention. Table 2 indicates, for example, value ranges of propellant grains, pressurized gases and pressurized medium.

TABLE 2

| | passenger side | driver side | side inflator |
|---|---|---|---|
| propellants (g) | applicable range: about 0.5 to about 20 | | |
| | about 6 to about 20, optimally about 6 to about 15 | about 2 to about 8, optimally about 2 to about 6 | about 0.5 to about 2 |
| combustion velocity of propellants (cm/s) | about 0.25 to about 5 | | |
| combustion temp. of propellants (° K.) | about 2000 to about 3800 | | |
| heat of propellants (cal/g) | about 800 to about 1300 | | |
| pressurized medium (g)/ propellants (g) | about 8 to about 25 | | |
| capacity of inflator housing ($cm^3$) | applicable range: about 10 to about 450 | | |
| | about 150 to about 450 | about 50 to about 150 | about 10 to about 50 |
| thickness of inflator housing (mm) | applicable range: about 1 to about 4 | | |
| | about 2.5 to about 4 | about 1 to about 3 | about 1 to about 3 |
| composition of pressurized medium (in a molar basis) | inert fluid: about 70% to about 92%, preferably about 79% to 90% oxygen: about 8% to about 30%, preferably about 10% to about 21% | | |
| $CO + H_2$/ propellant gases (mol/ mol) % | about 30 to about 70 | | |
| propellant gases (mol)/ propellants (g) | about 0.3 to about 0.6 | | |
| pressure of pressurized medium (psi) | about 2000 to 7000 | | |
| He content in medium (%) | about 0.5 to about 10, preferably about 1 to about 5 | | |

Another embodiment of a hybrid inflator which may be used with one or more aspects of the present invention and which may be incorporated into the inflatable safety system 10 of FIG. 1 is illustrated in FIG. 16. The inflator 614 includes a cylindrical inflator housing 622 having a pressurized medium 620 that is provided to the air/safety bag 18 (FIG. 1), as well as a gas generator 624 that generates propellant gases for expanding the pressurized medium 620 to increase the flow to the air/safety bag 18.

The inflator 614 may be used as a side impact inflator and thus may be attached to a seat or a door of a vehicle (e.g., used to protect occupants when the vehicle is bumped sideways). The pressurized medium 620 may include an inert fluid (e.g., argon) and oxygen and the above-noted types of propellants may also be utilized.

A gas generator housing 644 is welded to the right end opening 642 of the inflator housing 622, part of which is disposed within the inflator housing 622. Within a container chamber 645 of the gas generator housing 644 is contained a propellant 646 (e.g., of the above-described types) which generates propellant gases when it is burned and is disposed a propellant ignition assembly 648. The gas generator housing 644 and the propellant ignition assembly 648 are arranged on a longitudinal axis 617 of the inflator housing 622.

The propellant 646 may be a nitramine propellant and desirably comprises, for example, about 70 wt % RDX (hexahydrotrinitrotriazine), from about 5 wt % to about 15 wt % cellulose acetate and from about 5 wt % to about 15 wt % GAP(glycidyl azide polymer). The propellant 646 generates combustible gases which include carbon monoxide and hydrogen when it is burned.

The gas generator housing 644 includes an interconnecting port 650 at its inner end, which is normally blocked by a first disk 652. A ring-shaped connector 626 is welded to the left end opening 625 of the inflator housing 622. A cap-shaped diffuser 630 is fixed at the left end opening 628 of the connector 626. The diffuser 630 includes a peripheral wall 630$a$ having a plurality of holes 632 and a top wall 630$b$. The diffuser 630 is arranged on the axis 617 and is fluidly interconnected with the air/safety bag 18 (FIG. 1).

A right end opening of the connector 626 forms an outlet port 634 of the inflator housing 622. A second disk 636 is disposed at the outlet port 634, which normally blocks the outlet port 634. The diffuser 630 includes an opening 630$c$ which is fluidly interconnected with the outlet port 634. A cap 640 with a plurality of holes 638 is attached to the connector 626 so as to cover the outlet port 634. Accordingly, the inner inflator housing 622 is normally closed by the two disks 636, 652 and a peripheral wall of the inflator housing 622. The container chamber 645 is fluidly interconnected with the inside of the inflator housing 622 by the interconnecting port 650, while the inside of the inflator housing 622 is fluidly interconnected with the outlet port 634 by the holes 638 when the first and second disk 652 and 636 are ruptured.

In one embodiment, a distance between the first and second disks 652 and 636 is desirably about 20 mm to about 70 mm. The amount of the pressurized medium 620 within the inflator housing 622 may range from about 40 cm$^3$ to about 100 cm$^3$. The amount of the pressurized medium 620 within the inflator housing 622 in one embodiment is more preferably from about 50 cm$^3$ to about 90 cm$^3$. The inside of inflator housing 622 may be maintained at a high pressure of about 4,000 psi.

When to propellant ignition assembly 648 is activated in response to a signal from the detector 612, the propellant 646 is burned to generate combustible gases. The combustible gases include carbon monoxide and hydrogen. The combustible gases increase the pressure within the gas generator housing 644 to rupture the first disk 652. Then the combustible gases flow into the inflator housing 622 through the interconnecting port 650 and are mixed with the pressurized medium 620 therein.

The pressurized medium 620 includes oxygen, which reacts with the carbon monoxide and hydrogen in the combustible gases to generate carbon dioxide and water vapor. The combustible gases increase the pressure within the inflator housing 622, which acts on the second disk 636 via the holes 638. That is, the gases must flow around the end wall 641 of the cap 640 and into the holes 638. This facilitates a more complete combustion within the housing 622. The end wall 641 thus may be said to function as a propellant trap which is disposed at the outlet to the inflator 614.

The second disk 636 is ruptured by the increase in pressure adjacent thereto and when ruptured, supplies high pressure carbon dioxide, water vapor and the inert gas to the air/safety bag 18 (FIG. 1) via the outlet port 634 and the holes 632 of the diffuser 630. Thus, the air/safety bag 18 (FIG. 1) is effectively expanded a predetermined amount in a predetermined amount of time.

As described above, the first and second disks 652, 636 and the diffuser 630 are disposed on the axis 617 of the inflator housing 622 in this embodiment so that the whole inflator can be formed in a compact cylindrical shape. Consequently, the inflator can be firmly attached in a limited space such as the inside of the door or the seat of a vehicle without modifying the configuration of the door or the seat.

In this embodiment, the propellant 646 generates combustible gases which include carbon monoxide and hydrogen when it is burned. The combustible gases react with the oxygen in the pressurized medium 620 to be converted to carbon dioxide and water vapor. Accordingly, the air/safety bag 18 (FIG. 1) can be expanded by substantially innoxious gases to occupants.

The diffuser 630 is formed in a cap-like shape and includes the peripheral wall 630$a$ and the top wall 630$b$. The diffuser 630 furthermore includes the opening 630$c$ fluidly interconnected with the outlet port 634 and a plurality of the holes 632 fluidly interconnected with the opening 630$c$ in the peripheral wall 630$a$. Therefore, the air/safety bag 18 (FIG. 1) can be more effectively expanded by gases discharged from a plurality of the holes 632 in all directions when gases are released from the inflator housing 622.

FIG. 16A shows a modification of the inflator of FIG. 16. In this modification, the gas generator housing 624 comprises a base section 660 and a chamber section 662. The base section 660 supports the ignition assembly 648. The chamber section 662 accommodates the propellants 646. A disk 664 is disposed between the base section 660 and the chamber section 662 and is clamped with them. The disk 664 normally closes a through hole 666 of the chamber section 662. The chamber section 652 is fluidly interconnected with the inflator housing 622 via the interconnecting port 650. Accordingly, the inside of chamber section 652 is under pressure.

When the ignition assembly 648 is activated, the ignition assembly 648 directly ruptures the disk 664 and ignites the propellant to generate combustible gases. The combustible gases react with the oxygen in the pressurized medium 620 to be converted to carbon dioxide and water vapor. Accordingly, the air/safety bag can be expanded by substantially innoxious gasses to occupants.

Figure 17:
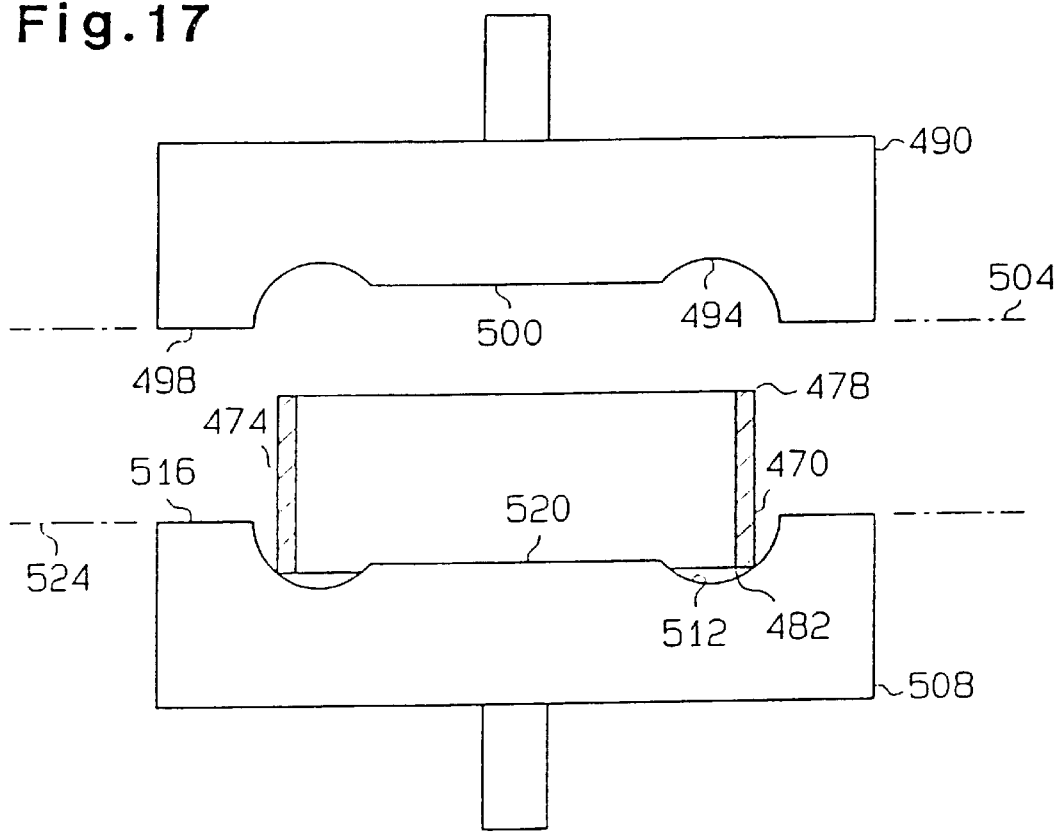
FIGS. 17, 18 and 19 illustrate a method for forming the toroidal stored gas housing of the inflator of FIG. 8.
Figure 18:
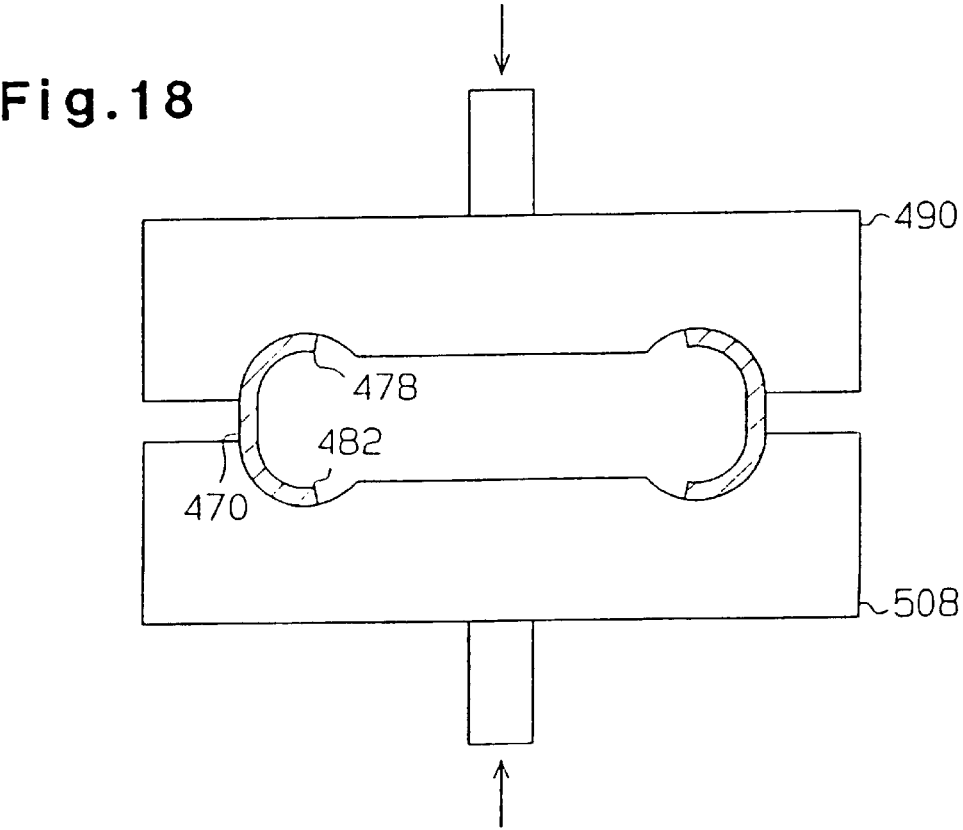
Figure 19:
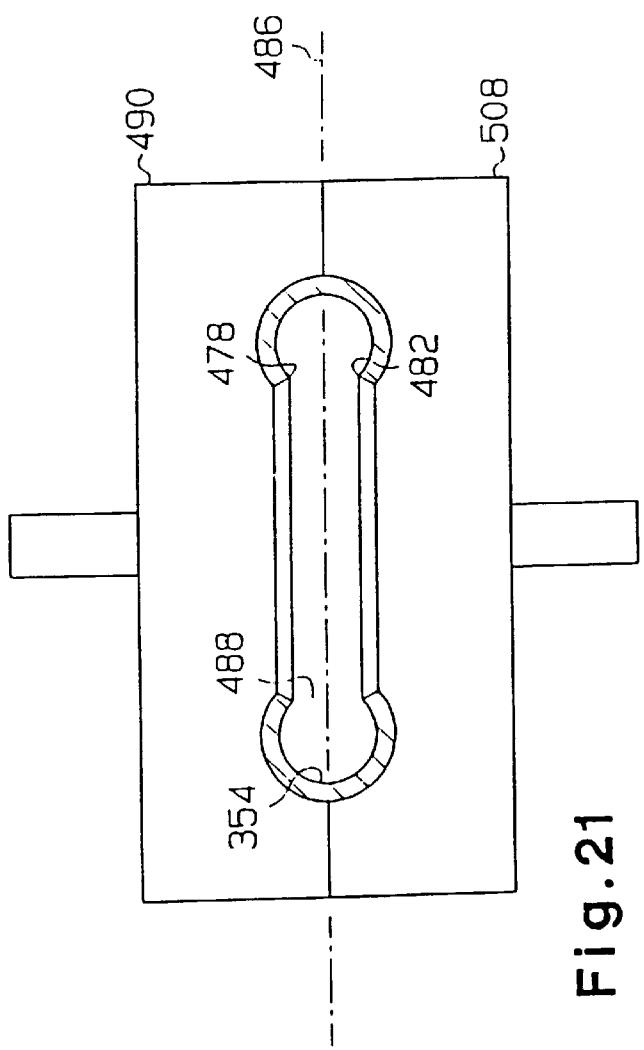

One method by which the stored gas housing 354, which is of one-piece construction, may be formed is illustrated in FIGS. 17, 18 and 19. Generally, the stored gas housing 354 is formed by swaging a single piece of tubing 470 by axial compression of the same or by swaging. The tubing 470 has a substantially cylindrical sidewall 474 and axially spaced upper and lower ends 478, 482, respectively. In one embodiment, the tubing 470 which is used to form the stored gas housing 354 is hot stretch reduced, cold formed, seamed tubing such that the tubing has substantially uniform properties throughout (e.g., 3¼ inch OD available from Pittsburgh Tube Corp.). Suitable materials for the tubing 470 include those identified above with regard to the stored gas housing 354. In order to provide an inflator 350 of the above-described dimensions and which as noted is for a driver's side application, the tubing will typically have a length no greater than about 2½ inches, a wall thickness no greater than about 3/32 inches, and an outside diameter no greater than about 3¼ inches.

The tubing 470 is conformed into the shape of the stored gas housing 354 by the interaction of an upper die 490 and a lower die 508. The upper die 490 and the lower die 508 include annular grooves 494, 512, respectively, which are each generally concave. Each of the grooves 494 and 512 may be characterized as having an inner wall (relative to a central, longitudinal axis extending through the center of the respective die) and an outer wall with a bottom wall disposed therebetween and with the inner wall and outer wall substantially defining a depth of the inner and outer part of the respective groove. Each of these different segments (i.e., the inner wall, the outer wall, and the bottom wall) may be arcuately shaped, and in one embodiment each of the grooves 494 and 512 are actually defined by a single radius.

An outer perimeter 498 of the upper die 490 is offset in relation to an inner perimeter 500 of the upper die 490. Specifically, the outer perimeter 498 is contained within an upper reference plane 504, while the inner perimeter 500 is displaced above the upper reference plane 504. Similarly, an outer perimeter 516 of the lower die 508 is offset in relation to an inner perimeter 520 of the lower die 508. Specifically, the outer perimeter 516 is contained within a lower reference plane 524, while the inner perimeter 520 is displaced below the lower 524 reference plane.

The upper and lower dies 490, 508, respectively, are axially aligned, specifically such that their respective grooves 494, 512 project toward each other as illustrated in FIG. 17 (e.g., the grooves 494 and 512 are disposed in opposing relation). The tubing 470 is positioned between the upper and lower dies 490, 508, respectively, and the outer diameter of the tubing 470 will typically be selected such that it closely approximates or equals the outer diameter of each of the grooves 494, 512. The upper die 490 and the lower die 508 are relatively axially advanced toward each other to subject the tubing 470 to axially compressive forces which forces the tubing 470 to substantially conform to the shape of grooves 494, 512 of the upper and lower dies 490, 508, respectively, as illustrated in FIGS. 18 and 19. In one embodiment, the dies 490, 508 are relatively axially advanced toward each other at a rate of about 10 inches per minute and a force of about 40 tons is utilized.

Generally, and as a result of the noted relative axial advancement of the dies 490 and 508, the upper half of the tubing 470 is forced to conform to the groove 494 in the upper die 490, while the lower half of the tubing 470 is forced to conform to the groove 512 in the lower die 508. In the case where the grooves 494, 512 are each formed by a single radius, substantially all portions of the tubing sidewall 474 will be forced radially inwardly to a degree. Moreover, when the relative advancement between the dies 490 and 508 is to a certain degree, the end of the tubing 470 which was forced into conformance with the upper die 490 will project toward the lower die 508, while the end of the tubing which was forced to conform with the lower die 508 will project toward the upper die 490.

In above-noted compressive conformation and as illustrated in FIG. 18, the upper end 478 and the lower end 482 of the tubing 470 generally substantially progress along the surfaces defining the grooves 494, 512 in the upper and lower dies 490, 508, respectively, as axially compressive forces are applied to the tubing 470 by the upper and lower dies 490, 508, respectively. Depending upon the initial length of the tubing 470 and/or the shape of the grooves 494, 512, the compressive engagement of the tubing 470 may result in the upper and lower ends 478, 482, respectively, of the tubing 470 each actually extending inwardly toward a mid reference plane 486 as illustrated in FIG. 19. This means that the two ends of the tubing 470 also generally project toward each other, and thus toward the opposing die as well. Moreover, a radially inwardly disposed annular groove 488 may be retained after completion of the operation of the dies 490, 508. That is, the tubing 470 need not be swaged to create a closed surface or a donut-like exterior surface or a true toroid. Instead and as illustrated in both FIG. 14C and in FIG. 8, the radially inward portion of the stored gas housing 354 may actually be open such that it retains a somewhat C-shaped cross section. The cross section of the stored gas housing extends along the arc having an angular range of over 180 degrees. As such, the outer sidewall of the stored gas housing 354 may be characterized as being of a generally torus-like or toroidal-like configuration.

In the illustrated embodiment, the length of the tubing 470 is selected to be no greater than the sum the first and second arc lengths 528, 532 of the upper and lower dies 490, 508, respectively. This allows the entirety of the tubing 470 to be "supported" during swaging and provides for the generally C-shaped cross section of the stored gas housing 354. The first arc length 528 defines the degree of concavity for the annular groove 494 of the upper die 490, while the second arc length 532 defines the degree of concavity for the annular groove 512 of the lower die 508. By selecting tubing 470 of this length, this would allow for the formation of a generally C-shaped cross section even if a closed surface was defined when the upper and lower dies 490, 508, respectively, were completely engaged (not shown) (e.g., such that when the upper and lower dies interface, a closed surface is defined by the grooves). Since in the illustrated embodiment the inner perimeters 500, 520 of the upper and lower dies 490, 508, respectively, do not engage, the length of the tubing 470 could be selected to be longer than the noted summation of the first and second arc lengths 528, 532, respectively, and yet still provide an inner annular groove 488. However, it is desirable for all portions of the tubing 470 to remain substantially engaged with the associated groove 494, 512 during swaging and therefore the length of the tubing 470 should be as specified above.

In the illustrated embodiment and as noted above, there is also an offset between those surfaces of the upper and lower dies 490, 508, respectively, proximate their respective grooves 494, 512. That is, the outer perimeter 498 of the upper die 490, specifically at least that portion proximate the groove 494 and disposed radially outwardly therefrom, is offset in relation to the inner perimeter 500 of the upper die 490, specifically at least that portion proximate the groove 494 and disposed radially inwardly therefrom. Moreover, the outer perimeter 516 of the lower die 508, specifically at least that portion proximate the groove 512 and disposed radially outwardly therefrom, is offset in relation to the inner perimeter 520 of the lower die 508, specifically at least that portion proximate the groove 512 and disposed radially inwardly therefrom. As such, when the dies 490, 508 are brought into engagement, the outer perimeters 498, 516 of the upper and lower dies 490, 508, respectively, engage as illustrated in FIG. 19, but the inner perimeters 500, 520 are vertically displaced. Consequently, if the length of the tubing 470 is selected to be no greater than the summation of the first and second arc lengths 528, 532 as noted above, the tubing 470 will be supported throughout swaging and the stored gas housing 354 will attain the generally C-shaped cross section.

Once the stored gas housing 354 is formed in the desired configuration, the central housing 358 may be disposed in the central opening 536. The central housing 358 may be stamped from a single piece of the above-noted types of materials and is typically assembled (e.g., the first chamber 394 and second chamber 418 are formed with the propellant grains 404 being contained within the first chamber 394) prior to installation within the stored gas housing 354. As illustrated in FIG. 8, the height of the central housing 358 is greater than the height of the stored gas housing (e.g., the upper end of the central housing 358 extends vertically beyond a reference plane which contains the uppermost portion of the stored gas housing 354). When the central housing 358 is placed in its proper position, the welds 450, 454 may be established to seal the interior of the inflator 350. Thereafter, an appropriate inflating medium may be provided to the inflator 350 (e.g., by piercing the stored gas housing 354, providing a pressurized gas thereto, and thereafter resealing the housing 354).

Figure 20:
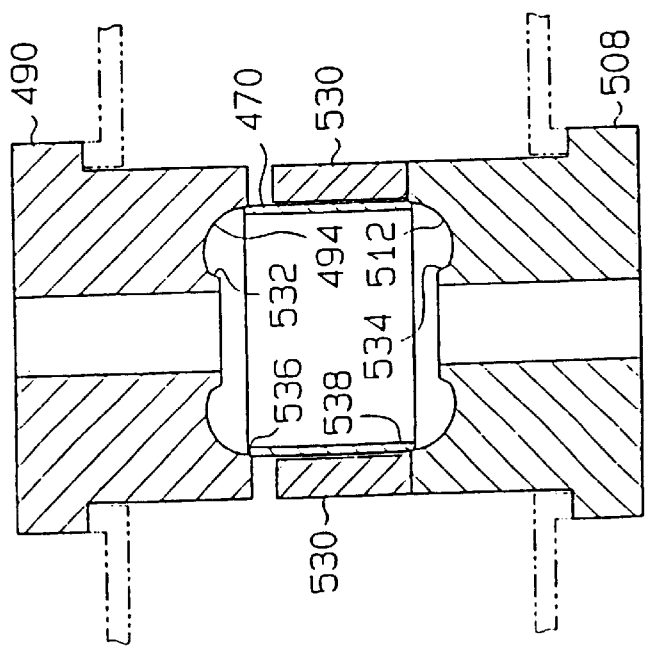
FIG. 20 is a cross-sectional view of another embodiment of dies.

FIG. 20 illustrates a modified embodiment of dies. In the modified embodiment, a pair of holding members 530 is provided. The holding members 530 are engaged with tubing 470 from its opposing sides to hold the tubing at predetermined positions when the first and second ends of the tubing 470 are positioned between the first and second dies 490 and 508. The holding members 530 are separated from the tubing 470 by driving means (not shown) before the first and second dies 490 and 508 are advanced toward each other. Accordingly, in the modified embodiment, the tubing 470 can be accurately located at the predetermined position.

Figure 21:
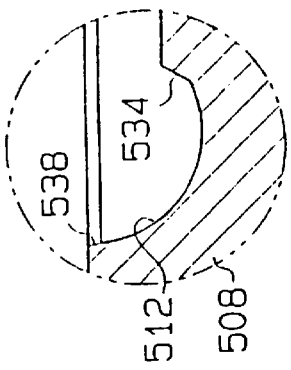
FIG. 21 is a partly enlarged cross-sectional view of the dies of FIG. 20.

As shown in FIGS. 20 and 21, inner peripheral edges of the grooves 494 and 512 of the first and second dies 490 and 508 have first surfaces 532 and 534, each of which is formed along a straight line extending from the inner end of each arc toward the opposite die 490 or 508. Outer peripheral edges of the grooves 494 and 512 have second surfaces 536 and 538, each of which is formed along a straight line extending from the outer end of each arc toward the outside each holding member 530. The upper and lower ends of the tubing 470 are engaged with the associated second surfaces 536 and 538 when the tubing 470 is mounted on the dies. When the forming of the housing is terminated, the upper and lower ends of the tubing 470 are engaged with the associated first surfaces 532 and 534.

A method for manufacturing cylindrical housings similar to those shown in FIGS. 2 and 5, but which utilizes the above-noted principles, will be described with reference to FIGS. 22 to 24. The housings 34 and 204 may be formed by swaging a tubing 670 in substantially the same manner as the stored gas housing 350 shown in FIG. 8 (i.e., to configure the ends of the housings 34 and 240 to have a configuration similar to stored gas housing 350). However, the tubing 670 is longer than the tubing for the stored gas housing 350. For example, the tubing for producing the housing 34 in one embodiment has the length of 251 mm, and the tubing for the housing 204 in one embodiment has the length of 139 mm. The length of the tubing is preferably in the range of 100 mm to 300 mm. The optimal range of the length is from 130 mm to 260 mm.

The tubing 670 has a cylindrical outer wall and upper and lower ends 678 and 682 that are axially separated. The thickness of the wall is preferably from 2 mm to 4 mm, and optimally from 2.5 mm to 3.5 mm. The outer diameter of the tubing 670 is preferably from 40 mm to 75 mm, optimally from 55 mm to 65 mm. The length, thickness and outer diameter of the tubing may be selected depending on various parameters including the amount of the stored gas in the stored gas housing, the pressure of the stored gas, and a size of the space where the inflator is installed in a vehicle.

The tubing 670 is formed into the housing 34 or 204 with modified ends by a lower first die 608 and an upper second die 690. The first and second dies 608 and 690 have first and second ring grooves 612 and 694 that have substantially the same shape as those of the dies shown in FIG. 17. An outer wall 610 or 692 of each die 608 or 690 is formed in accordance with the length of the tubing 670 so that the length of the outer wall 610 or 692 is greater than the length of each die shown in FIG. 17.

Figure 22:
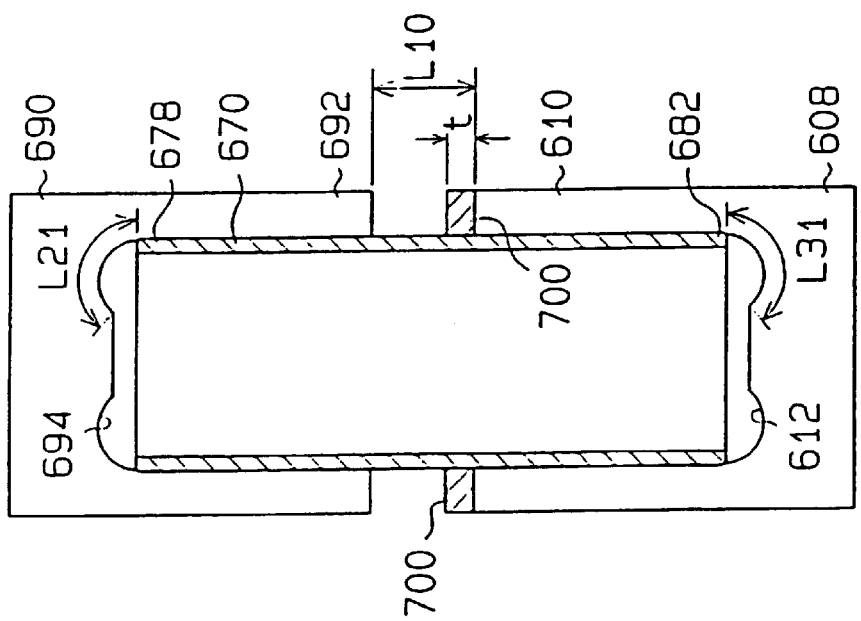
FIGS. 22, 23, and 24 illustrate a method for forming the stored gas housing of the inflator of FIGS. 2, 5, or 15.

As shown in FIG. 22, the tubing 670 is mounted between the first and second dies 608 and 690. The upper and lower ends 678 and 682 of the tubing 670 are engaged with the associated ring grooves 612 and 694. At this time, a clearance having its magnitude L10 is formed between the dies 608 and 690. In the clearance L10, a pair of spacers 700 are detachably placed for adjusting the stroke of the dies 608 and 690 when the housing is formed from the tubing 670. Each spacer has a predetermined thickness t.

Two arcs forming the ring grooves 612 and 694 have a common radius and lengths represented by L31 and L21. Each arc has an angular range from over 90 degrees to less than 180 degrees. A magnitude of the clearance L10 is set to be equal to or more than a magnitude of the sum of the lengths L21 and L31. In this embodiment, the magnitude of the clearance L10 is equal to the magnitude of the sum of the lengths L21+L31. The sum of the lengths L21+L31 is shorter than the length of the tubing 670.

Figure 23:
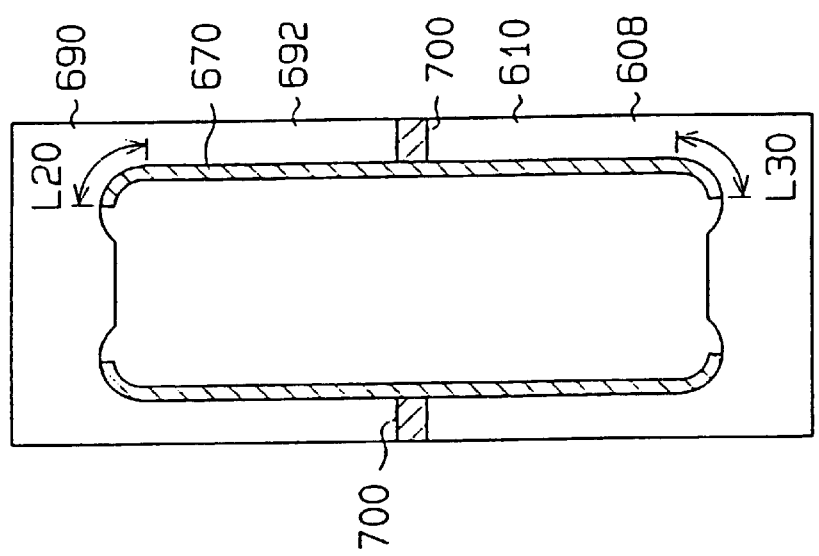
Figure 24:
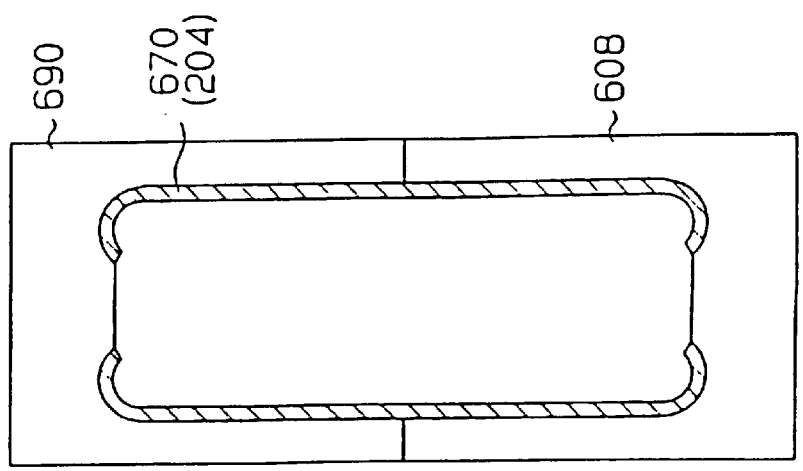

When the housing 34 or 204 with modified ends is formed from the tubing 670, the first and second dies 608 and 690 are advanced toward each other and then the opposing ends are engaged with the spacers 700 as shown in FIG. 23. A distance where the dies 608 and 690 move until engaged is represented by L10−t. Simultaneously, the upper and lower ends of the tubing 670 move for distances L20 and L30 within the corresponding entire lengths of the arcs L21 and L31. The distance L20 is shorter than the distance L21, and the distance L30 is shorter than the distance L31. The following relation is established between the distances L10, L20 and L30 and the thickness t of the spacers 700, $$L10-t=L20+L30.$$

Then, the spacer 700 are removed from the dies 608 and 690. The first and second dies are further advanced toward each other and the opposing ends of the dies are engaged with each other as shown in FIG. 24. At this time, the forming of the housing 34 or 204 with modified ends is terminated. The total stroke of the dies is represented by L10=L21+L31. If the dies are separated after the forming of the housing, the housing 34 or 204 with modified ends can be taken out from the dies. The housing 34 or 204 with modified ends has a central housing, which opens at the opposite ends, that is, first and second ends. Cutting operations may be performed at the first and second ends of the housing 204 to adjust the size of the openings.

It should be noted that the extent of the curved ends may be adjusted by terminating the press operation at the stage shown in FIG. 23. The extent of the curved ends may also be adjusted by changing the radius of the arc or thickness of the spacers. This increases the freedom in designing the housing 34 or 204.

A method for assembling the inflator shown in FIG. 5 by using the housing 204 produced as above will be described. First, the central housing 216 is assembled. The central housing 216 is comprised by two pipes having different diameters. A large pipe constitutes the gas generator housing 212 and a small pipe constitutes the second housing 278.

The large pipe has the screen 266 and the after burner nozzle 274 attached to its one end. The small pipe has the valve 320. The small pipe is inserted into the large pipe to be partly overlapped. At this time, the tip of the nozzle 274 is positioned in the valve 320. Then both pipes are welded at the overlapped portions to be connected with each other. Next, the adaptor 224 containing the initiator is fixed by welding at an open end or a first end located at the large pipe side of the connected pipes. This terminates the assembling of the central housing 216.

Continuously, the boss 294, with which the after burner adapter 282 and the second rupture disk 290 are previously assembled, is inserted into the first end of the central opening of the housing 204 and fixed thereto by welding. Next, the connected pipes are inserted into the housing 204 through the second end of the central opening. An opened end located at the small pipe side of the connected pipes is fitted into the after burner adapter 282. Finally, the connection of the adapter 224 to the second end of the housing 204 terminates the assembling of the inflator shown in FIG. 5.

Figure 25:
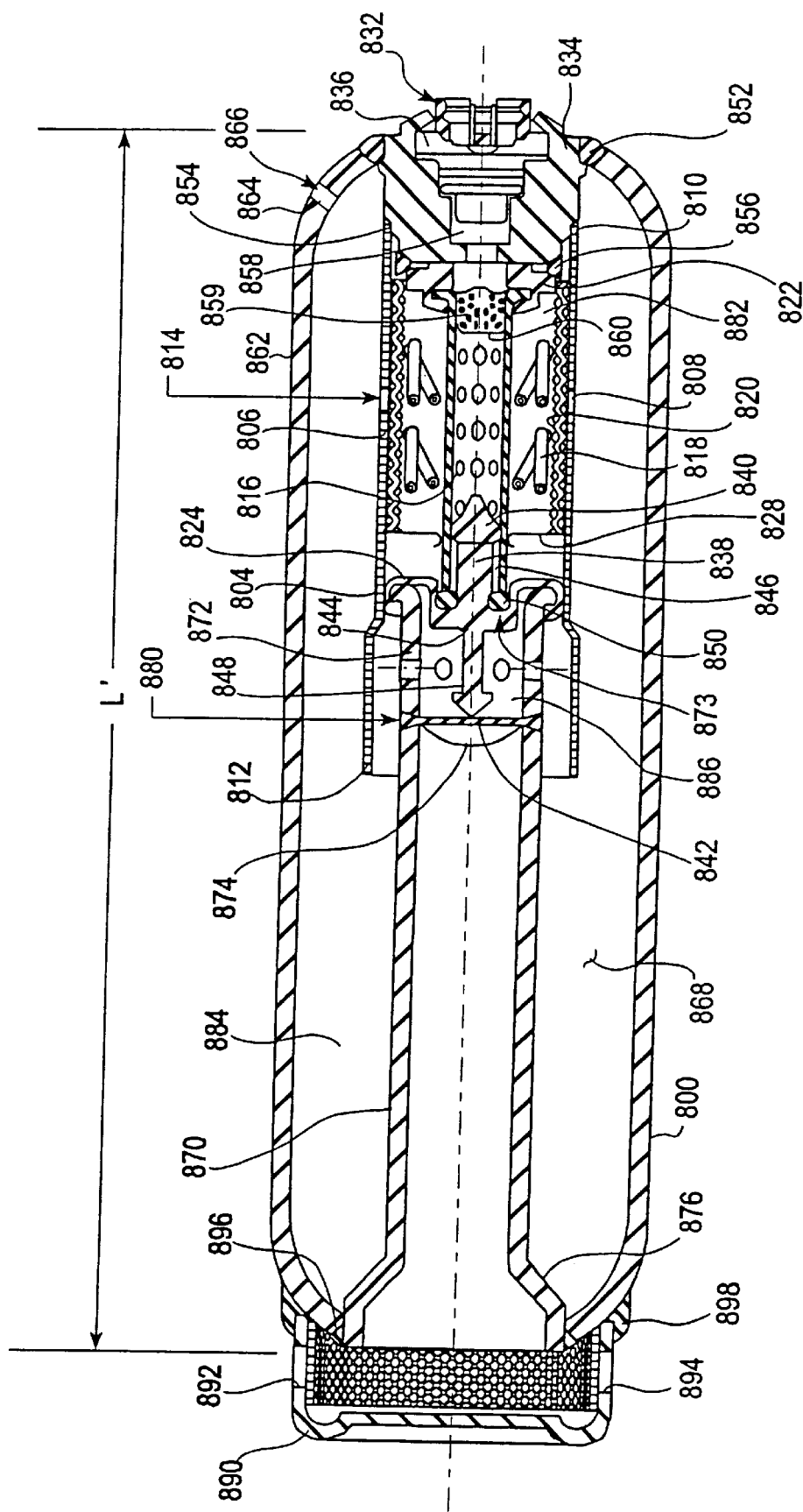
FIG. 25 is a cross-sectional view of another embodiment of a hybrid inflator.

Another embodiment of a hybrid inflator which may be used in the inflatable safety system 10 of FIG. 1 is illustrated in FIG. 25. The hybrid inflator 800 includes a cylindrical inflator or stored gas housing 862 which contains an appropriate pressurized medium 868 (e.g., a pressurized fluid and including one or more liquids and/or one or more gases), a cylindrical gas generator 804 which contains an appropriate gas/heat-generating material or propellant 818 for augmenting the flow to the air/safety bag 18 (FIG. 1) (e.g., at least about 85% of the heat used to augment the inflation capabilities of the system results from combustion of the propellant 818), an activation assembly 832 for both releasing the pressurized medium 868 (by establishing a flowpath between the inflator 800 and the air/safety bag 18 (FIG. 1)) and igniting the propellant 818, and a diffuser 890 for directing the flow from the inflator 800 to the air/safety bag 18 (FIG. 1). Preferably, the inflator 800 utilizes the above-described compositions of gun type propellants and/or hybrid propellants, together with a multi component pressurized medium 868 (e.g., one component being oxygen and the other component being at least one inert fluid (e.g., gas/liquid)). As such, the inflator 800 further includes an afterburner tube 870 disposed "upstream" of the diffuser 890 to allow for sufficient combustion of the flow prior to exiting the inflator 800 through the diffuser 890.

Portions of the inflator 800 define a pressure vessel in that these portions contain the pressurized medium 868 in the static or prior to initiation of the activation assembly 832. Generally, the activation assembly 832 closes one end of the stored gas housing 862, including a first weld 852 which interconnects the stored gas housing 862 and an activation assembly housing 834 of the activation assembly 832 and which provides a seal. The opposite end of the stored gas housing 862 is closed by the afterburner tube 870 and the diffuser 890 which are secured to the stored gas housing 862 by welds 896 and 898, respectively, which provide additional seals. Other seals for the inflator 800 will be discussed in more detail below. Pressurized medium 868 is introduced into the completely assembled inflator 800 through a fill port 864 on the wall of the stored gas housing 862. When the desired amount of pressurized medium 868 has been provided to the inflator 800, the fill port 864 is sealed by a plug 866 which is appropriately secured to the stored gas housing 862 (e.g., a steel ball disposed within and/or over the fill port 864 which may be press-fit and/or welded therein).

The pressurized medium 868 is contained within multiple chambers within the inflator 800 during the static state, and these chambers are fluidly interconnected in a manner which defines the flowpath for exiting the inflator 800 during operation. The gas generator 804 includes a gas generator housing 806 which is concentrically disposed within the stored gas housing 862 and which defines a first chamber 882. Propellant 818 is contained within this first chamber 882 in the gas generator housing 806. Fluidly interconnected with the first chamber 882 of the gas generator housing 806 is a second chamber 884 which contains pressurized medium 868 during the static state or prior to initiation of the activation assembly 832. The second chamber 884 is defined in part by the annular space between the stored gas housing 862 and the gas generator 804, and in part by the annular space between the stored gas housing 862 and the afterburner tube 870. The fluid interconnection between the first chamber 882 and the second chamber 884 is present at all times such that during the static state or prior to initiation of the activation assembly 832, the first chamber 882 within the gas generator housing 806 also contains pressurized medium 868.

The gas generator housing 806 includes a first end 810 and a second end 812. The first end 810 of the gas generator housing 806 interfaces with and is closed by a portion of the activation assembly 832 which assists in the retention of pressurized medium 868 within the inflator 800 in the static state as will be discussed in more detail below. The second end 812 of the gas generator housing 806 has a slightly larger diameter than the first end 810 of the gas generator housing 806, is open, and is disposed radially outwardly from a portion of the afterburner tube 870. This space may be considered as either a part of the second chamber 884 or as part of a flowpath between the second chamber 884 and a third chamber 886 which is defined by an orifice sleeve 872.

Fluid communication between the second chamber 884 and the third chamber 886 is provided by at least one and preferably a plurality of orifice sleeve ports 873 which are radially spaced on an orifice sleeve 872 and which are open at all times. The orifice sleeve 872 interconnects the afterburner tube 870 and the gas generator 804. One end of the orifice sleeve 872 is appropriately secured to a second end wall or partition 824 of the gas generator 804 which provides for closure of one end of the first chamber 882 in the gas generator housing 806 (e.g,. by a crimped interconnection). The opposite end of the orifice sleeve 872 is interconnected with an end of the afterburner tube 870 by a weld 880. In order to seal the third chamber 886 to retain the pressurized medium 868 within the first chamber 882, second chamber 884, and third chamber 886 during the static state or prior to initiation of the activation assembly 832, a second disk 874 is disposed between an end of the afterburner tube 870 and the orifice sleeve 872 and is retained in this position by the weld 880. The second closure disk 874 provides the main isolation between the inflator 800 and the air/safety bag 18 (FIG. 1) and may be characterized as the output disk.

Note that the second closure disk 874 may be characterized as being disposed at an intermediate location within the inflator 800. In the illustrated embodiment, the second closure disk 874 is disposed at generally a mid portion of the stored gas housing 862 and is disposed interiorly thereof. Consider the distance between the two ends of the stored gas housing 862 to be $L^1$. In one embodiment the above-noted "intermediate" location of the second closure disk 874 may be characterized as being disposed at least about 40% of $L^1$ from both ends of the stored gas housing 862.

The afterburner tube 870 communicates with the third chamber 886 after it is ruptured or opened in a manner discussed in more detail below. The afterburner tube 870 in turn communicates with the diffuser 890 which includes a plurality of diffuser ports 894 and a diffuser screen 892. Flow exiting the diffuser 890 is then directed to the air/safety bag 18 (FIG. 1). The afterburner tube 870 and the diffuser 890 then collectively define an outlet passage for the inflator 800. Note that the end of the afterburner tube 870 which interfaces with the diffuser 890 has a divergent end section 876 which has a diameter larger than the end of the afterburner tube 870 which interfaces with the second disk 874. This divergent end section 876 reduces the velocity of the flow exiting the inflator 800.

The first chamber 882 once again is located within the gas generator 804, and is more specifically defined by a hollow transfer tube or transfer housing 814 which is concentrically disposed within the gas generator housing 806 and an annular retainer 828 which seats against the interior surface of the gas generator housing 806 and the exterior surface of the transfer tube or transfer housing 814. The propellant 818 is disposed radially outwardly of the transfer tube or transfer housing 814 (e.g., to reduce the potential for damaging the propellant 818 during ignition) and between the retainer 828 and the first end 810 of the gas generator housing 806 proximate the activation assembly 832.

At least one and typically a plurality of gas generator outlet ports 808 are disposed on the gas generator housing 806 to fluidly interconnect the stored gas housing 862 and the gas generator housing 806 at all times and particularly the first chamber 882 of the gas generator housing 806 where the propellant 818 is located. These outlet ports 808 are positioned on the gas generator housing 806 between the retainer 828 and the first end 810 of the gas generator housing 806. Preferably all byproducts from combustion from the propellant 818 and any from the activation assembly 832 flow out of the gas generator housing 806 through the gas generator outlet ports 808 to augment the flow to the air/safety bag 18 (FIG. 1). In order to reduce the potential for these combustion byproducts adversely impacting the performance of the inflator 800, a screen 820 may be disposed in the interior of the gas generator housing 806 over at least the gas generator outlet ports 808.

The propellant 818 is ignited within the gas generator housing 806 by the activation assembly 832 which includes the activation assembly housing 834. The activation assembly housing 834 is attached to the stored gas housing 862 at a first weld 852 and also to the first end 810 of the gas generator housing 806 at a second weld 854 to achieve a preferably hermetic seal since both the stored gas housing 862 and the gas generator housing 806 contain pressurized medium 868 in the static state or prior to initiation of the activation assembly 832. The activation assembly housing 834 retains an appropriate initiator 836 (e.g., an electrically activatable sguib or other suitable pyrotechnic device) which provides combustion products to cause the ignition of the propellant 818. In order to isolate the initiator 836 from the pressurized medium 868 within the inflator 800 and further to provide a seal for the inflator 800, a first closure disk 858 is disposed between the gas generator 804 and the initiator 836. In the illustrated embodiment, this is affected by disposing the first closure disk 858 between a first end wall 822 of the gas generator 804 (which is crimped onto one end of the transfer tube or transfer housing 814) and an end of the activation assembly housing 834 which are secured to each other by a third weld 856.

The cylindrical transfer tube or transfer housing 814 is concentrically disposed within and relative to the gas generator housing 806, and is aligned with the initiator 836 to receive a "flow" of combustion byproducts which are generated by initiation of the activation assembly 832. The propellant 818 is again disposed in the first chamber 882 in the gas generator housing 806, or radially outwardly from the transfer tube or transfer housing 814. As such, the transfer tube 814 reduces the potential for the initiation of the activation assembly 832 adversely impacting the propellant 818, principally by reducing the potential for having the pressure wave or pulse, produced from activation of the initiator 836, cracking the grains of the propellant 818 which would change the burn characteristics of the propellant 818. In order to communicate combustion products from the activation assembly 832 to the propellant 818 to ignite the same by direct contact therewith, at least one and preferably a plurality of transfer tube ports 816 are provided on the wall of the transfer tube or transfer housing 814. These transfer tube or transfer housing ports 816 may be radially disposed about the transfer tube or transfer housing 814 and longitudinally spaced along the length of the transfer tube or transfer housing 814.

The activation assembly 832 further includes an appropriate ignition/booster material 859 to augment the capabilities of the activation assembly 832 (e.g., an RDX/aluminum booster material having a composition of 89 wt % RDX, 11 wt % aluminum powder, possibly with 0.5 wt % to 5.0 wt % hydroxypropyl-cellulose added replacing 0.5 wt % to 5.0 wt % of the RDX and aluminum proportionally). The ignition/booster material 859 may be positioned between the initiator 836 and the propellant 818 in alignment with the discharge or output from the initiator 836. Activation of the initiator 836 ignites its combustible material, which in turn ignites the ignition/booster material 859. Combustion products from the initiator 836 and/or the ignition booster material 859 then ignite the propellant 818 by passing through the transfer tube or transfer housing 814 and its transfer tube ports or transfer housing ports 816 to directly contact the propellant 818 and ignite the same. Since the ignition/booster material 859 is in powder form, it is contained within a thin-walled cup 860. This cup 860 is disposed on one end of the transfer tube 814 on the inside thereof (e.g., being press-fit therein), and has an open end which faces or projects toward the initiator 836 and a closed end disposed opposite the open end. The transfer tube or transfer housing 814 thereby conveys combustion products for ignition of the propellant 818.

Initiation of the activation assembly 832 not only ignites the propellant 818, but it also establishes a flowpath between the inflator 800 and the air/safety bag 18 (FIG. 1) by rupturing the second disk 874 which is again the main isolation between the inflator 800 and the air/safety bag 18. In this regard, the activation assembly 832 further includes a projectile/valve 838. This projectile/valve 838 is partially disposed within the end of the transfer tube or transfer housing 814 opposite the ignition/booster material 859, is aligned with both the initiator 836 and the ignition/booster material 859, is initially retained in a fixed position by a shear ring 850, extends through the second end wall or partition 824 of the gas generator housing 806 beyond the end of the transfer tube or transfer housing 814, is axially aligned with the second disk 874, and is spaced from the second disk 874. Generally, the combustion products from the activation assembly 832 (the initiator 836 and/or the ignition/booster material 859) are directed down through the transfer tube 814 and exert a force on the projectile/valve 838 to "break" the shear ring 850 and propel the projectile/valve 838 through the second disk 874. This allows pressurized medium 868, propellant gases, and other combustion products to flow from the second chamber 884, into the third chamber 886 through the orifice sleeve ports 873, into the afterburner tube 870 through the orifice sleeve ports 873 and the ruptured second disk 874, and into the diffuser 890 to exit the inflator 800 for direction to the air/safety bag 18 (FIG. 1).

The projectile/valve 838 of the activation assembly 832 provides a function in addition to initiating the flow from the inflator 800 in the described manner. Specifically, the projectile/valve 838 forces the propellant gases and other combustion products from the activation assembly 832 within the first chamber 882 to flow out of the gas generator 804 through the gas generator outlet ports 808 and into the second chamber 884. This is provided by the configuration of the projectile/valve 838 and/or the manner in which the projectile/valve 838 interfaces with the gas generator 804. The projectile/valve 838 includes a first conically-shaped head 840 which projects toward the initiator 836 and which has a maximum diameter that is substantially equal but slightly less than the inner diameter of the transfer tube or transfer housing 814 such that the projectile/valve 838 may slide relative thereto. The projectile/valve 838 further includes a second conically-shaped head 842 which projects toward the second disk 874 and which has a maximum diameter which is less than the maximum diameter of the first head 840. Interconnecting the first head 840 and the second head 842 is a body 844 which includes a first body section 846 and a second body section 848. The first body section 846 slidably interfaces with the second end wall or partition 824 of the gas generator 804, while the second body section 848 extends from the first body section 846 beyond the second end wall or partition 824 for interconnection with the second head 842. The second body section 848 has a smaller diameter than the first body section 846.

The projectile/valve 838 is retained within a fixed position in the static state or prior to activation of the activation assembly 832 by a shear ring 850. The annular shear ring 850 is seated within a groove formed on the first body section 846. The shear ring 850 is further retained between the second end wall or partition 824 of the gas generator 804 and the end of the transfer tube or transfer housing 814. Once the activation assembly 832 is activated, the resulting combustion products from the initiator 836 and the ignition/booster material 859 exert a force on the projectile/valve 838 which is sufficient to shear off the shear ring 850 to allow the projectile/valve 838 to be propelled through the second disk 874. The projectile/valve 838 is moved solely by these combustion products, and not from combustion of the propellant 818. The projectile/valve 838 continues to be axially advanced by the combustion products from the activation assembly 832 until the first head 840 abuts the second end wall or partition 824 of the gas generator. Since the diameter of the first head 840 exceeds the diameter of the hole or aperture in the second end wall or partition 824 through which the projectile/valve 838 passes, the first head 840 seals the first chamber 882 such that the flow out of the gas generator 804 must go through the gas generator outlet ports 808 and into the second chamber 884 and then exit the inflator 800 in the above-described manner. The pressure within the first chamber 882 due to the combustion of the propellant 818 maintains the projectile/valve 838 in this type of sealing engagement. In the event that the pressure within the third chamber 886 ever exceeded the pressure within the first chamber 882 during operation, however, the projectile/valve 838 would axially advance back toward the initiator 836 until the second head 842 seated against the second end wall or partition 824 of the gas generator 804 to again seal the same.

Figure 26:
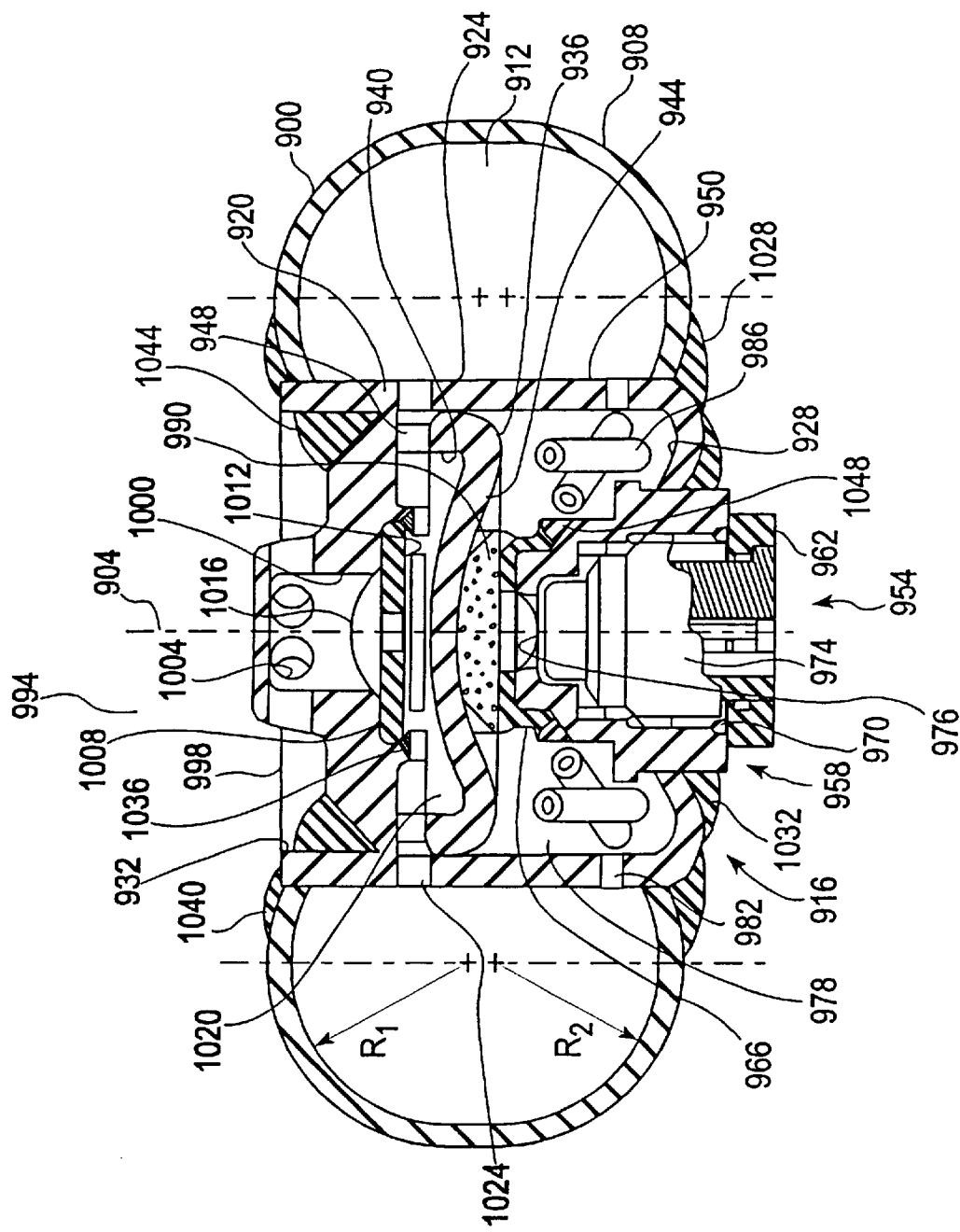
FIG. 26 is a cross-sectional view of another embodiment of a hybrid inflator.

Another embodiment of a hybrid inflator which may be used in the inflatable safety system 10 of FIG. 1 is illustrated in FIG. 26. The inflator 900 is a hybrid and generally includes two main elements. An inflator or stored gas housing 908 contains a pressurized medium to provide the "cold gas" component of the hybrid inflator 900. A central housing assembly 916 extends through the central portion of the generally torus-shaped stored gas housing 908 and is appropriately attached to the central housing assembly 916 (e.g., via welding at welds 1028, 1040), preferably to achieve a hermetic seal. The central housing assembly 916 defines a gas generator 950 which contains propellant 986 to provide the "hot gas" component for the hybrid inflator 900 (e.g., propellant gases at an elevated temperature) to augment the flow to the air/safety bag 18 (FIG. 1) (e.g., at least about 85% of the heat used to augment the inflation capabilities of the system results from combustion of the propellant 986). The pressurized medium and propellant used in the inflator 900 may be those discussed above, and may be used within the above-noted ranges/relative amounts.

The stored gas housing 908 is annular and disposed concentrically about the central axis 904 of the inflator 900. The upper portion of the stored gas housing 908 is defined by a first radius $R_1$, while the lower portion of the stored gas housing 908 is defined by a second radius $R_2$. The centers for the radii $R_1$ and $R_2$ are vertically offset but vertically aligned. This provides an annular portion for the stored gas housing 908 which is generally cylindrical. In one embodiment, the first radius $R_1$ is about 0.6", the second radius $R_2$ is about 0.6", and the first radius $R_1$ and second radius $R_2$ are vertically offset by a distance of about 0.12".

The central housing assembly 916 is disposed about the central, longitudinal axis 904 of the inflator 900 and includes a generally cup-shaped central housing 920. The central housing 920 has a central housing sidewall 924 which is generally cylindrical, a central housing bottom wall 928 which is integrally formed with the central housing sidewall 924, and an open end 932. The central housing bottom wall 928 extends inwardly from the central housing sidewall 924 generally toward the open end 932, and in one embodiment the angular disposition of the central housing bottom wall 928 relative to a horizontal reference plane is about 26°. This angular disposition provides increased structural strength.

An opening is provided on the central portion of the central housing bottom wall 928 for receiving an activation assembly 954. The activation assembly 954 includes an activation assembly holder assembly 958 having a main housing 962. The main housing 962 is attached to the central housing bottom wall 928 by an annular weld 1032, preferably to provide a hermetic seal. An appropriate initiator 974 is received within the main housing 962 and an o-ring 970 is disposed between the initiator 974 and the main housing 962 to provide another seal. Output from the initiator 974 when activated is directed through an opening formed in a first closure disk 976 which is axially aligned with the initiator 974.

An end cap 966 of the activation assembly holder assembly 958 is disposed over the end of the initiator 974 and has an opening extending through the central portion thereof. The first closure disk 976 is disposed within this opening in the end cap 966 and is retained between the end cap 966 and the main housing 962 which are attached to each other by an annular weld 1048. Aligned with the first closure disk 976 but on the opposite side of the disk 976 from the initiator 974 is an appropriate ignition/booster material 990, which in one embodiment is an RDX/aluminum booster material having a composition of 89 wt % RDX and 11 wt % aluminum powder, possibly with 0.5 wt % to 5.0 wt % hydroxypropylcellulose added replacing 0.5 wt % to 5.0 wt % of the RDX and aluminum proportionally. This ignition/booster material 990 is part of the activation assembly 954 and assists in the ignition of the propellant 986 and may be contained within a foamed structure.

A partition 936 is disposed at an intermediate location within the central housing 920. The partition 936 includes a partition sidewall 940 and a partition bottom wall 944. The lower portion of the partition sidewall 940 is in press-fit engagement with the interior of the central housing sidewall 924, while the upper portion of the partition sidewall 940 is spaced radially inwardly from the central housing sidewall 924. A first chamber 978 is defined by the partition bottom wall 944, the lower portion of the central housing 920, and the activation assembly holder assembly 958 which closes the opening in the central housing bottom wall 928 as noted above. The partition bottom wall 944 is concave or domed relative to the first chamber 978 to provide for adequate spacing between the partition bottom wall 944 and the end of the end cap 966 attached to the main housing 962 of the activation assembly holder assembly 958.

The ignition/booster material 990 is contained within the first chamber 978. Also contained within the first chamber 978 is the propellant 986 such that the structure defining the first chamber 978 may also be characterized as the gas generator 950 having a gas generator housing. A plurality of first ports 982 fluidly interconnect the first chamber 978 with the stored gas housing 908 at all times. The space defined between the stored gas housing 908 and the central housing sidewall 924 defines a second chamber 912. Therefore, in the static state or prior to initiation of the activation assembly 954, pressurized medium is also contained within the first chamber 978 of the gas generator 950.

The open end 932 of the central housing 920 is closed by an outlet or a diffuser assembly 994 through which all output from the inflator 900 flows and which includes a diffuser housing 998. A third chamber 1020 is defined by the diffuser assembly 994, the central housing 920, and the partition 936. The third chamber 1020 is also fluidly interconnected with the stored gas housing 908 at all times. In this regard, a plurality of radially spaced second ports 1024 are provided on the central housing sidewall 924. Since the upper end of the partition sidewall 940 engages the diffuser housing 998, a plurality of partition slots 948 are also provided on the upper portion of the partition sidewall 940. Each of the partition slots 948 are formed on the upper end of the partition sidewall 940 and are again spaced radially inwardly from the central housing sidewall 924. All flow exiting the inflator 900 flows through the third chamber 1020, including propellant gases which flow from the first chamber 978, into the stored gas housing 908 or the second chamber 912, into the space between the upper portion of the partition sidewall 940 and the central housing 920, through the slots 948 adjacent the diffuser housing 998, and then into the third chamber 1020.

The diffuser assembly 994 closes the open end 932 of the central housing 920 and directs all flow from the inflator 900 to the air/safety bag 18 (FIG. 1). The diffuser assembly 994 includes the diffuser housing 998 which is attached to the central housing sidewall 924 by an annular weld 1044. A central passage 1000 extends through the interior of the diffuser housing 998 and this passage 1000 is on the central axis 904 of the inflator 900. The central passage 1000 interfaces with a plurality of diffuser ports 1004 which provide a reduced-thrusting output to the air/safety bag 18 (FIG. 1). In order to retain the pressurized medium within the inflator 900 during the static state, the diffuser assembly 994 includes a second closure disk 1016 which covers the central passage 1000 to initially isolate the inflator 900 from the air/safety bag 18 (FIG. 1). The second closure disk 1016 is disposed within a countersink 1008 on the end of the diffuser housing 998 which projects toward the activation assembly 954, and is retained between the diffuser housing 998 and a diffuser end cap 1012. The diffuser end cap 1012 is attached to the diffuser housing 998 by an annular weld 1036 and includes an opening which is also on the central axis 904 of the inflator 900.

The above-described configuration of the inflator 900 is particularly beneficial for purposes of manufacturability. In this regard, the central housing 920 is disposed within the stored gas housing 908, appropriately aligned therewith, and is attached thereto by making the annular weld 1028. The main housing 962 of the activation assembly 954 is also disposed within the opening in the central housing bottom wall 928, appropriately aligned therewith, and secured thereto by making the weld 1032. Preferably, the first closure disk 976 is disposed between the main housing 962 and the end cap 966 such that the weld 1048 is made prior to loading the activation assembly 954 into the central housing 920. The relative order of making the welds 1028 and 1032 is not critical. The weld 1040 which interconnects the upper portion of the central housing 920 and the stored gas housing 908 also could be made at any time during the assembly procedure.

After the welds 1028 and 1032 are made, the propellant 986 is loaded into the central housing 920 through its open end 932 and assumes a position proximate the activation assembly 954. The ignition/booster material 990, applied to a foam disk, may then be positioned over the opening in the end cap 966. The partition 936 may then be loaded into the central housing 920 through its open end 932 to define the first chamber 978. Compression of the foam disk by the partition 936, which holds the ignition/booster material 990, retains it in its proper position. Through utilization of this configuration for the inflator 900, it will be appreciated that no welds are made adjacent to the propellant 986 during assembly of the inflator. This significantly reduces the potential for ignition of the propellant 986 during assembly and/or alleviates the need to take precautions from having these welds undesirably heat the propellant 986.

Assembly of the inflator 900 is completed by installing the diffuser assembly 994 in the open end 932 of the central housing 920. The second closure disk 1016 is loaded prior to this installation by welding the diffuser housing 998 to the end cap 1012 at weld 1036. With the diffuser assembly 994 being retained within the proper position, the weld 1044 is made. The weld 1040 could also be made at this time as well to complete the assembly of the hardware for the inflator

900. Pressurized medium may then be provided to the sealed inflator 900, such as by injecting the pressurized medium through a fill port on the stored gas housing 908.

Summarizing the operation of the inflator 900, prior to initiation of the activation assembly 954 the pressure throughout the inflator 900 is equal. Pressurized medium is contained within the first chamber 978, the second chamber 912, and the third chamber 1020. When an appropriate signal is provided to the activation assembly 954, the combustible material of the initiator 974 is ignited. Combustion products from the initiator 974 rupture the first closure disk 976 and ignite the ignition/booster material 990. Ignition of the ignition/booster material 990 then ignites the propellant 986.

All propellant gases and other combustion products from the activation assembly 954 flow from the first chamber 978 into the second chamber 912, and then into the third chamber 1020. The partition 936 substantially prevents any propellant gases from flowing directly from the first chamber 978 and into the third chamber 1020. Flow into the third chamber 1020 is through the second ports 1024, into the space between the upper portion of the partition sidewall 940 and the central housing sidewall 924, through the slots 948 on the end of the partition sidewall 940 which engages the diffuser housing 998, and then into the third chamber 1020. Once the pressure within the third chamber 1020 reaches a predetermined level, the second closure disk 1016 is ruptured such that flow may be provided to the air/safety bag 18 (FIG. 1) through the diffuser assembly 994. Due to the relatively small size of the inflator 900 and the rapid pressure increase within the inflator 900 upon ignition of the propellant 986 and subsequent combustion of the propellant gases in the above-noted manner, flow to the air/safety bag 18 (FIG. 1) by this rupturing of the second closure disk 1016 is initiated in a timely manner. The second closure disk 1016 may be coined, minimizing the potential for closure disk fragmentation being entrained in the exiting gas flow.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. An inflator for inflating an inflatable in a vehicle, comprising:
    an inflator housing;
    a gas generator assembly interconnected with said inflator housing and including a gas generator housing;
    a solid propellant including a secondary explosive that constitutes at least 50% by weight of said propellant, and wherein said propellant has the property that said propellant remains functional in the inflator when subject to a temperature of 107° C. for a period of 400 hours and, when the inflator is activated, said solid propellant produces propellant gases that include amounts of carbon monoxide gas and hydrogen gas;
    a pressurized medium stored in said inflator housing that includes at least one inert gas and oxygen, wherein said at least one inert gas, on a molar basis, is greater in amount than any nitrogen present in said pressurized medium and said oxygen is less in amount, on a molar basis, than said at least one inert gas and in which at least a majority, on a molar basis, of said pressurized medium is different from air and, when the inflator is activated, said oxygen combines with said carbon monoxide gas and said hydrogen gas to reduce said amounts thereof, said at least one inert gas and said oxygen together with said propellant gases, providing inflation gases that are received by the inflatable, with substantially all of said inflation gases that are received by the inflatable being said propellant gases said at least one inert gas and said oxygen, and in which said inflation gases are produced substantially independently of any flammable fuel gas; and
    an inflator activation assembly for use in activating said propellant.

2. A hybrid inflator, as claimed in claim 1, wherein:
said at least one inert gas consists essentially of argon.

3. An inflator, as claimed in claim 2, wherein:
said at least one inert gas includes helium for use in detecting any leak of said pressurized medium.

4. An inflator, as claimed in claim 1, wherein:
said secondary explosive is selected from the group consisting of: RDX (hexahydrotrinitrotriazine), HMX (cyclotetramethylenetetranitramine), PETN (petaerythriltol tetranitrate) and TAGN (triaminoguanidine nitrate).

5. An inflator, as claimed in claim 1, wherein:
said propellant comprises up to about 90% by weight of said secondary explosive.

6. An inflator, as claimed in claim 1, wherein:
said propellant comprises up to about 90% by weight of said secondary explosive and from about 10% to 50% by weight of a binder system.

7. An inflator, as claimed in claim 1, wherein:
said at least one inert gas, on a molar basis, is about 70% to 90% of said pressurized medium.

8. An inflator, as claimed in claim 1, wherein:
said at least one inert gas is selected from the group that consists of: argon, helium and neon.

9. An inflator, as claimed in claim 1, wherein:
said solid propellant is selected from the group consisting of: single-base propellants, double-base propellants, triple-base propellants and nitramine propellants.

10. An inflator, as claimed in claim 1, wherein:
a weight ratio of said pressurized medium to said propellant ranges from about 10:1 to about 20:1.

11. An inflator, as claimed in claim 1, wherein:
said weight of said propellant is less than about 15 grams.

12. An inflator, as claimed in claim 1, wherein:
a ratio of the gram moles of said propellant gases and said pressurized medium to the gram weight of said propellant ranges from about 0.35 to about 0.6 gram moles per gram.

13. An inflator for use in a vehicle, comprising:
a gas generator assembly including a gas generator housing;
an inflator housing including a first housing assembly and a second housing assembly interconnected with said first housing assembly, said second housing assembly including said gas generator housing and first and third chambers, said first housing assembly being disposed about said second housing assembly and spaced from said second housing assembly, and with a second chamber defined between said first housing assembly and said second housing assembly;

a propellant including a secondary explosive that constitutes at least 50% by weight of said propellant, and wherein said propellant has the property that said propellant remains functional in the inflator when subject to a temperature of 107° C. for a period of 400 hours;

a pressurized medium stored in said inflator housing that includes at least one inert gas and oxygen, wherein said at least one inert gas, on a molar basis, is greater in amount than any nitrogen present in said pressurized medium and said oxygen is less in amount, on a molar basis, than said at least one inert gas and in which at least a majority, on a molar basis, of said pressurized medium is different from air; and an inflator activation assembly for use in activating said propellant.

14. An inflator, as claimed in claim 13, wherein:

said second housing assembly has first and second ports, said first port interconnecting said first chamber and said second chamber and said second port interconnecting said second chamber and said third chamber and in which a first closure disk is disposed between said third chamber and an inflatable and wherein said activation assembly is a dual function activation assembly which is positioned for rupturing said first closure disk and igniting said propellant.

15. An inflator, as claimed in claim 14, further including:

means for substantially preventing direct fluid communication between said first and third chambers at all times, wherein gas generated upon ignition of said propellant is forced to flow from said first chamber, into said second chamber and then into said third chamber.

16. An inflator, as claimed in claim 15, wherein:

said means for substantially preventing direct fluid communication comprises a partition disposed within said second housing assembly, said partition substantially isolating said first chamber from said third chamber.

17. An inflator, as claimed in claim 16, wherein:

said partition has a bottom wall and said partition bottom wall is generally domed.

18. An inflator, as claimed in claim 15, wherein:

said means for substantially preventing direct fluid communication comprises a partition disposed within said second housing assembly that separates said first chamber from said third chamber, an aperture extending through said partition and a projectile slidably received within said aperture.

19. An inflator, as claimed in claim 13, wherein:

said first housing assembly is substantially cylindrical.

20. An inflator, as claimed in claim 13, wherein:

said first housing assembly is generally torus-shaped.

* * * * *